United States Patent
Eckardt, III et al.

(10) Patent No.: US 9,262,514 B2
(45) Date of Patent: Feb. 16, 2016

(54) METHOD FOR PROVIDING A NETWORK GRAPHICAL REPRESENTATION OF DATABASE RECORDS

(76) Inventors: Ralph W. Eckardt, III, Abington, MA (US); Robert G. Wolf, Jr., Lincoln, MA (US); Alexander Shapiro, Livingston, NJ (US); Kevin G. Rivette, Palo Alto, CA (US); Mark F. Blaxill, Cambridge, MA (US)

( * ) Notice: Subject to any disclaimer, the term of this patent is extended or adjusted under 35 U.S.C. 154(b) by 0 days.

(21) Appl. No.: 12/578,253

(22) Filed: Oct. 13, 2009

(65) Prior Publication Data

US 2010/0106752 A1 Apr. 29, 2010

Related U.S. Application Data

(62) Division of application No. 11/120,423, filed on May 3, 2005, now Pat. No. 7,672,950.

(60) Provisional application No. 60/567,997, filed on May 4, 2004.

(51) Int. Cl.
*G06F 17/30* (2006.01)

(52) U.S. Cl.
CPC .... *G06F 17/30696* (2013.01); *G06F 17/30643* (2013.01); *G06F 17/30651* (2013.01); *G06F 2216/11* (2013.01)

(58) Field of Classification Search
CPC ............. G06F 17/30595; G06F 17/30569; G06F 17/2241; G06F 17/30643; G06F 17/30696; G06F 17/30651; G06F 2216/11
USPC ......... 707/705, 706, 790, 791, 794, 797, 798, 707/829
See application file for complete search history.

(56) References Cited

U.S. PATENT DOCUMENTS

| | | | |
|---|---|---|---|
| 4,752,889 A | 6/1988 | Rappaport et al. | |
| 5,806,056 A * | 9/1998 | Hekmatpour | 706/50 |
| 5,832,494 A | 11/1998 | Egger et al. | |
| 5,845,301 A | 12/1998 | Rivette et al. | |
| 6,038,574 A | 3/2000 | Pitkow et al. | |
| 6,154,213 A | 11/2000 | Rennison et al. | |
| 6,182,091 B1 | 1/2001 | Pitkow et al. | |
| 6,256,032 B1 | 7/2001 | Hugh | |
| 6,286,018 B1 | 9/2001 | Pitkow et al. | |
| 6,339,767 B1 * | 1/2002 | Rivette et al. | 707/781 |
| 6,389,436 B1 * | 5/2002 | Chakrabarti et al. | 715/229 |
| 6,434,556 B1 | 8/2002 | Levin et al. | |

(Continued)

OTHER PUBLICATIONS

"East Text Search Training", USPTO, Jan. 2000, p. 15.

(Continued)

*Primary Examiner* — Thanh-Ha Dang
(74) *Attorney, Agent, or Firm* — DLA Piper LLP (US)

(57) ABSTRACT

Methods for Providing a Network Graphical Representation of Database Records. Database records are selected according to descriptive criteria, wherein each of the database records are members of a common record class. Attributes of the common record class and identified and network nodes are associated to instances of the attributes from the database records. The network nodes are connected with network links that designate network nodes having common instances of the attributes such that the network nodes have a one-to-many relationship with the network links. The identifying and connecting steps are iteratively executed while modifying the descriptive criteria to change the selected database records.

38 Claims, 35 Drawing Sheets

(56) References Cited

U.S. PATENT DOCUMENTS

| | | | |
|---|---|---|---|
| 6,457,028 | B1 | 9/2002 | Pitkow et al. |
| 6,486,989 | B2 | 11/2002 | Shinoda |
| 6,499,026 | B1 * | 12/2002 | Rivette et al. ........................ 1/1 |
| 6,604,114 | B1 * | 8/2003 | Toong .............. G06F 17/30014 |
| 6,704,722 | B2 | 3/2004 | Wang Baldonado |
| 6,714,936 | B1 * | 3/2004 | Nevin, III ......... G06F 17/30395 |
| 6,748,379 | B2 | 6/2004 | Martin |
| 6,801,229 | B1 | 10/2004 | Tinkler |
| 6,876,930 | B2 * | 4/2005 | Murray ................... G06F 19/28 702/19 |
| 6,901,555 | B2 | 5/2005 | Hida et al. |
| 6,918,096 | B2 | 7/2005 | Hugh |
| 6,931,604 | B2 | 8/2005 | Lane |
| 7,117,198 | B1 * | 10/2006 | Cronin .............. G06F 17/30675 |
| 7,127,405 | B1 | 10/2006 | Frank et al. |
| 7,203,698 | B2 * | 4/2007 | Yamashita ........ G06F 17/30991 |
| 7,293,018 | B2 * | 11/2007 | Hattori et al. ........................ 1/1 |
| 7,428,705 | B2 * | 9/2008 | Ronald ............. G06F 17/30882 707/E17.013 |
| 7,523,126 | B2 * | 4/2009 | Rivette et al. ........................ 1/1 |
| 7,788,251 | B2 * | 8/2010 | Carlson et al. ................ 707/707 |
| 2002/0035571 | A1 | 3/2002 | Coult |
| 2002/0138474 | A1 | 9/2002 | Lee |
| 2002/0147738 | A1 | 10/2002 | Reader |
| 2002/0168664 | A1 * | 11/2002 | Murray ................... G06F 19/28 435/6.14 |
| 2003/0038836 | A1 * | 2/2003 | Ronald ............. G06F 17/30873 715/738 |
| 2003/0046307 | A1 * | 3/2003 | Rivette et al. .............. 707/104.1 |
| 2003/0149660 | A1 * | 8/2003 | Canfield ................ G06Q 40/02 705/39 |
| 2004/0064438 | A1 | 4/2004 | Kostoff |
| 2004/0083422 | A1 * | 4/2004 | Duan .................... G06Q 10/10 715/200 |
| 2004/0090472 | A1 | 5/2004 | Risch et al. |
| 2004/0133566 | A1 | 7/2004 | Ishiguro et al. |
| 2005/0060306 | A1 * | 3/2005 | Hattori et al. ...................... 707/3 |
| 2005/0080769 | A1 | 4/2005 | Gemmell et al. |
| 2005/0108378 | A1 * | 5/2005 | Patterson .............. H04L 41/048 709/223 |
| 2005/0114763 | A1 * | 5/2005 | Nonomura et al. ........... 715/513 |
| 2005/0131882 | A1 | 6/2005 | Beretich et al. |
| 2005/0149538 | A1 * | 7/2005 | Singh ................ G06F 17/30893 |
| 2005/0180330 | A1 | 8/2005 | Shapiro |
| 2007/0021597 | A1 * | 1/2007 | Edwards ............ C12N 15/1089 536/23.2 |

OTHER PUBLICATIONS

"East Text Search Training", USPTO, Jan. 2000.

Abstract page of Open source Touch graph project containing the web links and details about the project, http://sourceforge.net/project/showfiles.php?group.sub.—id=30469, 2 pages.

Batagelj et al., "Pajek: Program for large Network Analysis", University of Ljubljana, May 1997 / Jan. 1999, 11 pages.

Beaza-Yates, R. et al., "Information Retrieval," Modern Information Retrieval, Harlow: Addison-Wesley, GB (Jan. 1, 1999) (103 pages).

Breitkreutz et al., "Osprey: a network visualization system," Genome Biology, 2003, pp. R22.1-R22.4, 4:R22.

Breschi et al., "Mobility and Social Networks: Localised Knowledge Spillovers Revisited," CESPRI, 2003.

Cambrosio et al., "Mapping Collaborative Work and Innovation in Biomedicine," Social Studies of Science, 2004, pp. 325-364, vol. 34, No. 3.

Cantner et al., "The Network of Innovators in Jena: An Application of Social Network Analysis," Freidrich-Schiler University at Jena, 2004.

Chen, "Measuring the Movement of a Research Paradigm," Visualization and Data Analysis, 2005.

Chen, "Searching for intellectual turning points: Progressive knowledge domain visualization," PNAS Colloquium, 2003, 8 pages.

Douglas, et al. "Pubnet: a Flexible System for Visualizing Literature Derived Networks", Genome Biology, 6:R80 (2005).

International Search Report for PCT/US05/15346, mailed May 24, 2007, 3 pages.

Liu et al., "Toolkits for Visualizing Co-Authorship Graph," Proceedings of the 2004 Joint ACM/IEEE Conference on Digital Libraries, 2004.

Meijer, "Ideas for a Network Visualization Tool," University of Amsterdam, Fall/Winter 2002.

Morris, Steven et al., "Diva: A visualization system for exploring document databases for technology forecasting" http://portal.acm.org/citation.cfm?id=636870.636884, 1 page.

Nowell, LT, et al., "Exploring search results with Envision" CHI '97 Extended Abstracts on Human Factors in Computing System: Looking to the Future, (Mar. 22, 1997) (2 pages).

Owen-Smith et al., "A Comparison of U.S. and European University-Industry Relations in the Life Sciences," Final Draft, Forthcoming: Management Science.

Owen-Smith et al., "Knowledge Networks as Channels and Conduits: The Effects of Spillovers in the Boston Biotechnology Community," Organization Science, 2004, pp. 5-21, vol. 15, No. 1.

Podolny et al., "A Role-Based Ecology of Technological Change," The American Journal of Sociology, 1995, pp. 1224-1260, vol. 100, No. 5.

Pubnet Instructions, 2006, http://pubnet.gersteinlab.org/doc.html.

Singh, "Social Networks as Drivers of Knowledge Diffusion," Graduate School of Business—Harvard University, 2003.

Supplemental European Search Report issued for EP 05474570, dated Jul. 13, 2009 (3 pages).

The definition about metanodes retrieved from the internet from the web site, http://www.compendiumdev.co.uk/touchgraph/LBinstructions.html, 2 pages.

Thinkmap SDK v.2.5, 2004.

Thinkmap Technical White Paper, 2004.

Unknown, "Dynamic Network Visualization: Methods for Meaning with Longitudinal Network Movies," AJS Submission Draft.

Yoon et al., "3D Visualization of Ecological Netowrks on the WWW."

Office Action issued in South Korean Application No. 10-2006-7025377 dated May 4, 2011.

English language translation of Office Action issued in South Korean Application No. 10-2006-7025377 dated May 4, 2011.

English language translation of Office Action issued in Chinese Application No. 200580021670.0 dated Mar. 6, 2009.

English langugage translation of Office Action issued in Chinese Application No. 200580021670.0 dated Oct. 9, 2011.

English language translation of Office Action issued in Chinese Application No. 200580021670.0 Mar. 1, 2012.

European Search Report issued in EP 12156906.5 dated Jul. 17, 2012.

European Search Report issued in EP 12156908.1 dated Jul. 17, 2012.

European Search Report issued in EP 12156905.7 dated Jul. 13, 2012.

* cited by examiner

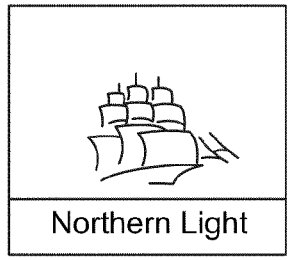
FIG. 1
(Prior art)

| Research | Power | Buisiness | Investment | Market Research | EIU Search | Quotes | News | Geosearch |

Power Search found 3,239 items for:

| IBM and server market | (Search) |

💾 Save this Search as an Alert  ✏ Edit this search  ❓ Tips

1. IBM Brings pSeries to Entry-Level Server Market
   69% - Articles & General info: Oct 24, 2001 (Internet.com via COMTEX) – In its contiuing quest to capture the Unix server market, IBM Wednesday increased the competition with the introduction... 10/24/2001
   INT Media Group, Inc. (newswire): Available at Northern Light

*SPECIAL COLLECTION*
    *Add to cart*

2. IBM Takes Lead in Server Market Share
   68% - Articles & General info: According to Gartner Dataquest, IBM Corp. has taken the lead in sales of enterprise servers, while Sun Microsystems Inc. and Dell Computer Corp. saw their... 10/01/2001
   Enterprise Systems Journal: Available at Northern Light

*SPECIAL COLLECTION*
    *Add to cart*

66%: U.S. Server Markets Down

 More results from this publication

3. IBM Software To Take Advantage Of World's Most Powerful Server – IBM Software O...
   68% - Articles & General info: SOMERS, NY, Oct 04, 2001 (INTERNET WIRE via COMTEX) – IBM announced today its middleware software portfolio will taking full advantage of the company's... 01/04/2001
   Internet Wire (newswire): Available at Northern Light

*SPECIAL COLLECTION*
    *Add to cart*

 More results from this publication

4. Server Market Abuzz --SGI, IBM introduce new models; HP

Vivísimo company | products | solutions | customers | demos | press

Visualization | the Web ▾ | Search ▷ Advanced Search
▷ Help
NEW search the Wikipedia at Clusty.com

Clustered Results

Top 229 results of at least 3,410,651 retrieved for the query Vizualization (Details)

- Visualization (229)
- Graphics (35)
  - VTK, Open source (4)
  - Solutions, Engineers (4)
  - Virtual reality (3)
  - Modeling and rendering (3)
  - International Conferences
    - In Central Europe (2)
  - Real Time, Industry (2)
  - Scs (2)
  - Computer Interaction (2)
  - Art (2)
  - Other Topics (12)
- Scientific (34)
- Data Visualization (29)
- Laboratory (24)
- Solutions (16)
- Tools (16)
- Graph (13)
- Resources B
- Visualization System (10)
- Visualization and Imagery (9)

More

Image Analysis [new window] [preview]     Sponsored Link
300+ operators, Signal Processing, Image Processing, 3D visualization
www.accusoft.com The Art of Visualization [new window] [preview]     Sponsored Link
Using the powers of thought and imagination for major life changes.
www.tut.com/ip.htm 1. OpenDX [new window] [frame] [preview] [clusters]
   Check out this open source 3D visualization utility. Programmers include original image galleries, program features and specifications, and support options.
   www.opendx.org - Lycos 8, Ask Jeeves 8, Open Directory 20, Wisenut 33, Looksmart48, MSN 51

2. Collaborative Visualization [new window] [frame] [preview] [clusters]
   Supporting teachers in transforming science learning to better resemble the authentic practice of science.
   www.covis.nwu.edu - Wisenut 5, Looksmart 10, MSN 58

3. Scientific Visualization Studio [new window] [frame] [preview] [clusters]
   Provides an understanding of science through visualization. Source for global surface temperature anomalies.
   svs.gsfc.nasa.gov - Wisenut 2, MSN 34, Looksmart 45

4. UC Berkeley - Bailando Information Visualization Projects [new window] [frame] [preview] [clusters]
   Explore methods of visualizing abstract information more effectively. Offer tutorials, a course, & material on graphs, tilebars and user interfaces...
   bailando.sims.berkeley.edu/infovis.html - MSN 3, Looksmart 14

5. RasMol [new window] [frame] [preview] [clusters]
   Download free software that allows users to see and animate 3D molecular structures. Check out video clips of molecules in motion.
   www.umass.edu/microbio/rasmol - MSN 10, Ask Jeeves 11, Looksmart 32

6. evil electronic visualization laboratory [new window] [frame] [preview] [clusters]

| Group | Name |
|---|---|
| ⊟ FUJI PHOTO FILM CO LTD | |
| | FUJI PHOTO FILM CO LTD |
| | FUJI PHOTO FILM CO., LTD. |
| | FUJI PHOTO FILM CO., LTD |
| | FUJI PHOTO FILM, CO., LTD. |
| | FUJI PHOTO FILM CO LTD(JP) |
| | FUJI PHOTO FILM CO. |
| | FUJI PHOTO FILM CO. LTD |
| | FUJI PHOTO FILM PHOTO, CO., LTD. |
| | FUJI PHOTO FILM, CO. LTD. |
| | FUJI PHOTO FILM,CO., LTD. |
| | FUJI XEROX CO., LTD. |
| ⊟ KONICA CORP | |
| | KONICA CORP |
| | KONICA CORPORATION |
| | KONICA CORP. |
| | KONICA MINOLTA MEDICAL & GRAPHIC INC |
| | KONICA MINOLTA MEDICAL & GRAPHIC INC. |
| | KONICA MINOLTA HOLDINGS, INC. |
| | KONICA MINOLTA HOLDINGS INC |
| ⊞ EASTMAN KODAK COMPANY | |

| Attributes of patent data | Analogous attributes of academic data |
|---|---|
| Patents | Papers (articles) |
| Patent number | PMID number (PubMed ID number) |
| Filing country? | Journals |
| Title | Title |
| Abstract | Abstract |
| Inventors<br>• Address (City, State, Country) | Authors<br>• Address (City, State, Country) |
| Assignees<br>• Address (City State, Country) | Institutions (Affiliation of the authors)<br>• Address (City, State, Country) |
| Classifications<br>• IPC/USPC/Derwent | Classifications<br>• Medical Subject Headings – MeSH |
| Citations | Citations |
| Dates<br>• Priority date<br>• Filing date<br>• Publication date<br>• Grant date | Dates<br>• No parallel<br>• Submission date<br>• Publication date<br>• Acceptance date |

METHOD FOR PROVIDING A NETWORK GRAPHICAL REPRESENTATION OF DATABASE RECORDS

CROSS-REFERENCE TO RELATED APPLICATIONS

This application is a divisional of U.S. patent application Ser. No. 11/120,423 filed May 3, 2005 and claims the benefit of U.S. Provisional Patent Application Ser. No. 60/567,997 filed May 4, 2004, the entire contents of which is incorporated herein by reference.

FIELD OF THE INVENTION

The present application generally relates to the field of data mining and analysis. More particularly, it relates to methods and systems for presenting related database records in a network graphical representation.

BACKGROUND

"Information age" and "knowledge economy" are just two of the terms commonly used to describe the explosion of digital information that characterizes our era. Whatever you call it, there is no question that the volume of information that is created is growing at unprecedented rates. Numerous attempts have been made to quantify the rate of new knowledge development and have produced various estimates of its exponential growth. Various sources describe and attempt to quantify this information explosion. A few examples of the kind of statistics often cited are:

- Total human knowledge generally doubles every 5-10 years
- Scientific knowledge generally doubles every 3-5 years
- Medical knowledge generally doubles every 2-8 years
- Number of US patents issued has about doubled in the last 7 years
- Approximately 1.5 million pages added to the web each day
- Worldwide production of original content stored digitally in 1999 would take about 635 thousand to 2.1 million terabytes to store Regardless of the reliability of these estimates, they all point to undeniable explosion in new information. Computer technology has made it easier to create and store new information. Both the number and size of the databases used to store this information are growing exponentially.

Despite the rapid growth of available information, human mental capabilities to assimilate and comprehend information have not significantly improved. The explosion of available information and our inability to assimilate it leads to information overload. The vast stores of information make it increasingly difficult to find the right information and even more difficult to make sense of the vast amount of new knowledge that is available.

Workers in the knowledge economy operate in an environment in which they are awash in information but are unable to distill insights. These workers often need to find and understand information related to a specific topic or area of interest so that they can improve their performance and/or decision-making. However, despite the availability of information that could inform and improve their decision-making, there is no practical way to find or assimilate it.

Enormous investments by numerous companies have been made to help information workers find the information "needle" they are seeking in the vast "haystack" of data in which they are searching. The dominant paradigm for information retrieval can be referred to as "Search and Sift". The "Search and Sift" method invariably begins with a Boolean search that returns a large number of matching search results. The searcher then sifts through the results to find the information they are seeking. Internet users and users of other large databases will be very familiar with this method.

The majority of the investment in the field of information retrieval has been focused on improving the "Search and Sift" process. Examples of improvements include:

Query refinement—Query refinement attempts to determine the intent behind the searcher's query and refine the query in order to capture more of the documents that are relevant to the search or to exclude more irrelevant documents from the result set. An example of query refinement is "synonym expansion" in which the query terms are augmented to include synonyms of the search terms in the hope of capturing more relevant documents.

Result ranking—A second means of improving the "search and sift" method is result ranking. Result ranking attempts to order the search results based on their relevance to the searchers intent. Relevance rankings have been estimated in various means including; frequency of use of search terms, location of search terms within the document, and perceived "importance/usefulness" of the documents in the result set. Perhaps the best example of result ranking is Google's page rank metric which is based on the number of other web pages that link to the search result page.

Result filtering—A final example of means to improve the "search and sift" method is result filtering. Result filtering attempts to classify the documents in the result set based on some classification scheme. The hope is that this will allow the searcher to narrow down his/her "sifting" to a subset of the result set that is most closely related to the area of interest. Examples of result filtering include; Northern Light's "results folders" (see, e.g., FIG. 1) which are based on a fixed taxonomy of document classifications, Vivisimo's document clustering tool which classifies documents into a hierarchical tree structure (see, e.g., FIG. 2) based on the semantic content of the documents, and Grokker, which classifies documents into a dynamic hierarchical structure similar to Vivisimo, but also provides a visual display of the relative size of each classification using its "bubble display" (see, e.g., FIG. 3).

All of these methods are useful improvements on the "search and sift" method, however, they all presume a specific type of information need, namely that the searcher is looking for a specific PIECE of information, and that the information being sought can be found WITHIN the documents in the result set. This kind of information retrieval is aimed at finding answers to questions such as:

Who killed Bobby Kennedy?
What is the world's second tallest mountain?
What is the weather forecast for Palo Alto, Calif. tomorrow?
What is the IBM's current stock price?

While the embodiments described herein represent further improvement on the "search and sift" method, their primary contributions are aimed at meeting a different kind of information need. The primary purpose of these embodiments is to assist information users in making sense of search results, or large document sets by providing a means for assimilating the patterns of information AMONG the document in the set. This kind of information is referred to herein as "metadata" because it represents higher level information than is contained in any particular document or record in the database or search result. This kind of information retrieval is aimed at answering questions such as:

How many documents are related to my area of interest, and how quickly is this number growing?
Who are the main authors of information about this topic?
What companies are producing information on this topic?
What is the relationship among companies/authors that are working in this domain?

The described embodiments utilize advanced visualization techniques to reveal the metadata associated with a set of documents or a search result. In order to understand the novel contributions of the present invention, it is useful to review other systems and techniques in this field, in particular within two areas of study; 1) Existing methods of presenting metadata, 2) Visualization methodologies used for understanding large data sets.

Existing Methods of Presenting Metadata

Previous efforts to analyze and present metadata related to large data sets can be divided into a number of categories. A brief description of each and examples of the existing state of the art are provided below for the purpose of differentiating the present invention.

Statistical Analysis

One of the simplest and most widely used means of analyzing sets of documents is statistical analysis. Statistical analysis can be as simple as calculating the number of documents in the set by date, author/inventor, author/inventor affiliation, country, classification, or other attribute. It may also include calculation of statistics relevant to the particular type of data being examined. For instance, in the patent data domain, statistics like number of citations, citations/patent/year, time from filing to grant, age of most recent citation, age of most recent academic citation, and other statistics are sometimes calculated. These statistical methods are employed widely, and are in some instances automated in commercial applications such as those offered by Delphion, Micropatent and CHI Research in the patent space and many others in other domains.

Statistical analysis can provide some useful insight into the set of documents under evaluation, but is clearly limited as to the amount of insight that can be obtained. The best-known tools of this type provide textual reports or simple bar charts showing the number of documents with each attribute value (e.g. How many documents by Company A, Company B, Company C, etc.) or the statistics associated with the overall document set (e.g. Average time from filing to grant). They do not provide information about how the various documents are related to each other, and they do not provide a means for interacting with the metadata in a way that allows the user to explore what the various attributes of the documents reveal about the overall document set. It is an objective of one or more embodiments of the present invention to provide a means for users to understand the relationships among groups of documents and to provide a means for deep exploration into the metadata associated with the document set or search result.

Clustering

Another method used for revealing metadata about large sets of documents is clustering. Various tools have been developed that group documents into clusters. Some of these tools separate documents into clusters based on a fixed taxonomy of categories, while others utilize syntactic information within the documents to cluster them into a dynamic set of categories. Two examples of fixed taxonomy clustering tools are the Northern Light search engine and The Brain's <thebrain.com> web search tool. The fixed taxonomy clustering method is accomplished in one of two ways. First, categories may be based on explicit attributes of the documents. For instance, Internet search results can be divided into categories based on their domain extensions such as ".com", ".net", ".edu", or their country domain such as ".sp", ".ge", ".jp", etc. Secondly, categories may be based on a taxonomy into which documents in the data repository have previously been assigned. This is generally accomplished by manually reviewing documents or the domains under which those documents fall and assigning them to one or more categories within the fixed taxonomy.

A second method of clustering documents or search results is based on the creation of a dynamic taxonomy. These clustering techniques use syntactic data within the documents and then cluster the document set into smaller groups and "name" those groups based on the words or phrases they have in common. The clustering method essentially creates an automated classification schema that can provide insight into the nature of the documents in the set. This technique has been applied to a wide variety of document types and various commercial software applications are available which perform this function. Examples of the use of clustering techniques within the domain of patents includes the Vivisimo and Themescape tools <micropat.com/static/advanced.htm> that are incorporated into Micropatent's Aureka <micropat.com/static/index.htm> tool set and the Text Clustering tools <delphion.com/products/research/products-cluster> available in Delphion's tool set. Vivisimo's tools can be configured to operate on any set of text documents, as can the semantic analysis tools developed by Inxight <inxight.com/products/smartdiscovery>.

Using these clustering tools, basic metadata about a document set or a search result can be presented. The methods employed by the above referenced tools can automatically display the number of documents in the set or search result that fall into each category, making it possible to more quickly "sift" through the results to find the piece of information that is being sought. They also provide some valuable information about the contents of the document set or search result.

The value of the best known clustering tools is limited in two important ways. First, the metadata provided about the contents of the document set is only as good as the taxonomy into which it is clustered. This is an inherent limitation of both fixed and dynamic taxonomy clustering techniques.

Fixed taxonomies are limited in their usefulness by a number of factors:

The taxonomy is based on the priorities of its creator, not the searcher. The creation of a taxonomy entails making choices about what attributes of the information is most important. For example, the first branches in a taxonomy of bird types could be established in multiple possible ways; migratory versus non-migratory, waterfowl versus landfowl, etc. Often, the priorities of the taxonomer are not aligned with the needs of the information user, thus limiting the value of the clustering metadata provided.

Fixed taxonomies can not easily be adjusted as the contents of the database evolve. Once a taxonomy has been established and users have begun using it, it becomes rigid and difficult to change. As the contents evolve, there is inevitably a need to add new categories, sub-divide categories, and recombine categories. This makes it difficult to compare results over time. As an example, consider the taxonomy of technologies created by the WIPO known as the International Patent Classification system (IPC). The IPC is now in it's seventh edition. In each edition, classes were added, moved, sub-divided and eliminated. However, the millions of patent documents that were filed prior to the revision remain classified under the original classification schema that existed at the time they were granted. This makes the presentation of clustering metadata problematic when based on a fixed taxonomy.

Another issue related to fixed taxonomies is that the documents in the data set typically do not fall into a single classification. This creates a classification problem that has typically been solved by assigning the documents into multiple categories within the taxonomy. This multiple-assignment creates a challenge for how to display the clustered results when many documents fall into multiple categories. They typical solutions are to count each document only within a single (primary) classification, or to count the document multiple times, once for each category of classification. Both solutions have problems. The first ignores important information about secondary classifications, and the second represents multiple instances of each document.

The other major limitation of fixed taxonomies is the difficulty in assigning documents to the categories. Typically, this is a manual process that is done either by the author of the document or by a specially trained person or persons who take responsibility for classification. Once again, both options have problems. Author classification suffers from a lack of consistency, while centralized classification is extraordinarily time consuming when large numbers of documents must be classified.

Dynamic taxonomies have been created in order to overcome some of the limitations of fixed taxonomies. However, they have limitations of their own which diminish their usefulness in providing metadata about a large document set. Some of the challenges associated with dynamic taxonomies are described below:

All dynamic taxonomy systems known by the inventors are based on semantic data. Simply put, the classification of documents is based on the similarity of the words contained in the documents. The problem with this is that all languages are extremely imprecise when it comes to expressing ideas. Any classification of documents based on semantic similarity will suffer from both synonymy (multiple words expressing the same meaning) and polysemy (words have multiple meanings). Although there is certainly value in syntactic clustering, the experience of the inventors shows that the clusters created are suggestive of the contents, but far from precise.

A second linguistic issue associated with semantic clustering is multiple languages. Semantic clustering tools completely fail when documents of different languages are included in the data set. As the trend toward globalization continues, this problem will continue to increase in importance. Some attempts have been made to use multilingual thesauri to allow linguistic comparison of multilingual document sets, but this research is still in its infancy.

A final limitation of dynamic taxonomies is the lack of comparability between clusters from one document set or search result and another. Because the taxonomy is created specifically for the document set, no two taxonomies created for different document sets or different search results can be compared.

Dynamic taxonomies also suffer from the multiple classification problem described above.

The second limitation of the clustering technique is that any taxonomy only describes the document set or search result in relation to a single attribute. Most taxonomies are meant to describe the topics or themes of the documents they categorize. While this information is useful, there is no system known by the inventors that allows users to simultaneously make use of clustering information as well as the variety of other available sources of metadata that describes the document set or search result. It is an objective of one or more embodiments of the present invention to provide users with a way to iteratively or simultaneously make use of the information contained in both fixed and dynamic taxonomies as well as a wide variety of other metadata sources in order to provide a deep level of insight about the document set or search result that meets the specific information needs of the user.

Visualization Methodologies Used for Understanding Large Data Sets

The most advanced methods of obtaining insight into the metadata related to large document sets or search results are the visualization techniques. The field of data visualization has progressed rapidly over the last several years as computer processors have become powerful enough to perform the many millions of calculations required to display complex data relationships. A number of data visualization tools are relevant to consider with respect to the present invention. These can be divided into several categories which will be described below. Relevant examples will also be provided for each.

Hierarchical displays—One visualization method which has been employed is the hierarchical display. In its simplest form, documents or search results are represented in the form of a tree structure similar to the directory structure which is a well known metaphor for displaying categorized data. One example of a hierarchical display designed to reveal metadata include Vivisimo's clustering tool described above. Because of the difficulty in displaying and comprehending a large hierarchical structure, several alternative methods have been developed to display these hierarchies. One example is the fisheye lens, which is used to display large hierarchies of patent citations within Micropatent's Aureka tool set. The fisheye display allows users to zoom in on a portion of the hierarchy while still comprehending their position within the overall hierarchy.

Another sophisticated example of a hierarchical display is the Grokker tool developed by Grokis Corporation and described in U.S. Pat. No. 6,879,332B2. Much like the Vivisimo tools, the Grokker tool clusters documents in a hierarchical structure based on a semantic algorithm. Unlike Vivisimo, the Grokker tool presents information to users in a stylized marimekko diagram. The Grokker visualization represents the document set in a two dimensional space with each cluster of documents sized based on the number of documents in the cluster. The space on the screen represents the overall search result. Within this space, clusters of documents are displayed (represented by circles or squares) and labeled based on a common word found within those documents. Within each cluster, are further "sub-clusters", again represented visually and labeled with a keyword. The hierarchy descends until finally the documents themselves are found at the lowest level of the hierarchy.

Each of these leading examples of hierarchical data visualization is based on latent semantic information contained within the documents and as such, suffers from the limitations of semantic analysis as described above in the section describing fixed and dynamic taxonomies.

Spatial visualizations—A second type of visualization used to reveal meta-data within a large document set is the spatial visualization. Spatial visualization uses a map metaphor to arrange document records in a two or three-dimensional space. Although the various spatial visualization tools differ somewhat, those known to the inventors follow a similar methodology for creating a map. This method entails four steps; 1) Calculate a semantic vector for each document—For each document in the dataset, calculate a vector to represent the semantic content of the document (typically based on a histogram of word or concept usage) 2) Create a similarity matrix—using the semantic vectors for each document, calculate a similarity metric for each document pair and thereby create a document similarity matrix. 3) Create a two or three dimensional projection based on the similarity matrix—Using principal component analysis or similar method (e.g. multidimensional scaling), calculate locations for each document in the set such that the distance between documents best reflects the similarity between documents as described by the similarity matrix. and 4) Draw a visualization of the information space—Using the two or three dimensional projection, plot the documents as points within a document space.

Some spatial visualization tools take a further step of overlaying a topographical overlay on the information space to reveal the degree of clustering. Some may even identify and label clustered groups based on words that are common within the cluster.

An example of a spatial visualization tool is the Themescape map, which is part of the patent analysis toolkit developed by Aurigin Systems and is now part of the offering provided by its acquirer The Thomson Corporation through its subsidiary Micropatent. The Themescape visualization tool uses semantic analysis about patent titles, abstracts or full text (at the user's discretion) to create a two dimensional projection of the information space based on the method described above. As is shown in FIG. 4, Themescape uses a map metaphor and overlays a topography over the information space with mountains representing the most highly clustered portions of the information space. Users of the Themescape map can explore the terrain by searching the information space for company names and other keywords or by selecting document clusters to read or export back into a document list for further review or analysis.

The underlying technology for the Themescape tool came from research performed at the Pacific Northwest National Laboratory which also has a spatial visualization tool known as SPIRE (Spatial Paradigm for Information Retrieval and Exploration). As is shown in FIG. 5, Spire has two visualization analogies, one, the "Starfield" shows a plot of documents in three dimensions in a view that looks very much like a starry sky. The second, the "Theme view" is a topographical metaphor very similar to the implementation with Aurigin's Themescape map.

While quite useful in developing a general understanding of the information contained in a large dataset, the spatial visualization tools known to the inventors base their visualization solely on latent semantic information contained within the documents and as such, suffer from the limitations of semantic analysis as described above in the section describing dynamic taxonomies.

Network visualization—The final visualization technique that is sometimes applied to increase understanding of the meta-data associated with large data sets is network visualization. In its simplest form, a network diagram (mathematicians would call this a graph) is simply a set of nodes (typically represented as dots) connected by links (also known as edges or ties). Network graphs are not new, some network concepts date back at least to the ancient Greeks. Social network analysis developed significantly in the 1930s. The development of modern computers with powerful processors has made it possible to create computerized network visualization tools.

The network paradigm is a very valuable method to apply to analysis of large data sets. There are two specific reasons why the network lens is so valuable. First, most visualization tools are designed to draw attention to the entity being analyzed (typically a document, a person or an institution). While network visualizations display information about individual entities as well, they also place significant emphasis on the relationships between and among those entities. The network display shows not just the entities, but the system in which those entities operate. In recent years, various scientific and academic researchers have come to the realization that reductionist analysis, (e.g. analysis that focuses on breaking a problem down into its component parts and thoroughly analyzing each component) is limited. Fields like biology, genetics, ecology, sociology, physics, astronomy, information science and many others have all seen advances based on systems analysis. Systems analysis focuses not on the smallest elements (e.g. genes, atoms—or perhaps quarks, and bits), but on the interactions between and among those elements. The network tool is by its nature a systems visualization tool. It therefore can lead to entirely different kinds of insight and conclusions than can the other visualization tools within the prior art.

A second reason that network visualization tools are appropriate for analyzing large data sets is that networks have the potential to view the same set of information from a variety of viewpoints. Prior art network visualization systems do not take significant advantage of this fact, but networks have the potential to be transformed from one perspective to another, with each perspective providing a different insight about the data being analyzed. The description of the Network Visualization System below will describe how this can be accomplished in order to dramatically improve the insight that can be gained about large and complex datasets.

First however, it is necessary to understand the present state of the art in network visualization and to identify some of the key limitations of the existing tools. A variety of computerized network visualization tools exist, including the following:

aiSee <aisee.com>
Cyram NetMiner—<netminer.com>
GraphVis <graphvis.org>
IKNOW—<spcomm.uiuc.edu/projectsITECLAB/IKNOW/index.html>
InFlow—<orgnet.com/inflow3.html>
Krackplot <andrew.cmu.edu/user/krack/krackplot/krack-index.html>
Otter <caida.org/tools/visualization/otter/>
Pajek <vlado.fmf.uni-lj.si/pub/networks/pajek/>
UCINET &NetDraw <analytictech.com>
Visone <visone.de/>

Each one of these tools is capable of creating a network graph. The more advanced packages (e.g. UCINET/NetDraw, NetMiner) provide a range of visualization capabilities such as Choosing alternative layout algorithms
Displaying multiple node types
Sizing/coloring/selecting shape of nodes based on the value of an attribute
Displaying multiple link types
Sizing/coloring/selecting line type of links based on the type of link All of these tools are general-purpose network visualization tools. In other words, they are designed to display network graphs of any data that is structured in such a way that both the nodes and links of the network are defined. Each of these tools uses a particular (and often unique) file format to capture information about nodes and node attributes, and links and link attributes. Node information is captured through a node list where each node is represented by a node record. Node records contain at least one field which is a unique identifier for that node, but can also contain other attribute fields that provide information about the node. Link information is captured through a link list (or link matrix) which at a minimum identifies which two nodes are linked, but may also capture information like link strength, link direction, and link type.

Although the tools differ in their details, the process of working with them follows a common pattern as in FIG. 6. A user of any of the known prior art systems gathers data from whatever sources are to be utilized. She then chooses a definition of what entity within the data will represent nodes and what information she will use to create links between the nodes. The data must then be formatted to match the particular file structure of the network visualization tool. In all cases, this requires the user to create a list of nodes and a link-list or link-matrix. Once formatted properly, the files of network data can then be input into the network visualization system and analyzed and visualized. The user can work with the data within the tool and select different layout algorithms or display attributes, and analyze the structure of the network using any provided analytical tools.

If the user would like to develop an alternative visualization of the data using a different definition of nodes and/or links, she must start from the beginning, redefine nodes and links, reformat the data into a node and link-list and re-introduce the new files into the visualization system. The system can then display a network graph based on the new definition of nodes and links. Some of the inherent limitations of these prior art systems include the following:

- Database records from any data source can not be visualized because they do not contain node and link information that is usable by the system.
- The process of accessing and formatting data is not integrated into the network visualization tool
- The user must format data into node/link lists to accommodate the system
- The user must select a stable definition of what constitutes a node and what constitutes a link prior to formatting the data for use in the system
- There is no way to change definitions of nodes and links while working within the network visualization system
- If a new node/link definition is chosen, there is no way to combine or connect the network based on the first definition with the network based on the second definition, even though both networks are based on the same underlying data.
- There is no way to specify particularly useful node and link definitions to be used repeatedly with data from a particular source. Each time data from that source is to be visualized, the user must start from the beginning and specify each node and link definition and manipulate the data to accommodate the visualization system.

SUMMARY OF THE INVENTION

In one aspect, a method of providing a network graphical representation of two or more database records includes selecting the two or more database records according to one or more descriptive criteria. Each of the two or more database records are members of a common record class. The method further includes identifying one or more attributes of the record class, and associating network nodes to instances of the one or more attributes from the database records. The method also includes connecting the network nodes with network links that designate network nodes having common instances of the one or more attributes.

The common record class may include patent records from a database, such as a LexisNexis database, a Thomson database, a USPTO database, an EPO database, or a Derwent database.

The common record class may include academic journal articles from a database, such as a PubMed database.

The descriptive criteria may include for example (i) one or more key words within a body field of each of the patent records, (ii) one or more key words within a title field of each of the patent records, (iii) one or more inventors in an inventor field of each of the patent records, (iv) one or more assignees in an assignee field of each of the patent records, (v) one or more key words within an abstract field, or combinations thereof.

The attributes may include for example inventor, assignee, filing date, issue date, IPC code, USPC code, or field of search.

The network links may include a characteristic that describes an amount of common instances occurring between connected nodes. The characteristic may include for example link thickness, link color or link texture.

The network nodes may include meta-nodes, which describes a characteristic of two or more database records.

The method may further include iteratively executing the identifying and connecting steps while modifying the one or more descriptive criteria, so as to change the selected two or more database records. The one or more descriptive criteria may include for example a range of dates.

The method may further include selecting additional database records from a record class other than the common record class of patent records, and associating network nodes, network links, or both, to instances of one or more attributes from the additional database records. The other record class may describe for example licensing history associated with the patent records, litigation history associated with the patent records or maintenance fee history associated with the patent records.

In another aspect, a method of providing a network graphical representation of two or more database record includes selecting the two or more database records according to one or more descriptive criteria. The method further includes identifying two or more common attributes of the database records, and associating network nodes to instances of a first one of the common attributes from the database records. The method also includes connecting the network nodes with network links that designate network nodes having common instances of one of the two or more common attributes, so as to form a first network graphical representation. The method further includes transforming the first network graphical representation into a second network graphical representation by associating the network nodes to instances of a second one of the common attributes from the database records, and connecting the network nodes with network links that designate network nodes having common instances of the second attribute.

In another aspect, a method of providing a network graphical representation of two or more database records includes selecting the two or more database records according to one or more descriptive criteria. The method further includes identifying two or more common attributes of the database records, associating a first set of network nodes to instances of a first one of the common attributes from the database records, and associating a second set of network nodes to instances of a second one of the common attributes from the database records. The method also includes connecting one or more members of the first set of network nodes to one or more members of the second set of network nodes with network links that designate associations between the network nodes, so as to form a first network graphical representation.

In another aspect, a method of providing a network graphical representation of two or more database records includes selecting the two or more database records according to one or more descriptive criteria. The method further includes identifying two or more common attributes of the database records, associating a first set of network nodes to instances of a first one of the common attributes from the database records, and associating a second set of network nodes to instances of a second one of the common attributes from the database records. The method also includes containing the second set of network nodes presented in a network configuration, within one or more of the first set of network nodes presented in a network configuration. Each of the second set of network nodes shares a common attribute instance with the network nodes of the first attribute within which the second set of network nodes is contained. The method may further includes associating a third set of network nodes with a third one of the common attributes of the database records, containing the third set of network nodes presented in a network configuration, within one or more of the second set of network nodes presented in a network configuration. Each of the third set of network nodes shares a common attribute instance with the network node of the second attribute within which the third set of network nodes is contained. The method may further include associating one or more additional sets of network nodes with other ones of the common attributes from the database records, and grouping one or more members of the additional sets of network nodes within other network nodes, such that each group of network node members is characterized by the attribute associated with the grouping network node.

In another aspect, a Network Visualization System includes a computer readable medium with stored instructions adapted for providing a network graphical representation of two or more database records. The stored instructions implement the steps of the one or more methods described herein.

BRIEF DESCRIPTION OF THE DRAWINGS

FIG. 1 shows one prior art example of a graphical representation generated using result filtering.

FIG. 2 shows another prior art example of a graphical representation generated using result filtering.

FIG. 19A shows the results of grouping multiple assignee names under a single assignee name that represents the group FIG. 20 shows the relationships between attributes of patent data and attributes of academic literature.

DETAILED DESCRIPTION

Figure 3:
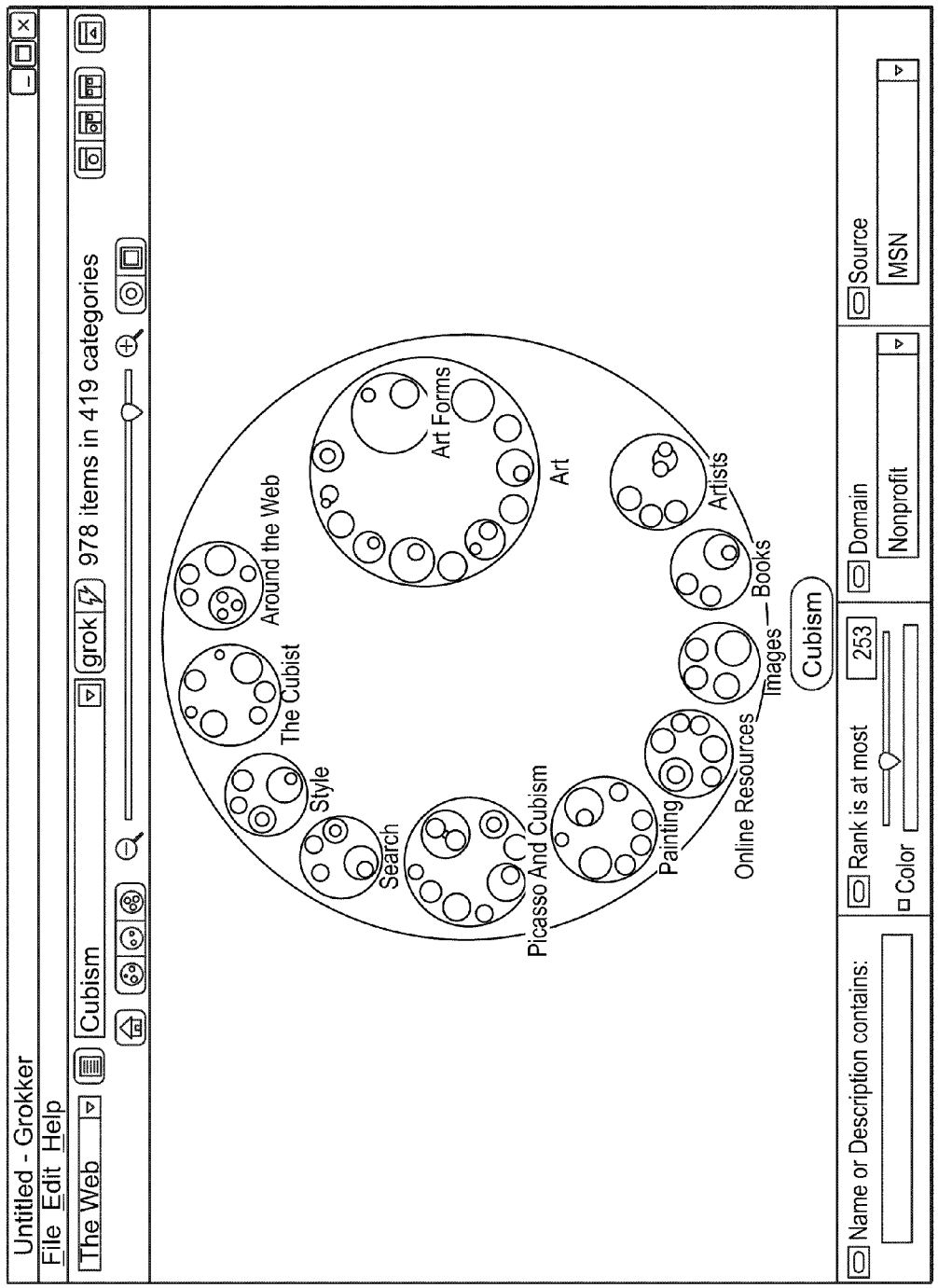
FIG. 3. shows yet another prior art example of a graphical representation generated using result filtering.
Figure 4:
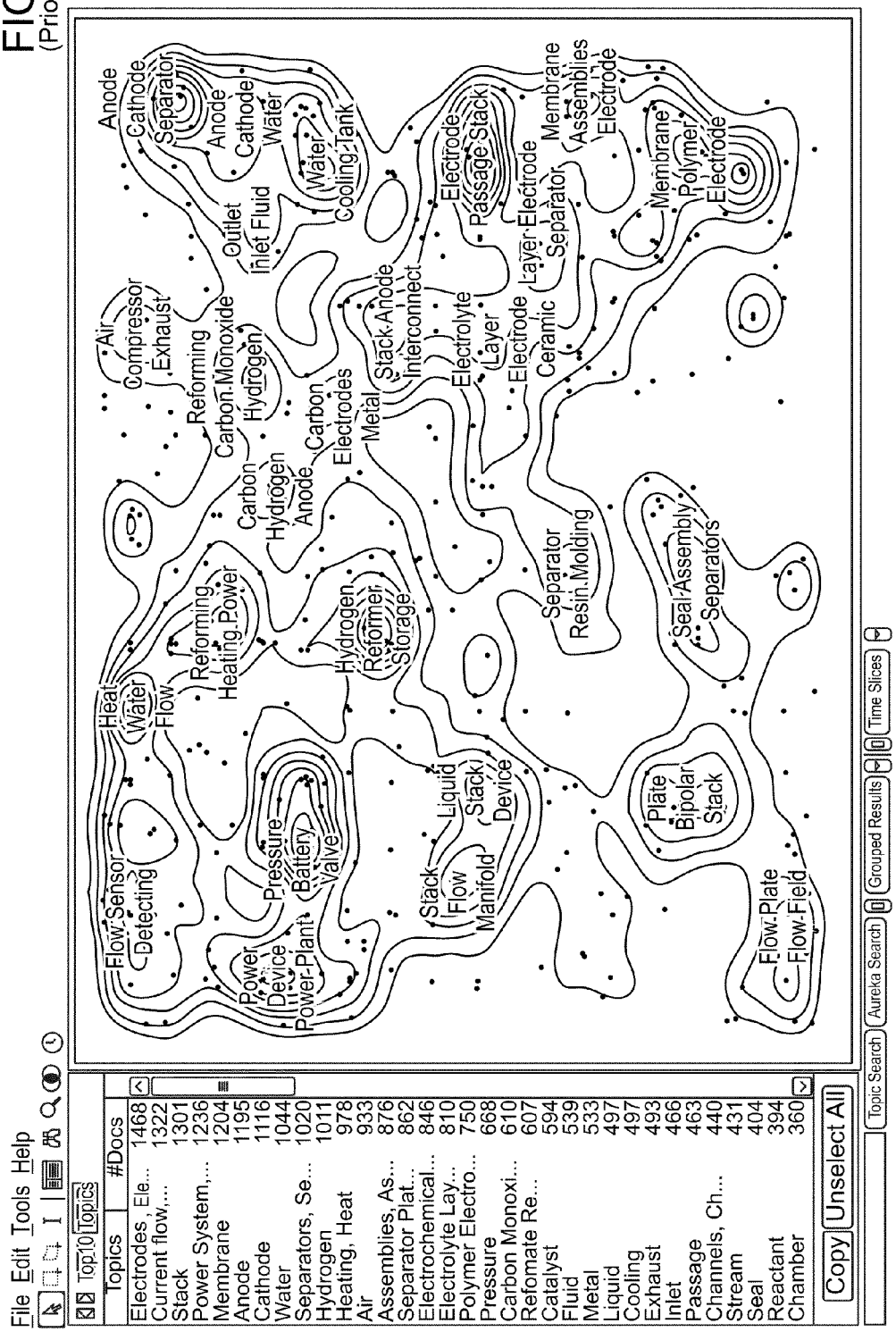
FIG. 4. shows a prior art example of a spatial visualization tool.
Figure 5:
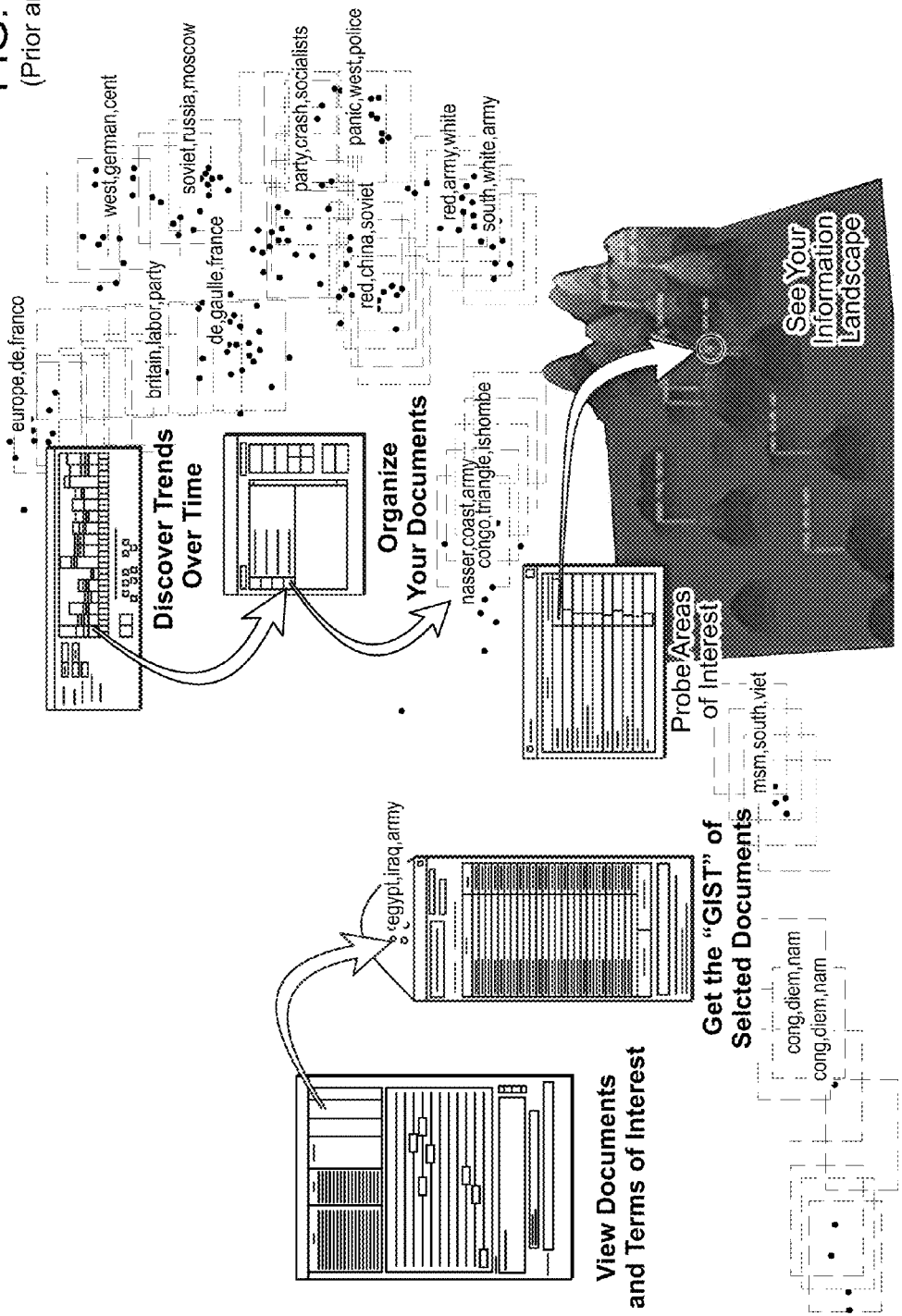
FIG. 5 shows another prior art example of a spatial visualization tool.
Figure 6:
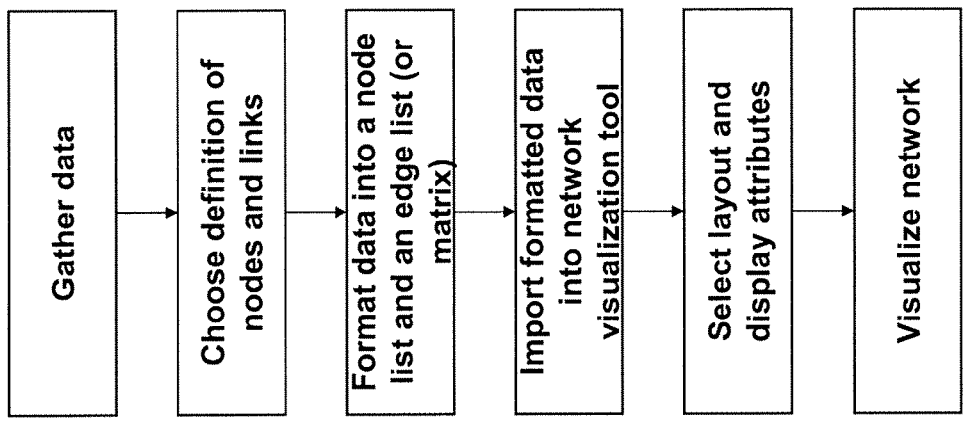
FIG. 6 shows a common process of working with prior art visualization tools.

As used in the embodiments described herein, a Network Visualization System (NVS) is a system and/or method for making sense of sets of related database records or documents by providing a network graphical representation of the database records. These methods and/or systems can be applied to any database with records where a relationship can be established between and among the records. Examples of some domains in which the NVS can be applied include, but are not limited to, patent documents, academic articles/papers/journals, medical/scientific articles/papers/journals, literature, web pages, corporate databases of customers/products/suppliers/sales, corporate knowledge management databases, retail databases, government databases of census information/economic data/etc, organization databases of membership/subscribers/organizational affiliation and many others. In fact, any information that is or can be structured as a table of information with two or more fields of information can be visualized as a network using the invention.

An important insight is that database records/documents are related to each other by various attributes that can be represented as a network. The kind of attributes that can be used to create a linkage relationship among records/documents can include, but are not limited to, citation links (e.g. documents A and B are linked because document A cites document B), co-citation links (e.g. documents A and B are linked because document C cites both document A and B), bibliographic coupling (e.g. documents A and B are linked because document A and B both cite document C), common authorship, common affiliation (assignee, company, journal, etc.), common classification within some static or dynamic taxonomy, common keywords, semantic similarity, and many other possible links. These linkages make it possible to represent a set of database records or documents as a network that enables the use of various network statistics and visualization tools to help the user make sense of the selected information.

Each database record is characterized by specific instances of these attributes. For example, for an attribute of "inventorship" in a patent database records, an "instance" of that attribute might be "John Smith," i.e., a particular inventor. So for example, two patents sharing the same instance "John Smith" of the attribute "inventor", can be considered linked, and therefore visualized as part of a network.

A detailed description of the NVS is set forth below, which describes a method for converting database information or documents into network information and then describes a method for creating multiple visualizations of the network. Further disclosed are two selected examples of applications of the NVS to specific databases: the patent database and medical journal databases. It should be understood that these are only exemplary embodiments, and those skilled in the art will understand that the specific methods described in each can be applied to the others, as well as to any other database with records/documents where a relationship between documents can be established via various linkage types as described below.

The dominant visualization paradigm in the NVS is the network. A network is a collection of objects that are in some way connected to each other. It is common to visually represent a network using a "graph". A network graph is a visual representation in which each object in the network is represented by an icon or emblem known as a node and each connection between the objects is represented as a link (also known as an edge or tie) that visually connects the nodes. These nodes and links can be laid out in such a way as to provide a visual representation of the relationships among the various objects in the network.

Finding an appropriate way to lay out a network graph to reveal the relationships among the objects is not a trivial task. Graph theory and network layout algorithms are well-established areas of research. Various layout algorithms have been developed to create useful visual representations of a network. It is not an intention of the Network Visualization System to improve upon existing graph layout methods. In accordance with various embodiments of the NVS, any network layout method can be utilized as a way to visualize the various important attributes of a large set of related patent documents or database records. The NVS, makes use of existing layout algorithms in order to display network graphs of a set or database records or related documents.

The network paradigm has been chosen as a basis for visualization because one of the key attributes to be understood about a large set of documents/database records is the relationship or relationships that exist among and between them. Network visualization by its nature is designed to reveal relationships and is therefore a very useful tool in understanding large document sets.

Acquisition of Data

The first step in utilizing the NVS is to acquire the documents/database records to be examined. Several means can be employed to access a set of document/database records for analysis. Data that is stored in an electronic data repository (either within the same computer system or in one or more remote onsite or offsite servers) can be accessed by the NVS in its entirety, or as a subset of records. This can be accomplished by electronically submitting a user query based on one or more descriptive criteria via a computer implemented or assisted search. The query can submitted using normal, well-established Boolean syntax, and may be performed by searching for user specified terms within one or more fields of the database records or within the entire "full text" of the database record. The entirety of the data or the query result can then be analyzed and visualized by the Network Visualization System. In one embodiment, the database records within the electronic data repository are all members of a common record class, such as patents from the USPTO, EPO, Aureka, Micropatent, Thomson, Lexis Nexis or Derwent database, or academic journal articles contained in one of the many academic, scientific, engineering or medical document databases like for example, the PubMed database. In other embodiments, the database records are members of two or more record classes.

Data that is not stored in electronic data-repositories can also be analyzed by the NVS, however, the data must first be converted into an electronic format through data entry, OCR (optical character recognition), or other appropriate techniques. Once the data is converted into electronic form, it can then be analyzed as any other database using the NVS.

Transforming Database Records into Network Data

The data extracted from the data repository as described above is merely a set of records. This data would not be considered "network" data by any known network visualization tool within the prior art. This is because it is not structured as a node list and a link list (or matrix). The data is simply a collection of records with each record having two or more fields that represent attributes of the record. For example, a corporate customer database might have fields for customer ID, name, street address, city, state, zip, country, telephone number, e-mail address, and many others. While this data is useful as a node list where each record is viewed as a node, there is no link list, so the data cannot be represented as a network graph.

Figure 7:
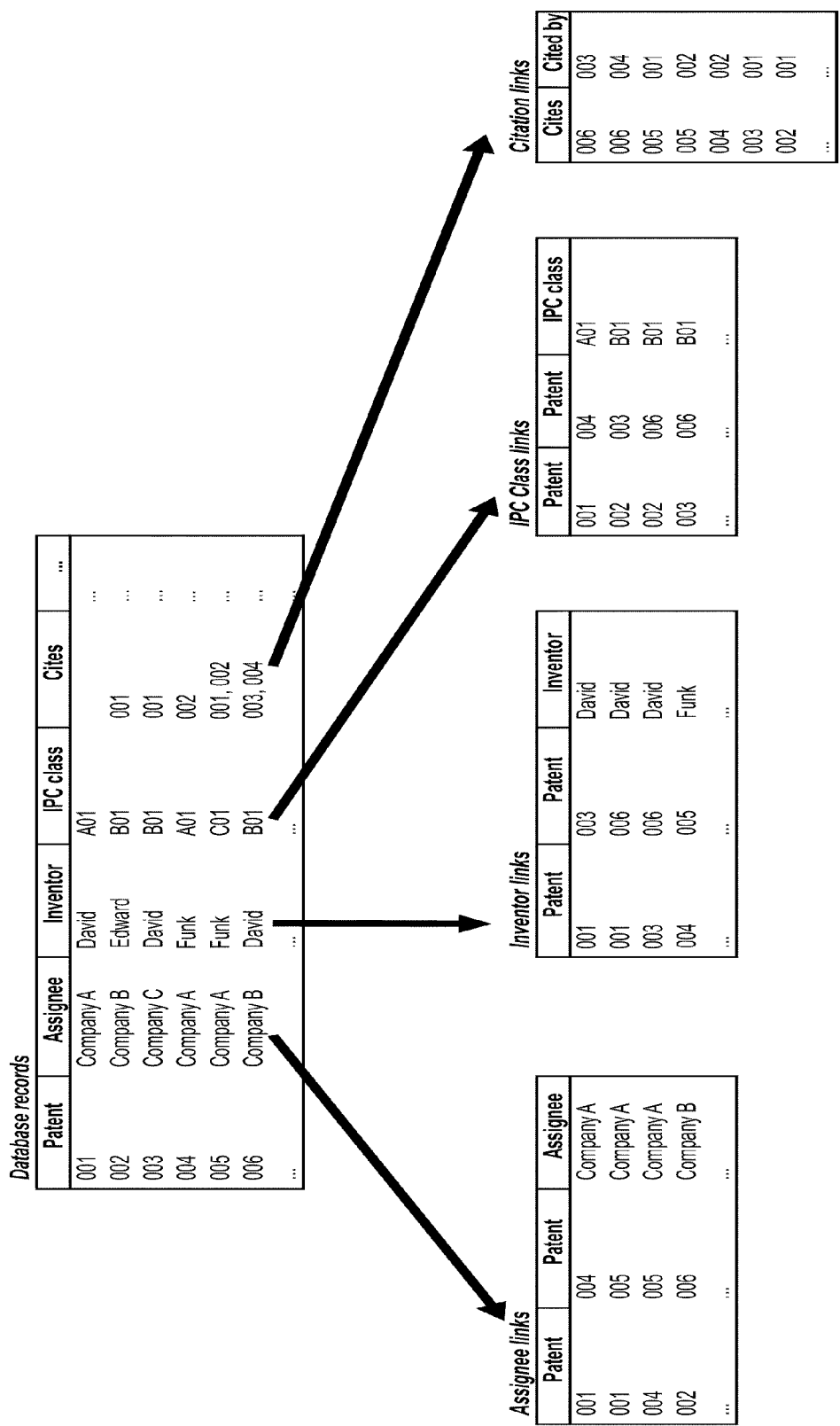
FIG. 7 shows how database records can be converted to link data in a described embodiment.

The Network Visualization System converts this data into network data by creating a link list for each record-linking attribute. This is accomplished by creating a link between each record that shares a common attribute value. The chart shown in FIG. 7 provides a simplified example of how database records can be converted to link data.

In this example, we use a very simplified set of patent database records. For attributes like Assignee or Inventor, links are created for each pairing of records that share the same attribute value. These links do not have directionality as they are simply based on co-occurrence of attributes values. Citation links, if provided as a list, must be parsed (in this case based on comma delimiting) and then directional links assigned between citing and cited patents as shown in the example.

This method can be used to convert any set of database records into network data where the original records are the node list and the link lists are created based on common instances of one or more attributes as described above. Once the database records have been converted into network data, the NVS allows the user to visualize the network.

Basic Database Networks

Figure 8:
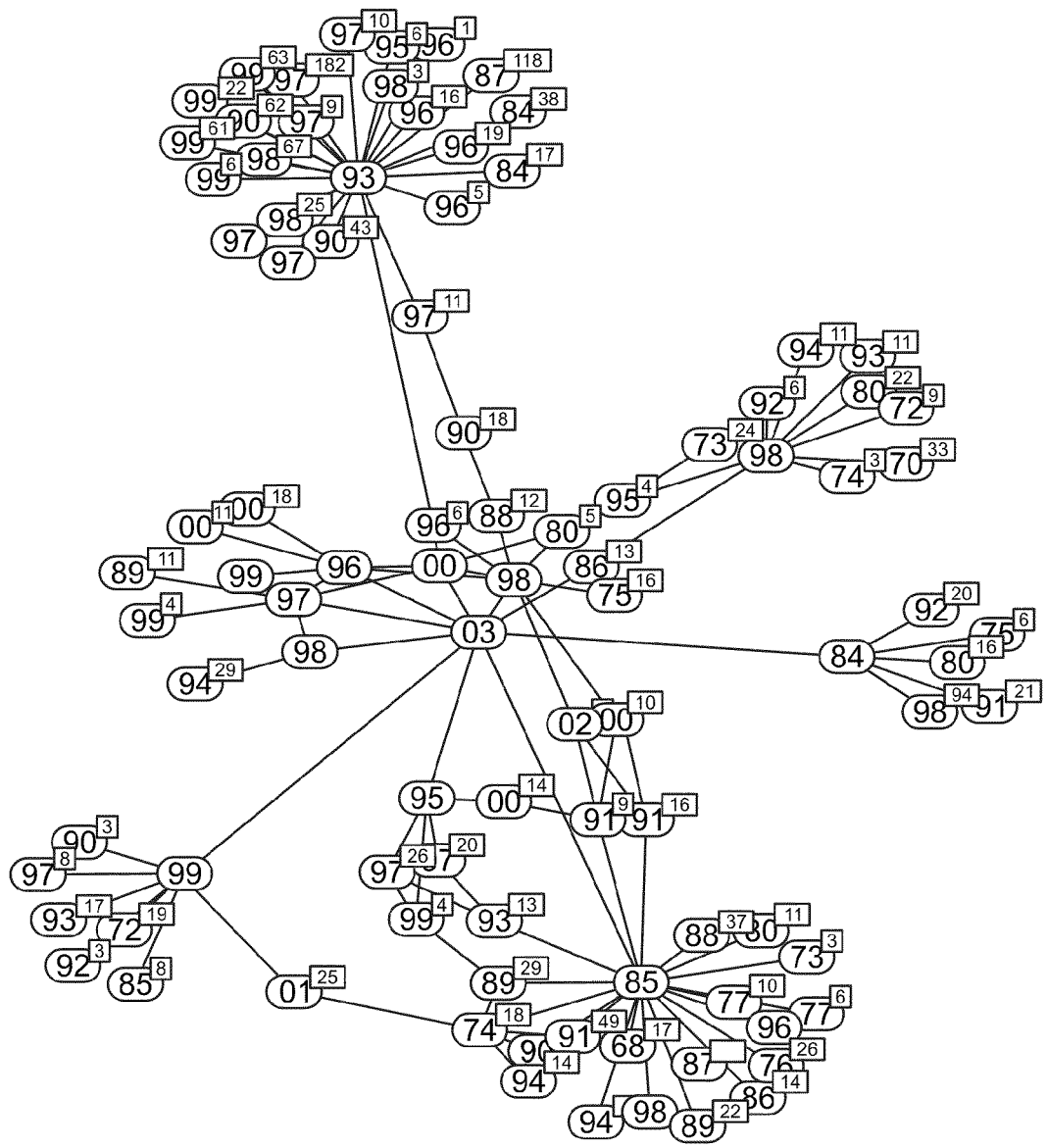
FIG. 8 shows a simple network diagram based on a small number of database records.

In a basic database network, each record can be represented by a node and the nodes can be connected to each other by links that represent one or more of the various types of linkages described above. FIG. 8 shows a very simple network diagram based on a small number of database records.

Representing nodes—Nodes can be displayed as a basic shape (e.g., a circle, oval, square, rectangle, etc.) or an icon (e.g. a picture of a document). The color of the nodes can be changed to represent some attribute of the nodes. The node can also be labeled with text that identifies the record or displays one or more attributes of the database record. As a practical matter, long node labels tend to make the network display unwieldy. The NVS addresses this issue in several ways. First, multiple options are provided to the user for how much of the desired attribute value to display within the node. Options include: Full (the entire value), Short (the first word or first "n" characters), Point (two digit year only) and None (no label). The problem is further addressed by allowing the user to see the full node label whenever they point to, or select a node (using an electronic pointing device such as a mouse or trackball).

Representing links—Links can be represented by a line or an arrow. See, for example, FIG. 9. The display of the links can be made to reveal the direction of the linkage by attaching an arrow head, using a triangular shape with the apex pointing toward the cited document, or by using different colors or line styles (e.g. dotted, solid) to represent forward and backward citations. Furthermore, the strength of the connection between nodes can be visually depicted by varying the thickness of the line or by altering its color or style. The strength of the link can also be depicted by displaying a value associated with each link's strength close to the link on the network diagram. Various types of links between nodes can be established as described above.

As a practical matter, when multiple links connect the same two nodes, it is difficult for the user to differentiate the various ways in which the two nodes are related. The NVS resolves this problem in a number of ways. First, different link types are displayed so that they are visually different. This is accomplished by showing the different link types with different colors, line styles (e.g. dotted, solid, dashed), line thickness, etc. The multiple links between the nodes are aligned side by side so that multiple link types can be displayed without overlapping.

Figure 9:
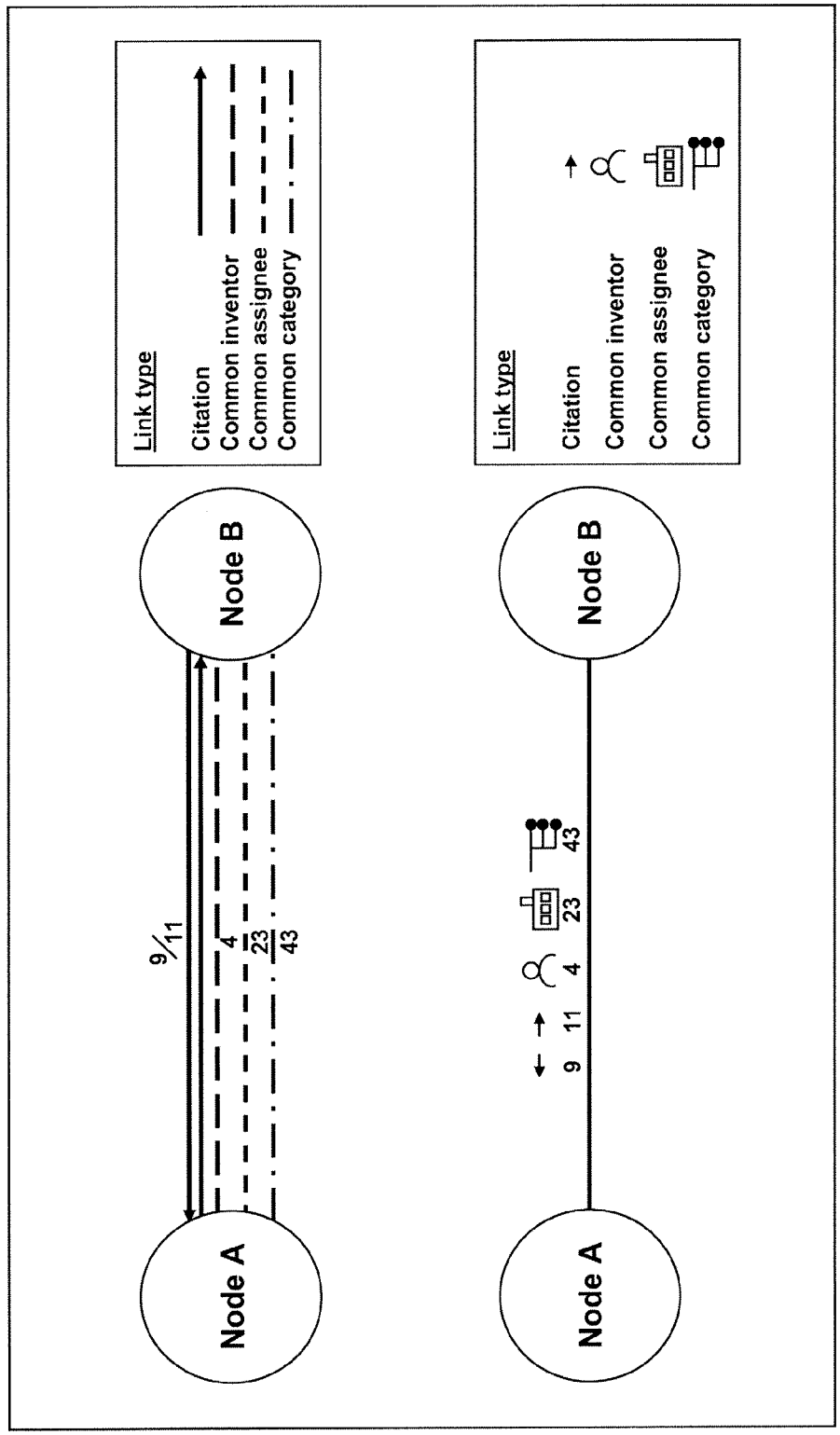
FIG. 9 shows network link representation in one described embodiment.

Another technique for resolving the problem of multiple link types is to collapse the links into a single "composite link," and to attach icons to the link that show the different types of links and strength of the ties. FIG. 9 shows an example of how multiple link types can be collapsed into a single link with icons.

The strength of this composite link between the two nodes can be calculated in a number of ways. It can be based on simply the number of links, the sum of the strengths of the combined links, or a weighted average of the combined links. If a weighted average is used, the weighting factors can be chosen based on an estimation of the relative importance of each link type.

Another feature of the NVS is that the user is provided with a means for selecting which link types are active or inactive, and which are visible or invisible. By way of definition, "active" links are those links that affect the layout of the network graph. In other words, they have a force (like a spring or elastic band) which draws the linked nodes together. However, not all active links need to be displayed in the visualization. When a network is highly clustered (i.e., there is a high concentration of links) or multiple link types are used simultaneously, the network graph may become cluttered with links. By allowing the user to make links invisible, it allows the user to remove the links from the graph diagram while continuing to have those links effect the graph layout.

Navigating the network—The NVS provides several means for navigating the network including, but not limited to:

Selecting the radius around a node—One way to navigate the network is to choose the "radius" around a selected node. In this context, radius is the number of links between the selected node and another node. For example, if the radius is set to three, all of the documents that can be reached by less than three links from the selected document will be displayed in the network graph.

Expand—The network can be expanded to add additional nodes to the network graph. The user can, e.g., select one or more nodes (which represent documents or database records) and choose "Expand", and all the nodes that can be reached via a single link from that/those nodes (but are not yet visible) are added to the network graph.

Contract—The network can be contracted to remove nodes from the network graph. The user can for example select one or more nodes (which represent documents or database records) and choose "Contract", and all the nodes that can be reached in a single link from that/those nodes and are not in any other way linked to the network are removed from the network graph.

Hide—Nodes can be hidden from the network graph. By selecting one or more nodes and selecting "Hide", the selected nodes are removed from the network graph.

Filtering the Network—

Another useful feature of the NVS is the ability to filter the nodes that are represented within the network. This can be accomplished in several ways.

1) A filter can be applied by specifying the minimum, maximum or range of values of an attribute of the patent documents to be displayed. For instance, the documents can be filtered to represent only those records that meet a particular set of criteria such as:

Dated before or after a particular date

Only display nodes where a particular attribute appears more or less than some specified minimum number of times within the record set (e.g. Only display document nodes for authors who have at least 5 documents in the dataset)

2) A filter can be applied by specifying values of node attributes to be displayed. For instance, the documents can be filtered to represent only those documents:

Related to one or more companies

Written by a particular set of one or more authors

Classified within a particular set of one or more topics based on some fixed or dynamic taxonomy 3) A filter can be applied by providing the user with a list of attribute values and allowing the user to select or deselect attribute values to be displayed.

4) A filter can be applied by providing the user with a means to select one or more nodes from the network visualization using a computer pointing device (such as a mouse or trackball) and choosing a command from a menu that designates that the selected nodes should be filtered.

By using these filtering methods individually, or in combination, it is possible for a user to dynamically filter a dataset to display only the documents that are of interest. For example, a user could specify that she wanted to see only documents by Companies A, B, and C published between the years 1999 and 2005 that were classified with the categories A1, C3 and D5.

This capability is important for two reasons: 1) it allows the user to move back and forth between different subsets of documents within the dataset, and 2) it enables the user to refine their query to eliminate documents which are not of interest to them.

Figure 10:
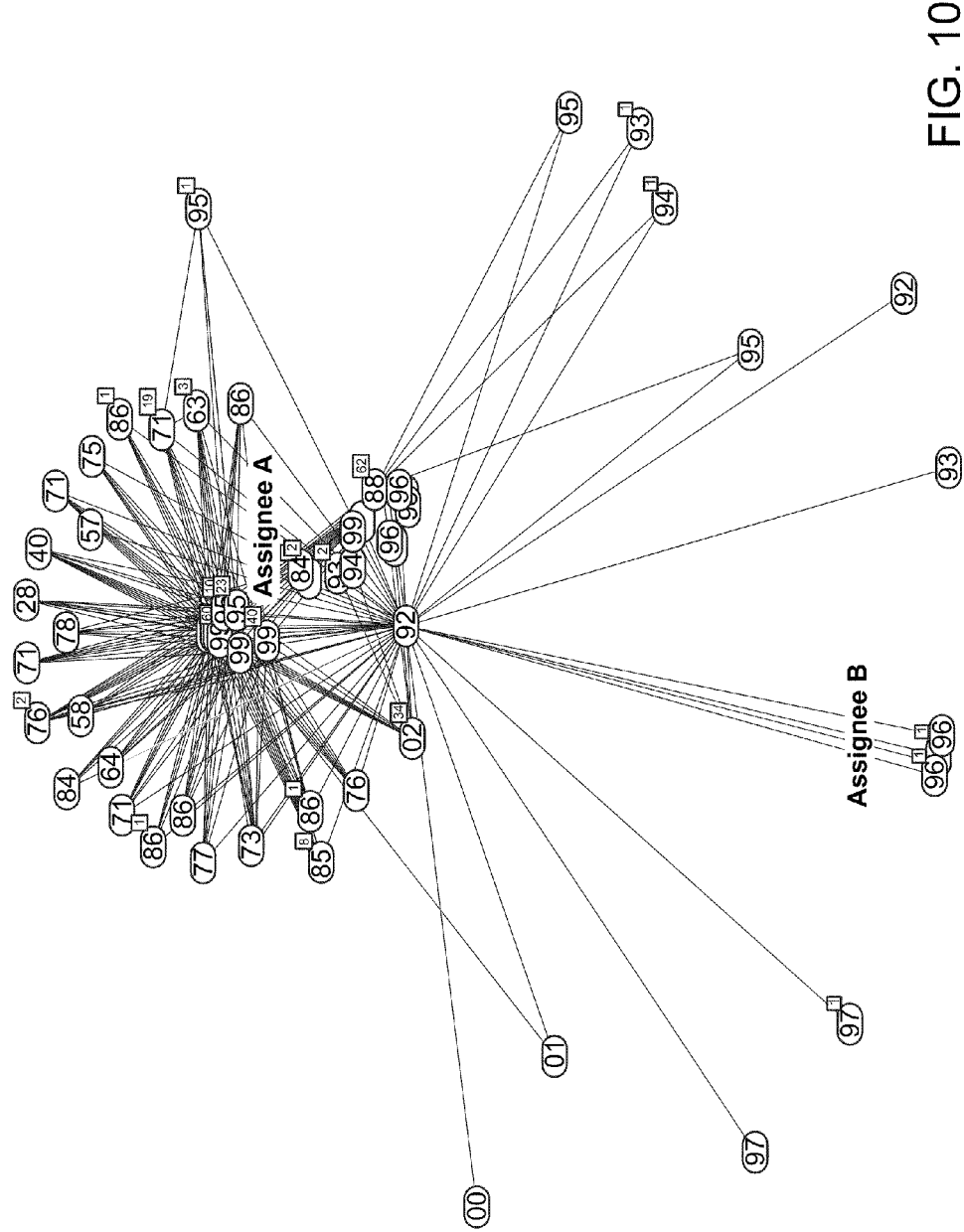
FIG. 10 shows a simple network of patent documents where the documents with the same assignee are clustered together.

Clustering by attribute—Another method of revealing different kinds of relationships among documents in the network is to cluster them based on their attributes. One way to accomplish this is to place additional links between nodes that share a particular attribute value. For example, all patents with the same assignee can be linked to each other by additional links so that they will be attracted to each other and form a cluster. FIG. 10 shows a simple network of patent documents where the documents with the same assignee are clustered together. Alternatively, an additional node can be introduced to the graph that represents the attribute value with each node having that value linked to the new node. This effectively draws all of these nodes into a cluster. Note that it is not necessary to display this new "attribute node" or the links between the attribute node and other nodes within the visualization.

Identifying natural clusters within the network—A network of linked documents will naturally have areas that are more highly clustered or tightly grouped than other areas in the network. "Degree of clustering" is a term of art within the field of social networking, and well known statistical methods exist for determining the degree of clustering within a part or the entirety of a network. These clusters can be identified using techniques developed as part of the Social Network Analysis field. Various techniques to identify clusters exist. It is not the purpose of the NVS to improve upon the known clustering techniques, however, the NVS makes use of various clustering techniques to identify related groups of patents in order to provide insight into the nature of a large set of documents.

Once the clusters have been identified, they can be labeled. One method of labeling is to identify words that are found in all or many of the titles and abstracts of the documents falling in a cluster. By stringing together the top several words (typically 1-5), a label can be created for each cluster. This label can provide a signal to the user about the content of each cluster. Since the listing of most frequently used words in the cluster is not likely to be the ideal cluster label, it is practical to provide the user to with a means to change the cluster label to a more meaningful set of words.

Chronological Network Graphs—

Figure 11:
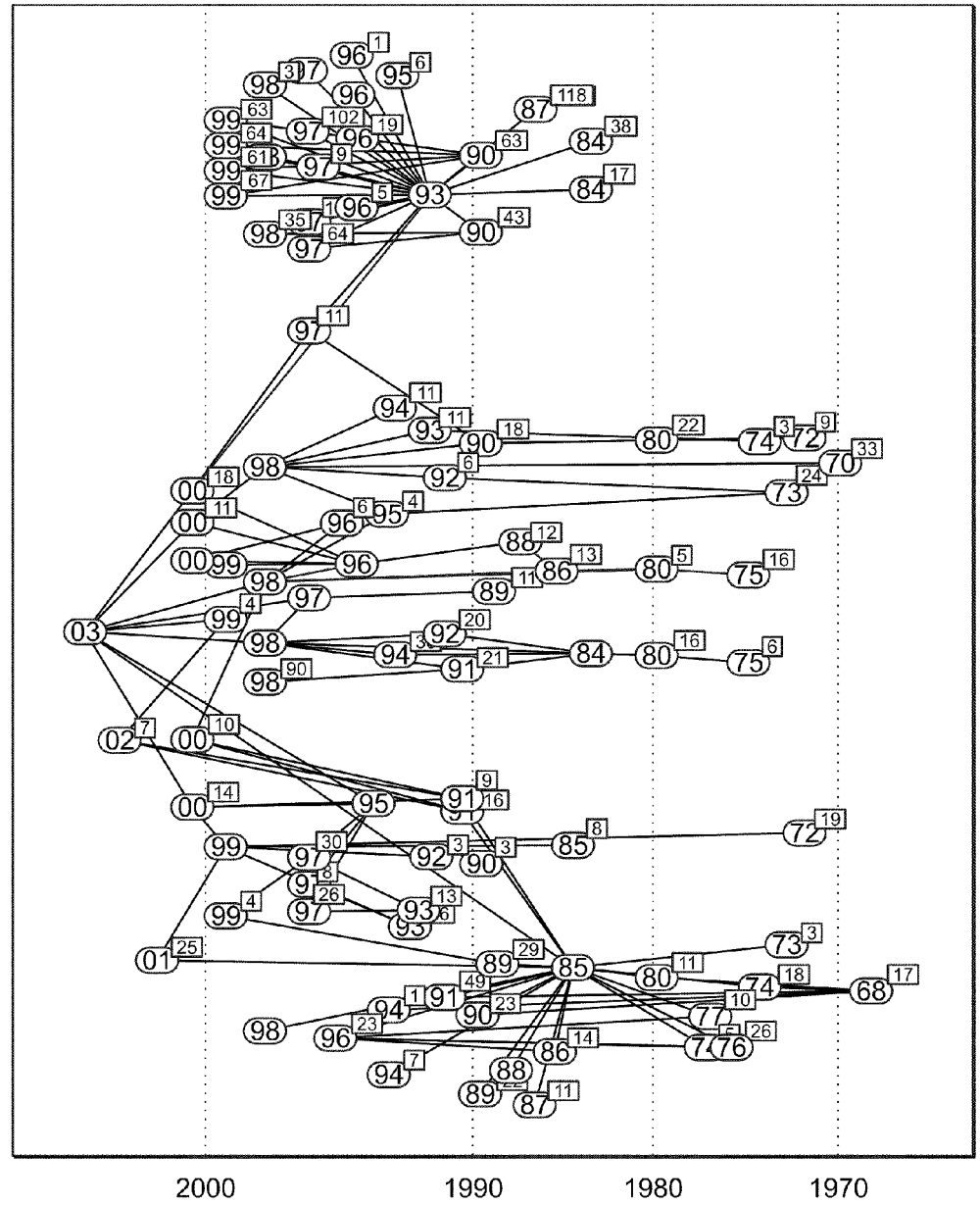
FIG. 11 shows an example of a chronological network graph for one described embodiment.

Another way of revealing information about a set of documents is to display the network graph in such a way that the nodes are sorted by date. Dates used could be any date associated with the document or database record. For example, patent documents have many dates associated with them; priority date, application date, publication date, grant date, expiration date as well as other dates. For example, the network graph can place all of the oldest documents on the left side of the graph and the newest documents can be placed on the right (or vice versa). A timeline can be placed alongside the graph to show the progression of technological development over time. Alternatively, the background of the network layout can be divided into segments by year, decade, or some other time division and labeled with the documents falling into that range appearing in the appropriate segment. FIG. 11 shows one example of such a chronological network graph.

Other Gradients—

Networks can also be displayed along any number of other gradients other than time. Any attribute of the nodes or meta-nodes that is quantitative (or can be made quantitative) can be used as a gradient on which to display the network visualization. One simple example of an alternative gradient is a network of customer data sorted by the annual spending of customers.

Transforming the Network Using "Meta-Nodes"

One of the central novel features of the embodiments described herein is the ability to transform the network representation. Prior art network visualization tools maintain a fixed, stable definition of what is a node and what is a link. For example, if data on a set of patent documents is introduced into one of the prior art network visualization tools, it is necessary to precisely define what is a node and what is a link. If, for example, you choose to have each patent represented as a node, and co-inventorship represent links, then the visualization tool will maintain that node/link definition without variation during the period of analysis. The NVS is fundamentally different in that it enables the user to transform the network by redefining the definition of what is a node and what is a link as they use the data.

The Network Visualization System operates on the principle that any attribute of a database record can be represented as a node, a link, or both. As a simple example, if conference organizer had a list of the various conference workshops and the attendees for each workshop, she could visualize them as a network of workshops linked by common attendees, but she could just as readily visualize them as a network of attendees linked by the workshops they attended together.

Figure 12:
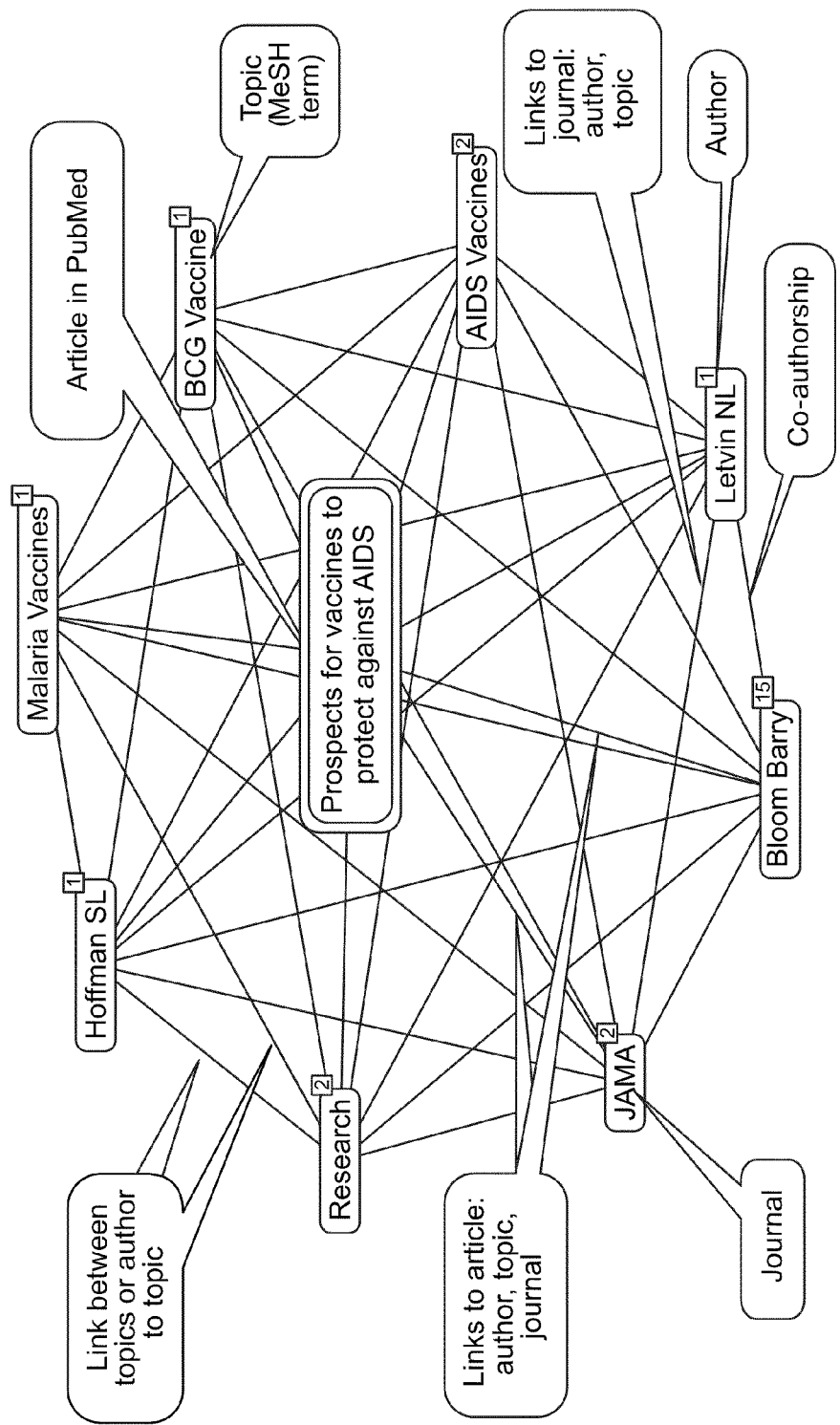
FIG. 12 shows a network generated by one described embodiment that represents a single article from the PubMed database.

To take the point to its extreme, even a single database record can be viewed as a network with each attribute represented by a node and with the various attributes linked based on other common attributes. FIG. 12 shows a rather complex network that represents a single article from the PubMed database. The central node represents the article itself, while the various attributes of that article are represented by other nodes and connected to each other based on links such as co-authorship links, and other co-occurrence links because the attributes both occurred on the selected article.

The Network Visualization system not only converts database information into network information, but it allows the user to create her own node and link definitions, combine any number of nodes and links on a single network, and change those definitions at will during the period of analysis. Under previously known methods, it is not possible to transform a network visualization in this way.

The ability to create alternative node definitions is a powerful tool for simplifying a network display and developing insight about the dataset. By redefining the nodes and links in the network display, the user can focus her attention on the entity of her interest. For example, a researcher analyzing patent data can focus on companies, industries or inventors rather than patents. These nodes represent higher-level entities than nodes that represent single documents or database records. We call these higher-level nodes "meta-nodes," because they represent groups of documents or database records rather than single records. Links between these meta-nodes we call "meta-links", because they represent an aggregation of the links between the collections of documents or database records represented by the meta-nodes. This ability to abstract the network to a "meta-level", enables the user to answer questions and inform decisions at a higher level than is possible using any other known visualization method.

Figure 13:
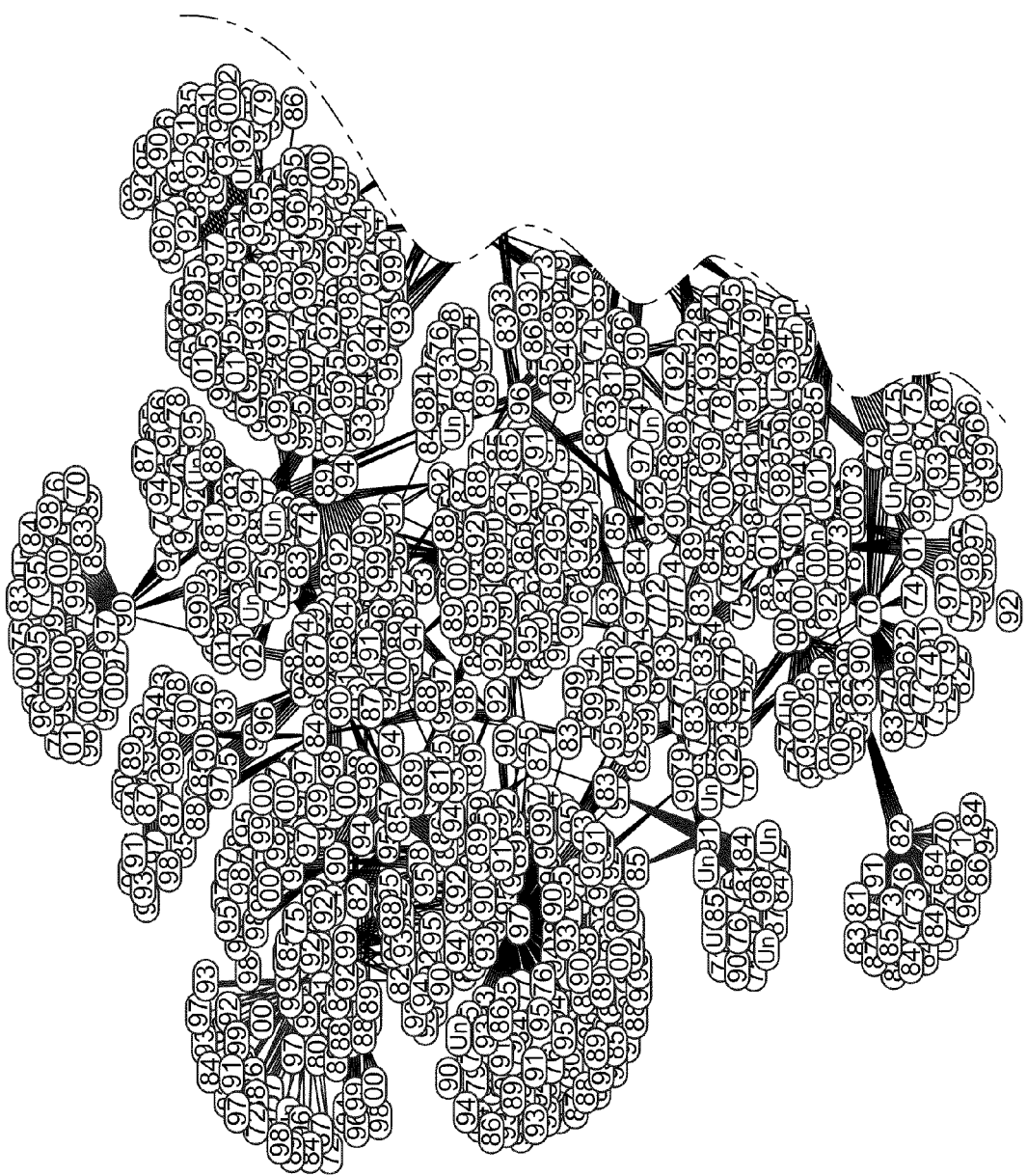
FIG. 13 shows a network generated by one described embodiment without using meta-nodes.
Figure 13:
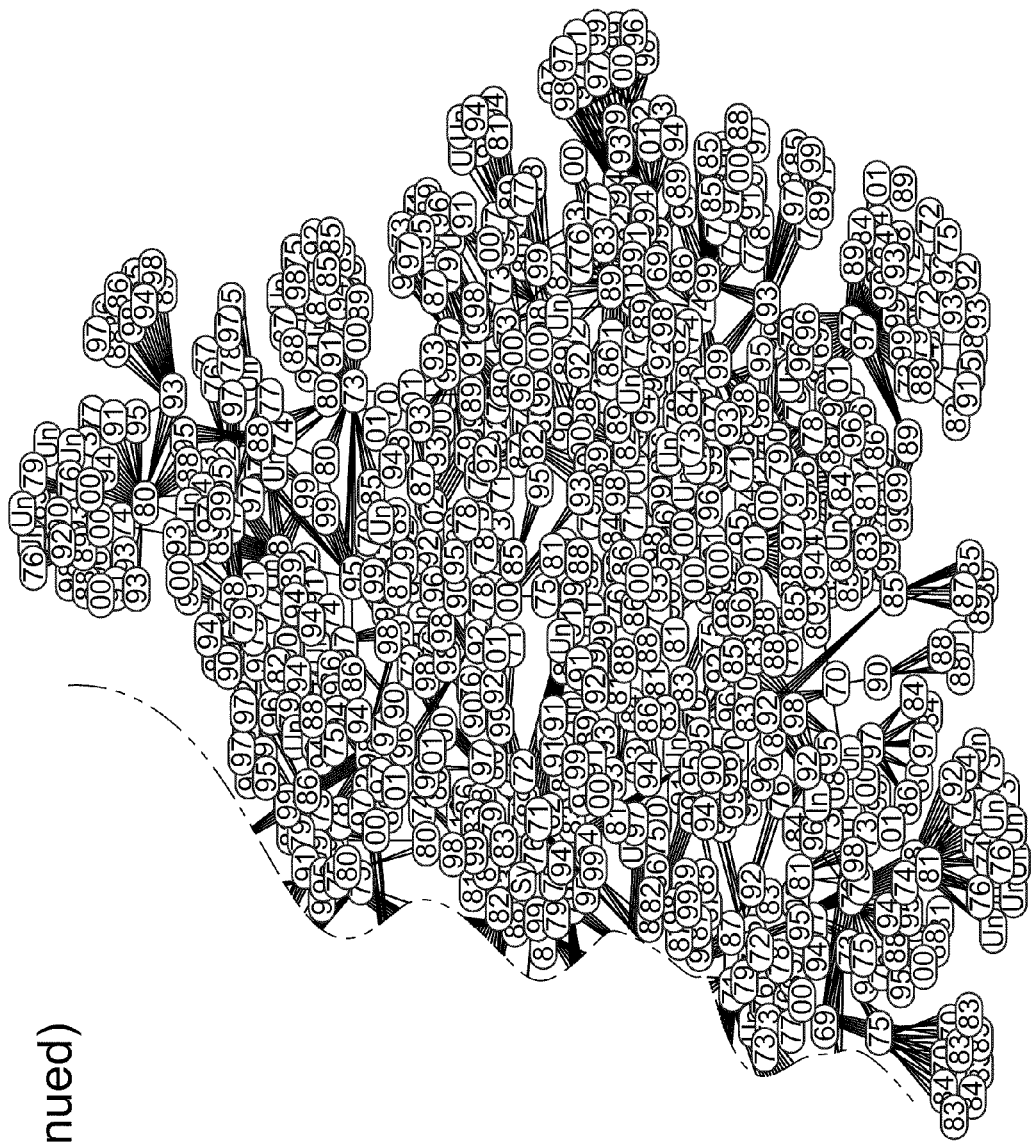

The power of the network transformation method can be demonstrated with an example. Imagine a complex network of >1,000 patent documents in which the nodes are patent documents and the links are citation linkages. The network graph might look something like the picture in FIG. 13.

It is difficult to determine what is to be understood from this network graph. However, if you transform the network by redefining the definition of the node so that each node is a company, you end up with a network diagram like the one shown in FIG. 14.

This network diagram of patent documents, related to a particular photographic technology, makes it easy to identify the leading companies in the technology domain and understand the connections between them. By transforming the network diagram, it has been greatly simplified, and can therefore enable greater insight.

Figure 15:
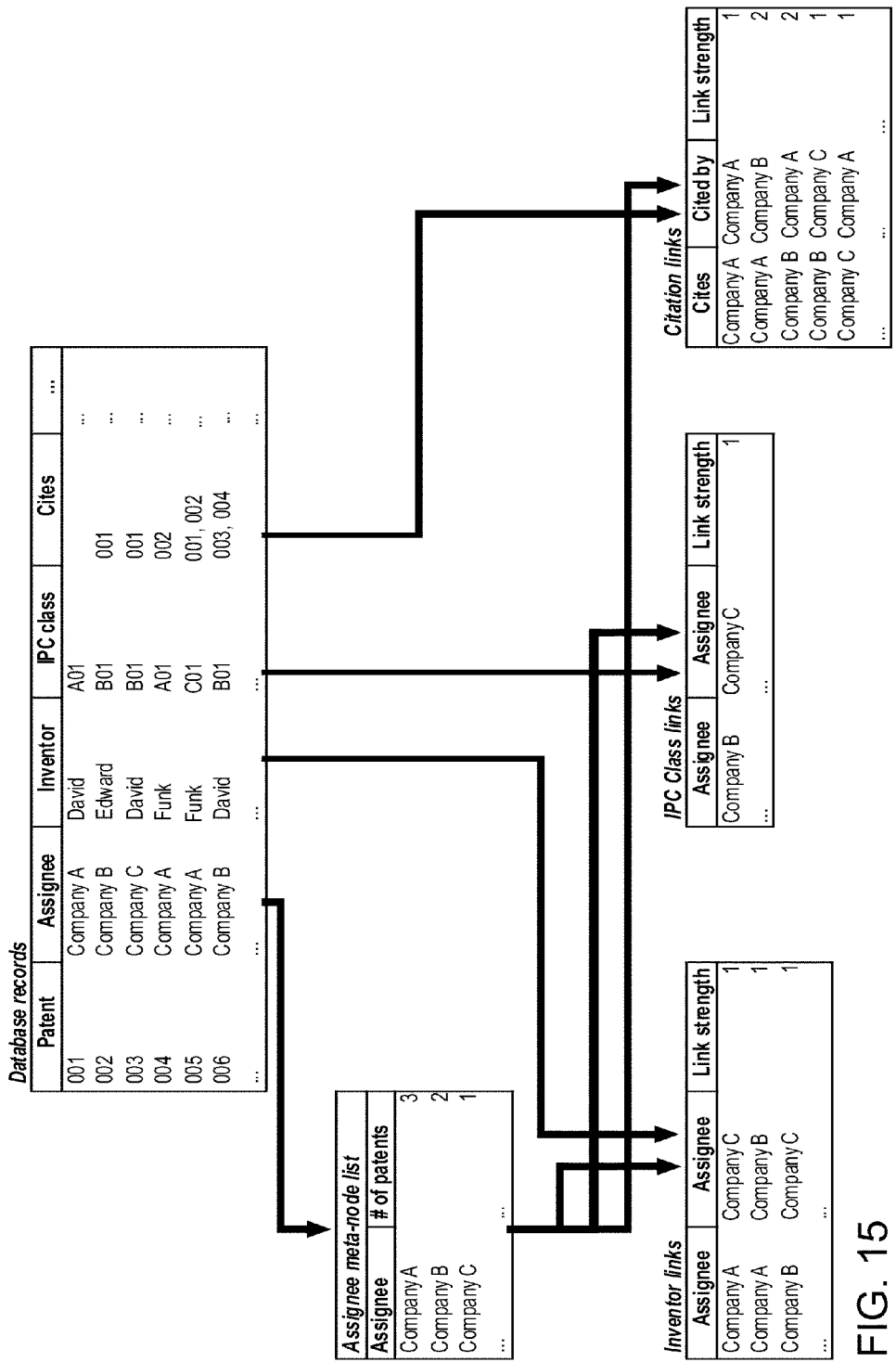
FIG. 15 shows how the records of FIG. 7 are converted to meta-nodes.

Previously, we described an embodiment that converted database records into network data. That embodiment relied on a stable node definition, i.e., that each database record was a node. Another embodiment creates meta-node data and meta-link data from the database records. The example shown in FIG. 15 uses the same simple set of database records shown earlier in FIG. 7 to demonstrate how this is accomplished for creating Assignee meta-nodes and meta-links.

The first step in the process is to create a meta-node list, which is done by simply listing each unique value of a particular record attribute and noting the number of times that value appears in the dataset. One or more meta-link lists are then created for this attribute (in this example Assignee) based on the co-occurrence of values in the other attribute fields (e.g. Inventors, IPC classes and Citations). The method is identical to the method employed for creating a link list as described above, but with two exceptions. First, the "record" in this instance is not an actual record from the database, it is a record from the meta-node list just created, and Second, the meta-links have link-strength values denoting the number of co-occurrences (or citations) aggregated in that link.

The creation of link lists, meta-node lists and meta-link lists from database records makes it possible to view database information from literally any database as a network using the Network Visualization System described herein. As a practical matter, the described embodiment of the NVS does not actually convert every possible attribute into a link list, nor does it convert every attribute into a meta-node list or meta-link list. Rather, only the attributes that are most useful for the purpose of the user are converted into network data.

It will be obvious to one skilled in the art that there are alternative methods for choosing which attributes to convert, and at what step of analysis to make that choice. For example, it is sometimes desirable to define in advance as part of a computer program which attributes to convert into link and meta-node data for a particular database of interest. This allows a user access to a standard set of nodes, meta-nodes, links and meta-links to work with during her research with the tool. The network can be filtered, transformed, and viewed with multiple nodes, meta-nodes and links, but only within the bounds of the attributes established for the particular data set under analysis.

Alternatively, it is possible to give the user the ability to select attributes from the database records to convert into link, meta-node and meta-links during the period of her analysis. This can be accomplished by simply allowing the user to choose attributes (fields) from a list for conversion to network data. Once attributes are selected, links, meta-nodes and meta-links can be generated according to the method described above and added to the set of network visualization resources that are available to the user.

There are also other ways to create meta-node and meta-link information from database records. The following examples illustrate two alternative ways of creating such information, although other ways beyond these two also may be used.

Example 1

Meta-nodes and meta-links can be created based on ranges of attribute values. For example, if there is an attribute of the database record that is numeric (e.g. in a customer database a field which records annual sales), then meta-nodes can be created based on ranges of values from within that attribute field (e.g. <$200=Small spenders, $200-$1,000=Moderate spenders, >$1,000=Big spenders).

Example 2

Meta-nodes and/or meta-links can be based on combinations of multiple record attributes. For example, a database of marketing survey results can be converted to network data where specific categories of customers can be grouped together based on their common answers to a group of questions. In this way, it is possible to define a meta-node for "Soccer Moms" based on an income of >$50,000/year, number of children>=2, and car type=SUV or Minivan.

Figure 14:
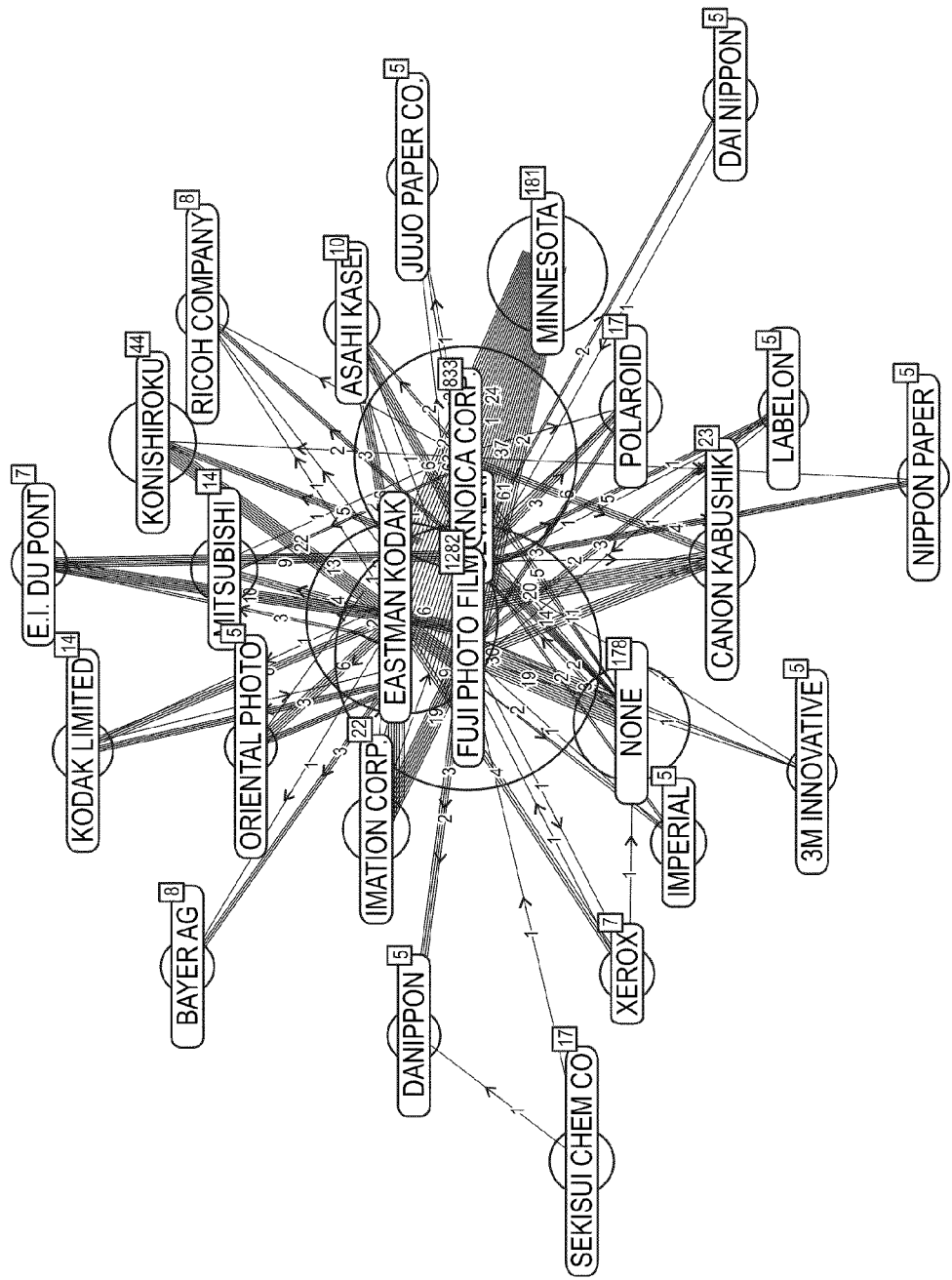
FIG. 14 shows a network generated by one described embodiment using meta-nodes.

The network diagram in FIG. 14 also illustrates two additional attributes of the Network Visualization System; meta-node sizing and meta-link aggregation.

Meta-node sizing—In the network graph in FIG. 14, each meta-node represents not a single patent, but all of the patents sharing a common value of the assignee attribute. In other words, each node represents all of the patents that were filed by the same assignee. In this diagram, the size of the node is based on the number of patents assigned to that particular assignee, and numbers are attached to the meta-nodes to display the value associated with the meta-node size.

Another feature of the NVS is to provide the user with the ability to size meta-nodes based on various attributes of the represented documents. For example, in a customer database with annual spending, the node might be sized based on the sum (or average) of annual spending for all customers represented by the meta-node. Meta-nodes can also be sized based on any number of network statistic calculations like the sum of centrality/eigenvector centrality/betweeness centrality for the represented nodes. The ability to size nodes based on these various metrics enables the user to draw conclusions about things like node value, and other important measures of interest to the user.

Many of the possible attributes used for sizing meta-nodes can be applied to single document nodes as well as to meta-nodes. Of particular interest are the citation attributes (forward citations, backward citations, total citations) and the social network statistics on centrality (centrality, eigenvector centrality, betweeness centrality). Sizing nodes based on these and other statistics can provide a signal of value of the nodes within the network.

Meta-links aggregation—Another feature of the NVS is the ability to transform the network from one with binary (off/on) links to a network with meta-links (combined links with differing degrees of strength). This aggregation of links into meta-links also provides further insight to the user by revealing both the strength and nature of the relationship between the meta-nodes In the case of the example shown above, the links represent citations between the assignees. Multiple links are shown because citations can flow in either direction between the companies. The values of the links in this example are based on the total number of citations between one company's patents and another company's patents. This reveals who in this "innovation network" are the leaders, and who are the followers. Arrowheads are attached to the links to show the direction of the links, and numbers are attached to show the value associated with the link strength. Further, in a preferred embodiment, when a user points (using an electronic pointing device such as a mouse) at a particular node, the incoming and outgoing links are highlighted with different colors to provide a visual clue as to whether the selected company is a leader (highly cited) or a follower (citing others).

As with node-sizing, link-strength can be based on a variety of different linkage attributes. Some examples include number of citations, number of unique documents cited, number of documents citing, average age of citation, age of most recent citation, as well as others. Also recall that meta-nodes can be connected by a wide variety of link types as described above. These links can also be agglomerated and the strength of their ties can be determined based on similar metrics to those described here.

Simultaneous Display of Multiple Node, Meta-Node and Link Types

Figure 16:
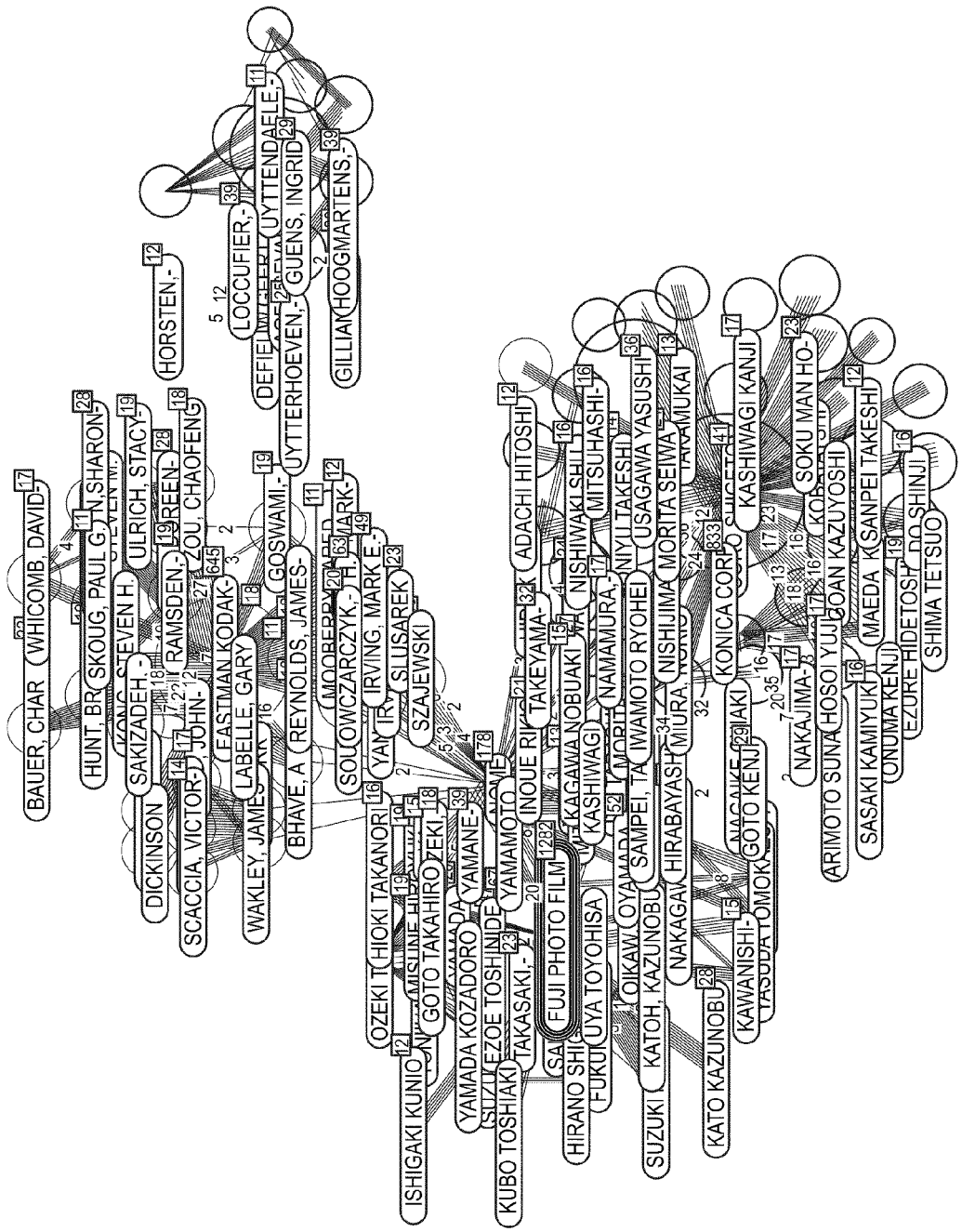
FIG. 16 shows an example of a network in which the links between assignee nodes and inventor nodes are based on whether the inventor has invented on a patent held by that assignee.

The next extension of the meta-node concept is to simultaneously place multiple node and link types on the same graph. For example, in the patent context it is particularly revealing to see a graph that contains nodes representing both assignees and inventors. FIG. 16 shows an example of a network of assignees and inventors in which the links between assignee nodes and inventor nodes are based on whether the inventor has invented on a patent held by that assignee. In the network shown in FIG. 16, it is visually obvious which inventors work for which companies, and which have worked for multiple companies within the scope of the technology domain being examined.

Figure 17:
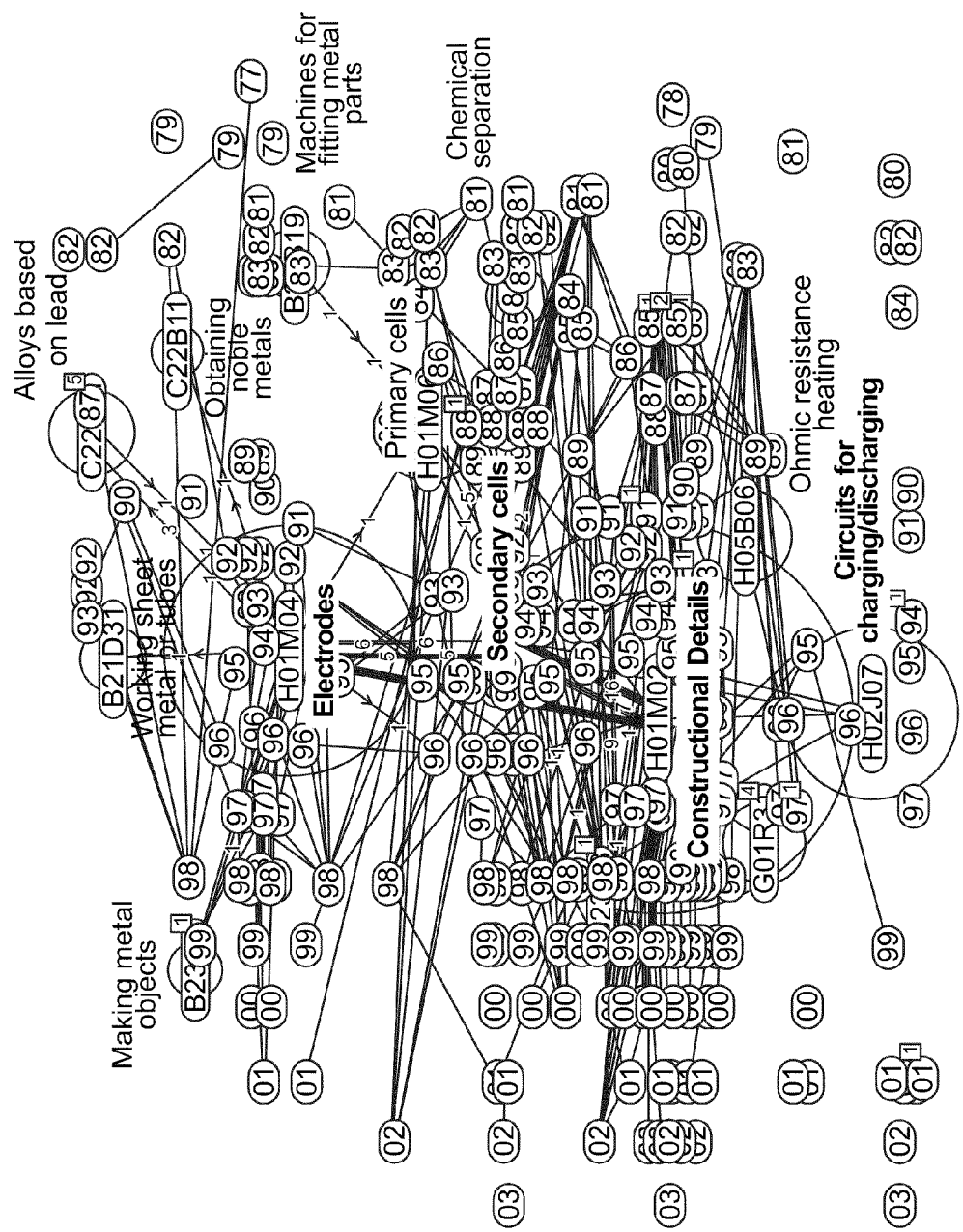
FIG. 17 shows a graph with meta-nodes representing IPC codes.

As another example, nodes representing patents and meta-nodes representing IPC (International Patent Classifications), USPC (United States Patent Classifications), and/or Derwent classes can be displayed on the same graph. FIG. 17 shows a graph with meta-nodes representing IPC codes and the patents grouped as members of particular IPCs. If a filter is set to view only patents from a particular assignee, this embodiment allows a user to visually determine what technologies that assignee is investing in over time, and how those priorities have changed.

Nodes and links representing different attributes or types of connections can be visually differentiated from each other in order to increase the usability of the system. Nodes can be differentiated by shape, color, border type, fill pattern, or by representing each with a particular icon such as a person for inventors and a picture of a document for patents. Links can be differentiated by shape, color, line type (e.g. solid, dotted), or other means.

The NVS allows the user to select which nodes and meta-nodes to display on a graph and also choose which linking attributes are used as the basis for linking. This provides a powerful tool for exploring a large set of patents and understanding their content and the relationships among them.

Fractal Networks

Figure 18:
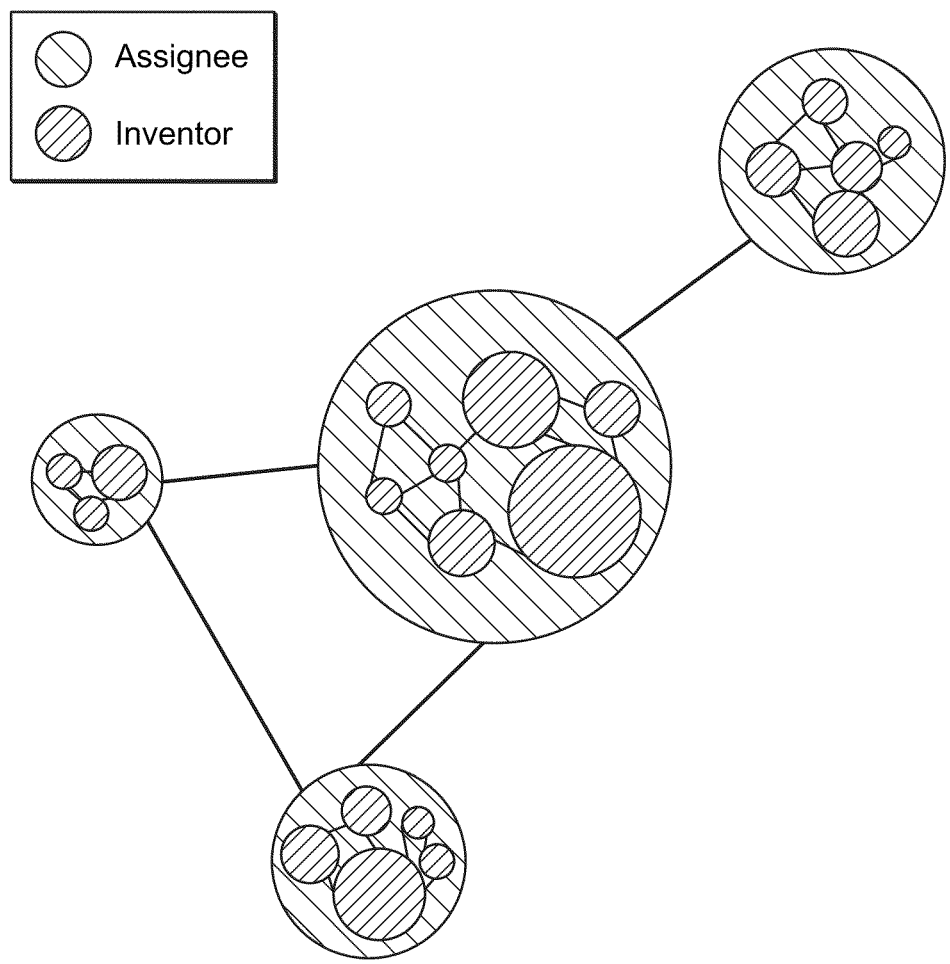
FIG. 18 shows a fractal network graph produced by one described embodiment.

Another extension of the meta-node concept is the concept of fractal networks. Fractal networks are here defined as networks of meta-nodes that contain within each meta-node a network of other nodes or meta-nodes, as shown in FIG. 18. This fractal node representation can have as many layers as desired.

An example of the use of fractal nodes would be a network of meta-nodes that represent assignees where each node is sized by the number of patents it represents. Within each assignee meta-node, a network of meta-nodes can be displayed which represent IPC classes. This representation would show which IPC classifications are being developed by each assignee company in the patent set. Further, within each IPC meta-node, a network can be displayed that represents inventors. And within the inventor meta-nodes, a network can be displayed that represents patents.

This network representation allows a user to ask and answer a wide variety of questions about the patent documents in a technology domain. It makes it possible to delve into the attributes of and relationships among the patents in a document set in a way that is otherwise impossible. An ideal implementation of fractal nodes provides the user with the ability to select the attribute and linking attribute represented by the network at each level of the fractal network graph.

Fractal nodes are also particularly useful in displaying hierarchical attributes such as various classification schemes including IPC and US patent classifications in the patent domain, Medical Subject Headings (MeSH) in the medical data domain as well as categorizations such as Vivisimo categories. Lower levels of the hierarchy can be represented within the nodes that represent higher levels of the hierarchy. This visual representation provides an intuitive way for users to understand the relative size of each category and subcategory as well as the relationships between and among them.

Up to this point, fractal networks have been described assuming that at each level of the hierarchy, only a single type of node or meta-node is displayed. Additional insights can be generated by providing a means for users to place multiple node and link types at each level of the hierarchy. Users can then more deeply explore how the various attributes are related to each other. As an example of the power of this capability, a user can display a network of assignee meta-nodes and within each meta-node, display meta-nodes representing both inventors and IPC classes. By so doing, the user can quickly understand what technology areas each company is working on and who the key inventors are within those areas of technology.

One challenge in using fractal networks is the fact that the "sub-networks" within each meta-node are likely to be very small within the network display. To address this problem, the system allows users to zoom in and out of the network in order to display the detail at any level of the fractal network that they choose. This is accomplished in one of two ways. First, the user can select a level of magnification from a toolbar button or menu selection. Second, the user can zoom in on the fractal network within a particular meta-node simply by selecting the meta-node from the network display. By selecting a meta-node (using a mouse or other electronic pointing device), the system can automatically center that meta-node and zoom in so that the next level of the fractal network can be clearly seen. To zoom back out again, the user can either select a new level of magnification from a toolbar button or menu selection, or they can click outside the meta-node to return to the previous level of magnification.

Implications of Filtering on Meta-Nodes and Meta-Links

As described above, various means are available to the user to filter the database records under examination. This filtering has an important implication for the use of meta-nodes and meta-links, namely, that the meta-node list, meta-node size, meta-link list and meta-link link-strength all are subject to change each time a filter is applied. It is worth noting that each time a filter is applied to the data, that the meta-node and meta-link information must be updated in order to maintain consistency between the set of records under examination and the values associated with the meta-nodes and meta-links in the network display.

Providing Statistical Information about the Network

Another element of NVS that aids the user in making sense of large document sets is a clear presentation of statistical information about the set of documents under consideration. The user interface previously described allows the user to interact with the network, expanding and contracting it to create the network that represents the area of the user's interest. In the NVS, an interface is provided that updates the statistical information about the network dynamically as the network under consideration changes.

A variety of statistical information about the network is provided by the system including, but not limited to:
  Document/record count
  Meta-node count (e.g. number of assignees in displayed network)
  Sums of node attribute values (e.g. total sales to all customers in the network)
  Document count by meta-node category (e.g. a list of articles per author)
  A graph of documents per year (e.g. articles per year by year of publication)
  Other network statistics Other network statistics can also be provided including but not limited to statistics about the network (e.g. density, diameter, centralization, robustness, transitivity), measures about clusters within the network (e.g. cliques, ego networks, density), and metrics about the nodes (e.g. centrality (e.g. betweenness centrality, eigenvector centrality), equivalence), and many others.

Figure 19:
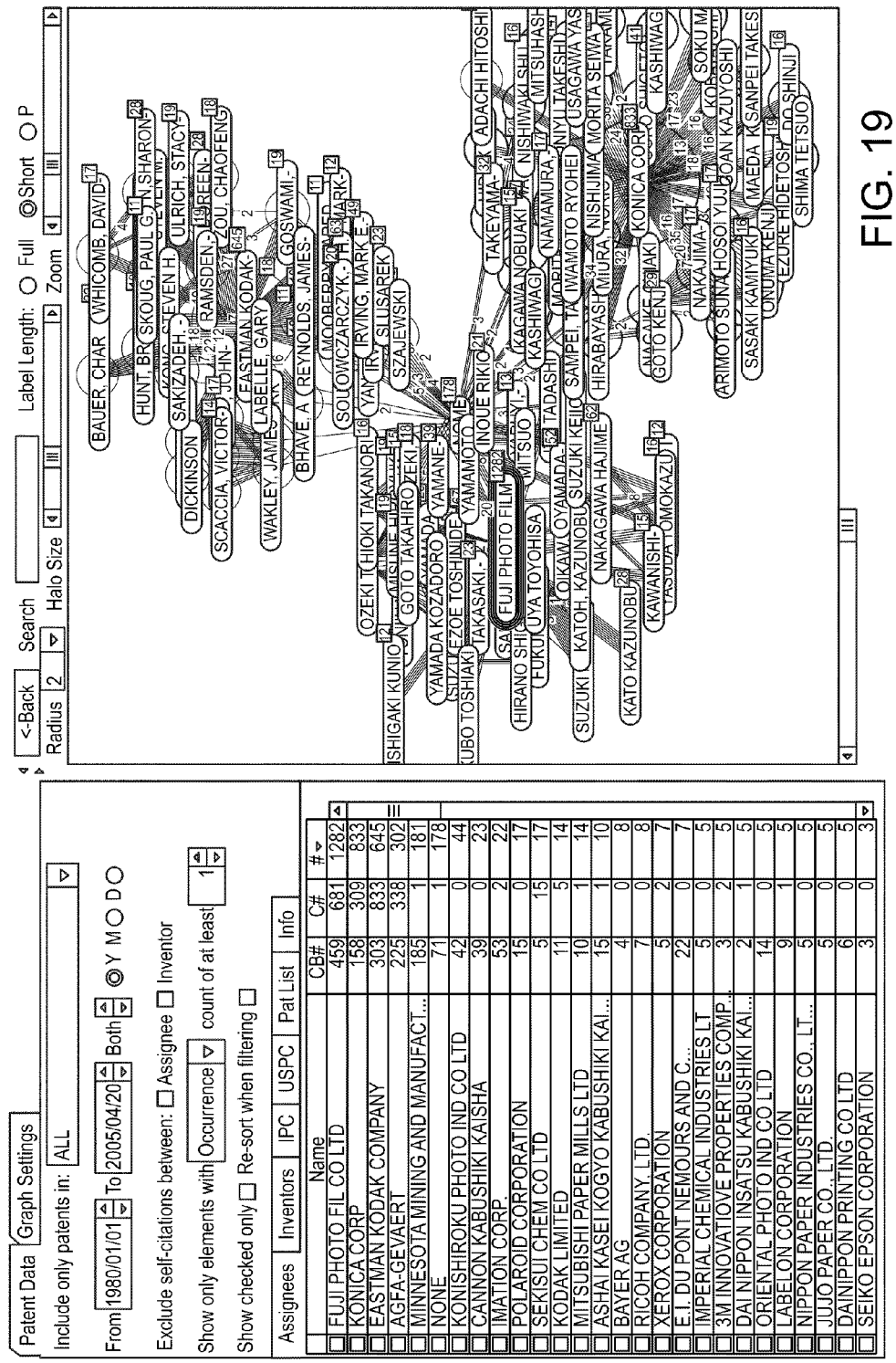
FIG. 19 shows a user interface produced by one described embodiment.

The statistical information described above can be provided by user request from a menu or toolbar selection, or it can be provided in a separate window or pane within the interface. In a preferred embodiment, a separate pane is provided with tabs to allow the user to access the desired information about the current network. This pane, as shown in FIG. 19, can be expanded, contracted or closed at the user's discretion.

The interface further facilitates understanding by allowing the user to select one or more categories and highlighting the related nodes in the network visualization.

Additional information is also provided on a context sensitive basis as users use the system. Specifically, pop-up windows are available to provide additional information about the various nodes, meta-nodes, and links and meta-links in the network graph. The information provided in each pop-up window is relevant to the object selected from the graph (note that more than one object of the same type (node, meta-node based on the same attribute, link of the same link type) can be selected at a time.

Resolving Ambiguous Attribute Values

One of the problems encountered in using the network transformation method as described above is the need to resolve ambiguous terms. Database managers or users will understand that the data contained in database records is often messy and inaccurate. Often, attribute values that represent the same value are not the same because of minor differences in the text. We have found that inventor names and assignee names (as well as other attributes) often appear in the patent database in different forms. For example, the assignee "IBM" may appear as IBM, IBM, Inc., International Business Machines, International Business Machines, Inc. and in many other variant forms.

This creates a problem when using the meta-node and meta-link method described above, because these small differences in form cause the system to create multiple meta-nodes/meta-links when they should actually be combined. Therefore, the tool provides several means for the user to combine attribute values into a single value.

The system provides a means for users to resolve ambiguous attribute values by allowing them to group attribute values together under a single value. FIG. 19A shows the results of grouping multiple assignee names under a single assignee name that represents the group. Several means are provided to accomplish this. The first method is to allow users to select attribute values from a list and combine them under a new name or attribute value. For example, a user is presented with an alphabetical list of assignees and selects IBM, IBM, Inc., International Business Machines, International Business Machines, Inc. from the list. She can then group the selected items together using a toolbar button or a menu selection and either selects the systems suggestion for a group name (e.g. IBM) or types her own group name. The system will then combine all of these names under the new group name and display it as a single assignee for the purpose of all analysis.

A second method provides users with suggested collections of attribute values to be combined into groups. The system compares the similarity of the attribute values and suggests groups to be clustered together under a single attribute value. In addition to using the attribute under consideration, (e.g. Assignee), the tool also examines other attribute values for clues that the attribute values should be combined. For example, if IBM, and IBM, Inc. are both located in Armonk, N.Y., or they share common inventors, the tool will suggest that they should likely be combined. The user can review each suggested group and add or remove values from the list before choosing to accept the grouping.

The final method for resolving ambiguous attribute values uses the network diagram itself. The user can select meta-nodes directly on the network diagram (using an electronic pointing device such as a mouse). She can then combine multiple meta-nodes into a single group. This is accomplished by selecting multiple meta-nodes and choosing a tool button or menu selection to group the values. Alternatively, the user can "drag and drop" a meta-node onto another meta-node thereby suggesting to the system that they should be combined. The system will prompt the user to ensure that grouping those items is really the intention, and then it will combine the attribute values into a single group for purposes of analysis.

The system also makes it possible to un-group attribute groups once they have been created. The user can select a meta-node, or choose a group name from a list and review which attribute values have been combined. The user can then select specific attribute values for un-grouping and then select a toolbar button or a menu selection to ungroup the selected value or values.

In addition to the methods above, it is also possible to eliminate ambiguity within attribute values through comparison with external data sources. When considering assignees, for example, reference can be made to external lists of company name equivalents. These lists can also include subsidiaries and acquired companies which can then be suggested to the user as possible groups for combining. In the medical domain, doctor names can be resolved using the doctor's DEA number.

This process of combining multiple attributes into a single attribute value can also be beneficial in another way. By combining values into groups, a hierarchy of values is created. This information can then be used according to the methods described above to display the relationships among data at different levels of the hierarchy. Specifically, attribute values at each level of the hierarchy can be represented as meta-nodes and can be displayed as part of the network display either as separate nodes within the graph, or as a hierarchical network using the fractal network method described above. This method is particularly valuable for hierarchical information like parent/subsidiary information about assignees.

Animating Networks

The tools we have described up to this point allow a user to transform her view of a network in a variety of ways. However, the descriptions up to this point have assumed that each network graph is a snapshot as of a particular point in time. In that way, the visualizations we have described so far have been static.

Another important element of the network visualization system is the ability to animate network graphs to reveal how they have changed over time. There are several different capabilities of the system which enable a user to examine the dynamics of network emergence.

The first method for revealing network dynamics is the ability to restrict the data displayed within the diagram based on a time period of interest. The user can select minimum and maximum date which establishes a date range for data to be displayed. The actual date used can be based on any date information associated with the underlying database records. With patent data, a variety of dates can be selected including but not limited to priority date, filing date, publication date, and grant date. Once the user has selected the date type and date range, the system then filters the data and displays the network graph based only on data meeting the specified parameters.

The second method builds from this capability. The system provides the user with the ability to alter the date range in a very simple way. The user can select a "step amount" by which to change the date range (e.g. one month, one year) and then can click a single button to move the date range forward or backward by that increment. Additionally, separate toolbar buttons are provided to that the minimum date, maximum date, and both dates can be adjusted in a single click. Once the user has clicked to alter the date range, the system quickly adjusts the data set to reflect the newly selected range and redraws the network graph. This allows the user to step through the time period of the data set at prescribed increments. Effectively, the system makes it possible to visualize how the network has emerged over time.

The third method is the creation of an actual animation of the network development. The system provides the user a method to enter an overall date range, an initial date range (which may be no range at all—e.g. if the minimum and maximum dates are set to the same value), which dates (min, max, or both) will be changed, and the size of the date increment to animate. The system uses these inputs to automatically step through the specified date range based on the increment provided and displays an animation of the emergence of the network over time.

These animation methods are incredibly useful in revealing the development of the network, however, they create some challenges which must be overcome in order to make the system practical. First, when the network being displayed is large (in that it has many nodes and/or links, and/or a large number of underlying records) the high degree of computational complexity makes the animation slow and jerky on all but the most powerful computer systems. In order to overcome this limitation, a means is provided for the system to process the sequence of network diagrams as a batch and then save them as a series of snapshots or as a video clip. The snapshots or video clip can then be played back at a speed selected by the user without the system having to recalculate the underlying data at each point in the animation. This makes it possible for the user to review the animation repeatedly and also to pause, rewind, and fast forward the animation at will.

A second challenge related to animation of network graphs is the difficulty of assimilating what is happening within the graph. When a graph is animated, new nodes and links appear, meta-nodes grow and shrink, and the nodes change position within the graph as the attraction between the various nodes and meta-nodes changes over time. All of these simultaneous changes make it difficult for the user to understand what is happening as the animation unfolds. In order to make things simpler for the user, the system provides a means to reduce the number of parameters that are changing during the animation. Specifically, the system allows users to hold various parameters constant during the animation. Parameters that can be held constant during the animation include but are not limited to:

Constant node position—One of the most difficult parts of the animation to follow is the changing location of the nodes within the network display as the animation runs. Therefore, the system provides users with an option to maintain constant node positions during the animation. In order to accomplish this, the system first calculates the final position that each node will hold at the end of the animation, and then, as nodes appear, change sizes, and new links appear, grow and disappear, the location of the nodes is held constant at this position.

All nodes present—Another option the system provides is the ability for the user to keep all nodes present on the graph during the entire animation. With this option selected, the system keeps each node visible during the entire animation, but provides a visual signal to differentiate nodes that do not represent data falling within the date range captured within the particular date range at each point in the animation. The visual signal can be a difference in color (e.g. nodes that normally would not be visible are gray), size, shape, border, or other visible attribute. This allows the user to trace the path of each node continuously during the entire course of the animation.

Other parameters that could be held constant during the animation include link presence, constant node size, and constant link size.

The ability to hold any combination of these parameters constant during animation gives the user great control over the animation that is displayed and increases their ability to assimilate how the network is emerging.

Another capability that the system provides is the ability to provide visual information about the rate of change associated with various parameters during the animation. Although the animation of network emergence provides tremendous visual information about how the network is developing, it is difficult to accurately compare and assess the changes as they occur. For instance, while it is easy to see that several technologies or company portfolios are growing, it is difficult or impossible for a user to assess which company portfolio is growing the fastest at any point in time.

For this reason, the system provides users with a means to visualize the rate of change of various parameters during the animation. Some parameters which users may have interest in during an animation are: node growth rates, link attachment rates, and the rate of change of various measures of centrality of the nodes in the network. The system provides users with the ability to track these rates of change during the animation, and to display information about these values in a table, graph or directly in the network diagram. The user can select which variables to track and which nodes or links to track them for (including all nodes and links if desired). This data can be displayed in a table or a graph (bar graph or line graph) adjacent to the network diagram and updated as the animation is displayed. Additionally (or alternatively), the data can be used to alter the appearance of the nodes or links in the network display as the animation is played. We have found it useful to alter the color of nodes or links based on rate-of-change data or centrality statistics in order to display which portions of the network diagram are "hottest" (as measured by the parameters described above). Alternatively, the data could be used to alter the size of nodes or links or some other visible characteristic as the network animation is played.

One other useful capability is provided related to network animation. Often, users have an interest in a particular portion of the network diagram, and would like to have a deep understanding about how that portion of the network is emerging over time. For this reason, it is useful to provide a means whereby users can zoom in, and/or maintain focus on a specific node or nodes during the animation. For example, a company may be particularly interested in how their own patent portfolio has emerged over time. A means is provided so that users can select a specific node to zoom in on during the animation. It is useful to provide one or more "picture in picture" displays so that the user can observe the emergence of the overall network, as well as seeing how one or more "zoomed" portions of the network are emerging. This is particularly useful when the network being animated is a fractal network and the user is interested in observing how a "sub-network" is emerging within the larger network.

Network animation is a very powerful tool for revealing the patterns of emergence within a network. Within the context of patent data, animations reveal how technologies emerge, how companies' positions change, how inventor's careers and collaborations change over time, and many other features. This capability provides a significant contribution to the user's ability to make sense out of large data sets.

Linking to External Data

Up to this point, the network visualization system has been described based on the network analysis and insight that can be generated from within a single data source, in this case, a single set of database records. It should be evident based on the previous description that tremendous insight can be generated simply by using this endogenous data. However, additional insight can be generated when other exogenous data sources are used in conjunction with the patent data.

By linking to exogenous data sources, additional information can be obtained about the entities represented by the database attributes. The choice of which external data to link to and the value of linking to that data depends on the context of the data source under review. Each attribute of the database records creates the potential to link to additional external data sources that can expand the available information about the subject of interest. This additional data can be used to create entirely new meta-node classes, attach additional attributes to one or more database or meta-node records, provide information about specific nodes or meta-nodes, and provide additional linking information between nodes or meta-nodes. Specific examples of the kinds of exogenous data that is useful will be described within some of the preferred embodiments described later in this application.

Advantages of the Network Visualization System

The combination of these various tools and techniques provide a dramatic improvement in enabling a user to quickly make sense of the documents or records contained within a large dataset. First, the ability to rapidly identify and refine a collection of documents through dynamic filtering makes it possible for users to identify a set of documents related to their area of interest much more quickly, efficiently, precisely and with less need for specific technical knowledge.

Second, users have the ability to explore a large set of documents or database records so that an understanding can quickly be developed of the nature of activity in the domain. This is made possible through techniques that provide summary information about the domain from a number of different perspectives. The combination of the network lens along with meta-nodes to represent the various attributes of the documents provides an intuitive way to understand not only the groupings inherent in the domain, but the relationships among those groups.

Users can advantageously explore their domain of interest at any level of detail desired, and move back and forth between summary level information and detailed information seamlessly.

Example 1

Method and Apparatus for Making Sense of the Patent Database

One or more embodiments of the invention relate to an improved method for making sense of patents in a patent database. One attribute of the patent database is that it is easy to establish the relatedness of documents to each other based on their citation relationship. The following discussion on using citations as a basis for establishing relatedness among patents applies equally to all databases that have citations including but not limited to academic/scientific/medical literature as well as hyperlinks embedded in pages on the World Wide Web which can also be thought of as a type of citation.

Various embodiments of the present invention can be used to help a business person, engineer, scientist, attorney, patent examiner or other interested party, make sense out of a large set of patents. The challenge is to take a large set of patent documents and find ways to understand the technological developments they describe without having to read them. To accomplish this, a method is provided by which the user can visualize the various attributes of the documents and their relationships to each other.

Some of the questions that can be addressed using various embodiments of the invention include but are not limited to:

What technology(ies) is this group of patents about?
How quickly are the various technologies developing?
What are the hottest areas of technology in this domain?
What are the most recent developments?
Which companies are most active in developing these technologies?
Which inventors are most active in developing these technologies?
Which patents are most important?
How important are the patent portfolios of the various companies participating in this technology domain?
Which companies are leading the development and which are following?
What other areas of technology are related to this technology?
How much have these companies invested in this area of technology?
How important are these patents to the companies that filed them?
Which areas of technology have these companies abandoned and in which are they continuing to invest?
What companies/inventors are collaborating in the development of this technology?
Which inventors have changed companies?
What areas of technology are being bridged for the first time and which companies own the patents that are bridging them?
Which patents should I cite as prior art for my current patent application?

Which patents could potentially be used to invalidate my patents or my competitors patents?

Which companies are most likely to be in violation of my patents?

Which companies are most likely to be interested in licensing my patents?

How quickly is academic research being translated into patentable technology?

Which technologies in this domain are about to come off patent?

How active has the company/inventor of these patents been in building on that technology and extending their patent protection?

In which technologies are companies increasing their investment, and in which are they abandoning their investments?

What technologies are being invested in within my industry?

What industries are making use of this technology?

Visualization of Patent Networks

The Network Visualization System described above can be readily applied to the patent database to great effect. The world's patent databases are particularly amenable to this kind of analysis because they contain citation information which provides natural linking information between patents. The value of the NVS in the context of patents is particularly relevant because it makes it possible for interested parties other than patent attorneys and R&D engineers to make use of patent data.

Patent data is available from a variety of sources including the world's various patent offices (USPTO, EPO, etc. . . . ) as well as from patent data providers like Thomson (including its subsidiaries and acquirees, Aureka, Micropatent, IHI and Delphion) and Lexis Nexis. This patent data is rich in information which can be transformed into network data. Some examples of the kinds of data that can be converted into nodes and links include but are not limited to the following:

Nodes/meta-nodes—patents, inventors, assignees, IPC classes, US classes, Derwent classes, year of priority/filing/publication/grant/expiration, semantic clusters, status (application/granted/expired/abandoned), examiner, inventor city/state/country, assignee city/state/country, filing jurisdiction (US/EPO/WIPO etc.), priority number, and others as well.

Links/meta-links—citations, co-citations, bibliographic coupling, common IPC/US/Derwent class, common year of priority/filing/publication/grant/expiration, common semantic cluster, common status (application/granted/expired/abandoned), common examiner, common inventor city/state/country, common assignee city/state/country, common filing jurisdiction, common priority number, and others as well.

Any combination of these node/meta-node and link/meta-link definitions as well as ranges and combinations of the above can be used within the NVS to examine sets of patent data.

Further, these nodes and links can be sized to provide additional information to the user as described above. Some particularly useful attributes that can be used for sizing nodes and links in the patent context include:

Node/meta-node sizing—In the context of patents, several specific metrics are relevant for node/meta-node sizing. Some examples include; the metanodes can be sized based on the number of patents, number of priority numbers (e.g. number of unique patent families), number of times the patents are cited (forward citations), number of patents cited by the represented patents (backward citations), total citations (forward plus backward), citations/year since publication/grant, patent years remaining (e.g. sum of the years remaining on the represented patents), average citations per patent, average patent age, average/total number of IPC/US/Derwent classes, number of inventors, and many other attribute metrics.

As mentioned before, nodes and meta-nodes can also be sized based on any number of network statistic calculations like the sum of centrality/eigenvector centrality/betweeness centrality for the represented patents. The ability to size nodes based on these various metrics enables the user to draw conclusions about things like patent value, diversity of innovation, concentration of inventorship and other important measures of interest to users of patent data.

Measures of patent value are of particular interest, and there are various attributes within the patent data (or other exogenous data that can be linked to) that can give a signal of patent value. Some specific examples include but are not limited to: documents cited, citing documents, number of academic citations, age of most recent citation, centrality/eigenvector centrality/betweeness centrality, length of the patent specification, number of claims, number of independent claims, length of the shortest independent claim, breadth of coverage (countries filed in), maintenance fee payment, post-grant opposition (in Europe), maintenance fee payment, licensing, litigation of the patent, R&D dollars/patent by the assignee, average R&D dollars/patent in the industry, as well as others. Some or all of these measures can be aggregated together using a weighted average to provide a signal of value of the patents in the network. These values can be summed to provide an estimate of the value of a patent portfolio, and this value can be used to size patent nodes or meta-nodes which represent patent portfolios. This can provide the user with tremendous insight about which patents and portfolios are most important within a particular domain of interest.

Link/meta-link sizing—Links and meta-links can also be sized based on various attributes in the same way as with node-sizing. Link-strength can be based on a variety of different linkage attributes. Some examples include number of citations, number of unique patents cited, number of patents citing, average age of citation, age of most recent citation, as well as others.

Links between patents and patent portfolios can signal two important things, dependence and similarity. Dependence is a measure of how much one patent or patent portfolio relies on or is built off of another patent or patent portfolio. Measures that signal dependence provide important signals about the potential for infringement and are therefore critically important in patent analysis. Some metrics that signal dependence include times citing, times citing minus times cited, times cited by patents citing the same patents you cite, etc.

Similarity is another important linking attribute in patent analysis. Similarity between two patent portfolios suggests a close parallel and perhaps redundancy between R&D programs of two companies. Strategically, a high degree of similarity suggests the potential for a joint venture or some other sort of cost sharing potential. Measures that signal similarity between two patents include total inter-citations, structural equivalence (a network analysis term meaning that they hold the same structural position within the network), co-citation, bibliographic coupling, semantic similarity, etc.

All of the features of the NVS described above are relevant to the analysis of patent data including network transformation, use of multiple nodes and links, fractal networks, network animation, statistical information and linking to external data sources. Some elements of the preferred embodiment of the NVS that are specific to the analysis of patent data are described below.

Identifying Unassigned Patents

One of the unique challenges associated with using and linking patent data in the NVS is that patent applications typically do not have an assignee associated with them. This is unfortunate since it means that the newest patents in the database, (the most cutting edge patents) cannot easily be identified by company. These patents also typically do not contain citations, and are not cited because they are brand new. One aspect of the implementation of the NVS for patent data is to resolve this problem by creating an alternative link that connects them properly to the network. This is accomplished by comparing attributes of the unassigned patents and patent applications to make a "best guess" about which company has filed the patent applications. Several attributes make this possible including inventor names, inventor address, IPC/USPC classifications, cited patents, prosecuting law firm, semantic data and others.

By comparing these fields between the unassigned patents and other patents in the search results, it is possible to create a link that shows which other patent in the database is most likely to be by the same company. As an example, consider an unassigned patent that has three common inventors with the same addresses and is filed in the same IPC class and prosecuted by the same law firm as another patent in the database. It is highly likely that these patents were filed by the same assignee.

The system reviews all of the unassigned patents and creates a link between each patent and the most highly related other patent in the database. Each of the relatedness criteria can be given a score and a weighted average used to determine the overall relatedness of the two documents. The user can than choose to "assign" patents with similarity above a selected threshold to the assignee of the highly related document. Alternatively, the user can review each linkage and choose to accept or reject the proposed "assignment." These assignments are marked within the NVS as "computer assigned" so that the user can tell that there remains some uncertainty about whether those patents are in fact assigned to that particular assignee. The links created between these unassigned patents and the most highly related patent are a different class of links that can be turned on and off at the users discretion. One particularly useful way to employ these links is to visualize a combined network diagram of assignees with a network of unassigned patents. This allows the user to review all of the "computer assigned" patents by company in a single network view.

Statistical Information

Various types of statistical information is relevant for the analysis of patent data including:

Assignees—Number of patents in the selected network by assignee sorted from highest to lowest.

Inventors—Number of patents in the selected network by Inventor assignee sorted from highest to lowest.

Classification—Number of patents in the selected network by classification code assignee sorted from highest to lowest or sorted by classification category. Data can be provided for each of several classification schemes including IPC, USPC, Derwent classifications and others. Since many classification schemes are hierarchical, the data can be displayed using a tree structure with the number of patents within each category and subcategory displayed alongside each branch of the tree.

Word usage—Number of patents containing key words, phrases or word groupings. Several tools exist which identify common word usage within document sets. These include Micropatent's Themescape product, Vivisimo's clustering tools, Grokker's clustering tool and others. These word clustering tools can easily be incorporated into the system to provide additional insight into the patent dataset under consideration.

Citation—Various types of information about citations can be provided. These include but are not limited to the following:

Most frequently cited patents, assignees, inventors, or other patent grouping.

Highest number of citations per year since issuance for patents, assignees, inventors or other patent grouping.

Statistical information is also provided in pop-up windows. Several examples of the kind of information provided in the pop-ups that is specifically related to patent data are described below:

Patent node pop-ups—When a patent node is selected, a pop-up window can be called up which displays information about the patent that is represented by the selected node. The information provided includes all of the basic information provided on the first page of a typical patent including patent number, title, inventors, assignees, application number, priority/filing/publication/grant dates, IPC/USPC classes, field of search, citations (both patent and non-patent), examiner and agents as well as other data from the patent like number of pages, number of claims (independent and dependent), number of figures, number of words in the shortest independent claim, etc. In addition, many of the fields in the pop-up window are hyperlinked allowing the user to pull up additional information. For example, the patent number is hyperlinked to the full text of the patent (or a .pdf), citation links are hyperlinks (links to non-patent citations call up a Internet search for the cited document), as well as other hyperlinks. The pop-up also can include various statistical information about the patent (e.g. centrality) and other information from external sources including legal status, litigation status, licensing status, other patents in the patent family, post-grant oppositions, file wrapper information, etc.

Assignee meta-nodes—When an assignee meta-node is selected, a pop-up window can be called up which displays a menu of different kinds of data that can be displayed about the assignee and the patents represented by the meta-node. Menu options include tables showing a list of the patents represented the metanode, patents by IPC class, patents by USPC class, patents by inventor, and a graph showing patents by year. Additional menu options include network statistical information that can be displayed about assignee meta-nodes including total citations, average citations per year (since year of publication), the sum of eigenvector centrality for the assignee's portfolio/the sum of eigenvector centrality for the entire network (a measure of portfolio value). Another menu option provides information about the assignee. This menu option links to basic company and financial information about the company. Various sources for this kind of information can be used including Hoovers <hoovers.com>, Bloomberg <bloomberg.com>, Yahoo Financial <finance.yahoo.com> and many other sources including both public and proprietary sites containing company profile information.

Inventor meta-nodes—When an inventor meta-node is selected, a pop-up window can be called up which displays a menu of different kinds of data that can be displayed about the inventor and the patents represented by the meta-node. Menu options include tables showing a list of the patents represented the metanode, patents by co-inventor, patents by IPC/USPC class, and a graph showing patents by year. Another menu option provides information about the inventor. This menu option links to two different kinds of information, one is a basic web search for the inventor's name, and a second is "people finder" information from the World Wide Web. People finder sites such as <people.yahoo.com/>, <zabasearch.com>, <intelius.com>, <peoplefinders.com>, and many others can provide address histories, date of birth, marriage/divorce/death information, real estate records, liens and mortgages, bankruptcies, military service, relatives, neighbors, credit checks and background checks based on an individual's name, city and state which can all be found directly in the patent information. This information can be useful in finding inventors if the need arises. It can also be used to identify inventor names within the database that are likely to represent the same person.

IPC/USPC meta-nodes—When an IPC/USPC meta-node is selected, a pop-up window can be called up which displays a menu of different kinds of data that can be displayed about the IPC/USPC and the patents represented by the meta-node. Menu options include tables showing a list of the patents represented the meta-node, patents by assignee class, patents by inventor, and a graph showing patents by year. Another menu option provides information about the assignee. This menu option provides detailed information about the IPC/USPC class including a full description of the class and its location in the IPC/USPC class hierarchy, concordance information showing how the selected IPC class is related to the USPC classes (or vice versa), concordance information showing the link between the selected IPC/USPC class and the SIC/NAICS related industries of use and industries of manufacture. (The IPC/USPC to SIC/NAICS link is discussed in detail later in the description of this embodiment.)

Meta-links—When a meta-link is selected, a pop-up window can be called up which displays information about the connections represented by the meta-link. A table can be displayed showing a list of patent to patent links represented, as well as a graph of the number of individual links represented by the meta-link over time. If for example, the meta-link is a co-inventorship link, the meta-link pop-up will show a history of the collaboration between the two inventors. If the meta-link is a assignee-assignee citation link, the pop-up will show a history of citations between the two assignees.

All of this pop-up information makes it possible for the user to explore the patent network at any level of detail desired, from high level meta-data down to the deepest level of detail about companies, inventors, technologies and patents. This makes the patent network visualization tool a powerful tool for understanding a large set of patent documents.

Linking to External Data Sources

Some examples of useful exogenous data sources specifically related to patent data as well as their use within the patent network visualization system are described below.

Industry data—One of the critical observations about making use of patent data is that for most decision makers other than patent attorneys and R&D engineers, the entity of interest is not a patent. Rather, the user is typically interested in knowing about a company, technology, inventor, or some other entity. One particular entity of interest that many users would like to understand better is industry information. Users often want to know answers to questions like the following:

What technologies are critical to this industry?

What companies are leading the technology development in this industry?

What industries make use of a particular technology?

Unfortunately, industry data is not directly attached to the patents in the patent database. However, it is possible to link the data in the patent database to industry data in two ways. First, the assignees/companies within the patent database can be linked to the industry or industries in which they participate. Governments around the world have made various attempts to develop standardized taxonomies of industries within their economies. The results are taxonomies like the SIC (Standard Industry Classification) codes and NAICS (North American Industry Classification System) codes. These codes classify companies based on the industries in which they participate.

Various databases contain directories of companies with information about their SIC/NAICS industries. One example is the Worldwide Business Directory <siccode.com> which houses a database of companies and their industries.

By linking assignees in the patent database to their SIC/NAICS codes, it is possible to create meta-nodes within the network visualization showing which industries are represented in the patent data under examination. Using the features described above, it is then possible to examine relationships between and among industries, and the relationships between industries, companies, technologies, inventors, countries, and other entities represented within the patent data.

Another means by which patent data can be linked to industry data is by way of the US Patent Classification (USPC) codes or the International Patent Classification (IPC) codes. This is made possible through various "technology-industry concordances". During the period from 1990-1993, the Canadian Patent Office, in collaboration with Statistics Canada assigned all new patent applications to both an SIC of Use and an SIC of Manufacture. This assignment was made for a total of about 148,000 patents. This information has been used by various government entities and academic researchers to draw a correspondence between IPC/USPC technology classifications and SIC/NAICS industry classifications.

Tables have been established, which are publicly available, that show the linkage between industries and technologies. Various versions of these tables can be obtained from sources on the World Wide Web including:

PC-US-SIC Concordance from UToronto <rotman.utoronto.ca/silverman/ipcsic/documentation IPC-SIC concordance.htm>

OECD Technology Concordance <01 is.oecd.org/olis/2002doc.nsf/I in kto/dsti-doc(2002)5>

Yale Technology Concordance <faculty1. coloradocollege.edu/-djohnson/jeps.html>

USPC to SIC Concordance here <uspto.gov/web/offices/ac/id % eip/catalog/products/tafresh1.ht-m#USPC-SIC>

Using these tables, it is possible to link technology class information to industry classification. This makes it possible for users of the patent network visualization to analyze information about industries as part of their patent data analysis.

The two sources of industry data can also be used simultaneously. For instance, the system can create SIC or NAICS meta-nodes and display them within the same graph (or as fractal nodes) related to the assignees in the database. Simultaneously, the technology-industry concordance data can be used to create a IPC or USPC network linked to those industry meta-nodes. By so doing, it is possible to determine with a fair degree of confidence in which industry a company is employing a particular technology. This capability addresses a common question in patent data research, namely, "Of the various companies with patents related to this technology, which ones are employing the technology in my industry, and which are employing the technology in other industries?"

Legal status data—A second source of valuable exogenous data related to patent data is the legal status databases such as INPADOC. This database, along with others, contain the data about maintenance fees, assignments, post-grant oppositions, etc. Linkage to this data is technically simple as the patent number or priority number can be directly linked to the databases. The value of linking to this data is very high. The patent network visualization system can use this data to identify patents that have been abandoned (due to lack of payment of maintenance fees), and reassigned. This provides a strong signal about corporate priorities by showing where a company's priorities are. This is accomplished by changing the appearance of the patent nodes, assignee meta-nodes, IPC/USPC meta-nodes, inventor meta-nodes or other nodes to show which patents have been abandoned. The change in appearance could include a change in color, shape, size, border style, or fill style.

In addition, the legal status data can be used to show which patents have changed hands, give evidence of an acquisition or disposal of a business or business unit, and give a signal of value of the patents. For example, a large number of patents being reassigned to a new company would likely signal a change of corporate structure. Another example is that patents that have been opposed in a legal process are more likely to be valuable patents as the parties would be unlikely to pursue an opposition unless there was a significant economic incentive to do so. Once again, this information can be used to change the appearance of nodes or meta-nodes to signal important clues about the patent data network to the user.

File wrapper data—Another source of data that is valuable to link to is the patent office file wrapper data. In the United States, this data can be found online at <USPTO.gov>. This data is technically easy to link to as it contains either the priority date or patent number which can be directly linked to the patent database. The use of this information is two-fold. First, it is useful for the user to be able to "click through" to the file wrapper data for patent they are particularly interested in. Secondly, the file wrapper data provides clues about the value and validity of patents. The number of office actions, claim rejections, changes in numbers of claims from application to granted patent, time to respond to office actions and other information found in the file wrapper all provide information that can be useful to the user of the patent network visualization system. The appearance of nodes and meta-nodes can be altered to signal to the user the presence or value of any of these file wrapper parameters.

Legal data—Another important source of information about patents is the legal status of related legal proceedings. Information about the existence of and status of patent litigation is critical to understanding the patent landscape. By utilizing this information in coordination with the capabilities of the patent network visualization system described above, important questions can be answered such as:

What patents have been validated through a court proceeding?
What patents are currently being litigated?
What companies are accused of patent infringement, and how many cases are they facing?
Who is aggressively asserting patents in my industry?
What technologies are the most actively entangled in patent litigation?

Licensing data—Another important source of information about patents is the licensing data. Information about the patent licensing provides a signal about the value of individual patents and patent portfolios. Various licensing databases exist including <yet2.com>, <royaltystat.com>, <royaltysource.com>, The IP Transaction Database <fvgi.com>, IP Research Associates Database <ipresearch.com>, Licensing Royalty Rates <aspenpublishers.com> Links can be made by patent number, by company, by industry (SIC/NAICS) or by other means. By utilizing this information in coordination with the capabilities of the patent network visualization system described above, important questions can be answered such as:

What patents are actively available for licensing?
What are the typical royalty rates associated with patents in this industry?
Does this company license its patents?
What technologies are my competitors licensing in/out?

Corporate data—Corporate data is another source of exogenous data that can be incorporated into the patent data visualization system. Links can be made to company data by way of the assignee field in the patent database. Various types of corporate data exist from a myriad of sources. Examples of the type of data that is particularly useful to link to include financial data, and product data.

Various sources of corporate financial data exist ranging from governmental systems like the SEC's EDGAR <sec.gov/edgar.shtml> to data aggregators like Hoovers <hoovers.com> and Bloomberg <bloomberg.com>. Financial information like sales, R&D spending, market cap and many others can be used to bring further insight to the patent data. For example, annual R&D spending can be divided by the number of patents applications per year (with a time lag) to compare relative R&D efficiency. Sales divided by number of patents can be used as a signal of corporate investment in future revenue streams. Market cap divided by number of patents (or an estimate of portfolio value) to signal how expensive or inexpensive a patent portfolio might be to acquire. Comparison of these and many other measures can provide insight about the relative performance of companies and the importance, value and strength of their patent portfolios. These metrics can be incorporated into the patent network visualization system as attributes used to size related nodes and meta-nodes or otherwise alter the appearance of nodes or links in order to signal users of important information related to their research.

Product information is another source of important company information that can provide further insight to users of the patent network visualization system. Many companies have online product catalogs. This information often contains technical information that can be linked to the patent data by searching the product database for key terms found in the patent specification. The system can use the assignee information along with keywords from the patent specification to create links to product data on the company product catalog. These external links can be displayed as nodes in the network diagram and can allow users to see whether or not, and how, companies are applying the technologies they have patented.

Academic data—Another source of exogenous data that can inform a user's research on the patent database is academic data. Academic data includes information from academic and industry journals, conference proceedings, research grants, as well as other sources. This information typically exists in the public domain before a patent is issued. It therefore serves as a marker of cutting edge research that is important to many users of patent data. Links can be established between patent data and academic data in a variety of ways. First, patents frequently cite academic or industry journals as prior art. Second, the inventors listed on patents often first publish their research in academic literature, so links can be made by connecting inventor names. Finally, academic literature can also be connected to patents by way of the institutions or companies that are assigned the patent and with whom a publication is affiliated. Information about the academic literature surrounding a body of patents can be used to understand the sources of fundamental research going on in the field, identify collaborations between industry and academia, identify potential break-through technologies before they emerge in the patent data, identify start-up companies that have emerged from academic environments, and many other insights.

By linking to academic data in the ways described above, it is possible to use all of the capabilities of the network visualization system to create combined networks of academic literature and patent data. The second embodiment of the network visualization described in detail below discusses the use of the network visualization system for visualizing academic literature. The combination of the two provides a quantum leap in the ability of users to understand the development of technology and the networks of innovation among people, companies, industries and geographies over what has come before.

Implementation by a Patent Office or Commercial Patent Data Vendor

This embodiment of NVS has been found by the inventors to be incredibly useful in making sense of patent data. The USPTO, EPO and other patent offices as well as commercial patent data vendors such as Aureka, Micropatent, Delphion (all now owned by Thomson), Lexis Nexis, and others, have large databases of patent information. Other than some simple analysis tools as described above in the prior art section, none of these patent offices of commercial patent data vendors provides its customers with sophisticated tools for the analysis of patent data. The embodiment described here, either in full, or more likely a simple version with basic network visualization capabilities, would make a very powerful front-end for their customers to use in accessing their patent databases.

Thomson or Lexis Nexis could choose to employ a very simplified implementation of the NVS as a user interface for their patent databases. The simplified implementation might allow users to search the databases using Boolean searches and then return a list of documents as they do today. They could then use the NVS to convert those search results into network data and allow users to choose from a limited set of network visualizations of the search result. The system might provide users with the option to choose from one or more of the following options:

Citation network—a network of patents in the result set linked by citations

Assignee network—a network of assignees in the result set linked by citations

Inventor network—a network of inventors linked by co-inventorship links

IPC or USPC network—a network of IPC or USPC classes linked by patents assigned to multiple classes Assignee/Inventor network—a network of assignees linked by citations, with inventors linked to the assignee nodes based on the company to which they assigned their inventions Assignee/IPC or USPC network—a network of assignees linked by citations, with IPC or USPC classes linked to the assignee nodes based on the number of patents by that company filed within the IPC or USPC class Additional features that they would likely want to include would be the ability to filter the result set to limit the records in the visualization. Filtering options should include the ability to filter out records from the visualization with particular; date ranges, assignees, IPC or USPC classes, inventors.

While this implementation of the NVS would lack many of the features described in this embodiment, it would be a quantum leap for their users in terms of their ability to understand the results of their patent searches. It would allow them to examine their search results from many different perspectives, refine their searches through the NVS filtering capabilities, and ultimately examine patent lists or patent documents directly through the NVS system.

It is also noteworthy that the two major commercial patent data vendors are part of large organizations that house many other sources of data. The NVS as described in both this embodiment as well as the more general description above could provide a front-end for all of their various data types. Also, some of the exogenous data sources described in this embodiment are actually owned or offered through a licensing arrangement by the two major patent data companies, Thomson and Lexis Nexis. The implementation of the NVS as a front end for access to their databases as well as a way to link disparate sources of data within their systems would allow these companies to provide a highly differentiated value proposition to their customers. These and other data vendors need to find alternative ways for users of their databases to extract more value from their data in order to grow and support higher prices and profit margins. The NVS could make a significant contribution toward those objectives.

Example 2

Method and Apparatus for Searching for and Analyzing Documents in a Medical Publication Database In a second example, one or more embodiments of the invention are applied to searching for and analyzing documents in a database of academic literature. One example of such a database is the medical publication database known as the PubMed database. Application to other academic databases is also possible.

The PubMed database is a large database of medical research papers appearing in nearly 200 medical journals. It is a rich repository of information about the research domain in the world of medicine. The PubMed database is most frequently used by doctors or other medical professionals who are looking for information about a specific disease, treatment or other subject of medical interest. Their research invariably begins with a Boolean search for a keyword, author or journal after which they are presented with a list of papers matching their selected criteria. The researcher's next step is to scan through the search result list and read titles and abstracts until she finds a paper that interests her. She then proceeds to read some or all of the article. She may then return to her search result and continue to scan and read results until she has found the information she is looking for.

This method is useful for medical professionals and is perfectly appropriate if the researcher's objective is to find information that is likely to be WITHIN one or a few papers. However, there is a class of questions that cannot readily be answered in this way. We call these meta-questions. They are questions, not about what is contained within the articles, but about the meta-entities which those articles represent. Rather than asking questions about articles and what is contained in them, researchers are often interested in questions such as the following:

What is happening in the field of gene therapy?

Who are the leading researchers on Alzheimer therapies?

What institutions are collaborating in researching osteoarthritis?

How are the various domains of cancer research related to each other?

Who are the most influential researchers in nanobiotechnology?

What research is going on in specific fields of medical science such as disease groups (e.g., Alzheimer disease), therapies (e.g., immunotherapy), or specific mechanisms of action (e.g., blocking plaque formation)? How quickly is the work progressing? How has this changed over time?

What is the pattern of collaboration in a given field? Who is involved? How are they working together? Where is there a tightly knit research community? Where is it fragmented? Where are the best opportunities to bridge clusters of research in order, for example, to translate scientific discovery into practice in MRSA? Has the pattern of collaboration improved, diminished over time?

What is the intellectual structure of a given field, i.e., which topics tend to researched together? Which not? Is this for reasons of science or lapses in institutional and social connection? What are the frequently repeated strong topic connections? Which connections are emerging for the future?

How does the way that a domain is researched (i.e., the intellectual structure as it evolves over time) affect the collaboration patterns that emerge, and vice versa?

How do people within specific companies or universities collaborate on specific topics? Among themselves? With others beyond the institution?

Who are the most influential medical scientists in a given therapeutic area? Who is most central to a network? What set of medical scientists best collectively span a network with their individual patterns of influence?

These questions, and many others, can be answered using the NVS as described above. Academic data and specifically PubMed data can also be analyzed and visualized in the same way as patent data. The attributes of patent data that make it analyzable by the methods described here are directly analogous the data found in academic databases including PubMed. FIG. 20 shows the relationships between attributes of patent data and attributes of academic literature.

As can be clearly seen, there is a direct correspondence between the two data sources. This makes it possible to analyze the PubMed data (or any database of academic literature) using the same methods as described in the previous embodiment. However, not every attribute of patent and academic data are directly analogous. Therefore, it is necessary to slightly modify the methods described in the patent network visualization system for specific use with academic literature.

Just as with the patent visualization system, the medical network visualization system allows the user to create and examine database records from the academic database as a network of nodes and links. As with the patent database, the academic data is not initially structured as network information. In other words, it does not contain a node list and a link list. Before it can be visualized as a network, academic data must first be restructured in order to convert it into network information. This is accomplished in exactly the same way as described in the previous embodiment.

Once the data is structured, it is possible for the user to view various network visualizations based on database records from the PubMed database or other academic database. Unlike prior art systems, the medical network visualization system does not require a stable definition of the nodes and links of the network. Rather, the researcher can change the definition of both nodes and links dynamically according to her interest. This ability to transform the network from one node/link definition to another, and the ability to simultaneously view multiple connected network views of the same data, makes it possible for the user to quickly and easily make sense of a large set of database records, and answer meta-level questions that can not be answered through any other means.

As with patent data, the network of medical data can be thought of in a variety of ways with different definitions of what is a node and what is a link. Some examples of the various node/meta-nodes and link/meta-links that can be created from the PubMed data are described below.

Nodes/meta-nodes—Node/meta-node definitions in the medical data context include but are not limited to articles, papers, grants, reviews, authors, journals, year of publication, reviewer, author city/state/country, institution city/state/country, journal country, MeSH categories, and others as well.

Links/meta-links—citations, co-citations, bibliographic coupling, common MeSH class, common year of publication, common semantic cluster, common reviewer, common author city/state/country, common institution city/state/country, common journal country, and others as well Any combination of these node/meta-node and link/meta-link definitions as well as ranges and combinations of the above can be used within the NVS to examine sets of PubMed data.

Further, these nodes and links can be sized to provide additional information to the user as described above. Some particularly useful attributes that can be used for sizing nodes and links in the medical data context include:

Node/meta-node sizing—In the context of medical data, several specific metrics are relevant for node/meta-node sizing. Some examples include; the metanodes can be sized based on the number of articles, number of times the articles are cited (forward citations), number of articles cited by the represented patents (backward citations), total citations (forward plus backward), citations/year since publication, average citations per article, average/total number of MeSH categories, number of authors, and many other attribute metrics.

As mentioned before, nodes and meta-nodes can also be sized based on any number of network statistic calculations like the sum of centrality/eigenvector centrality/betweeness centrality for the represented articles. In the context of medical research, these metrics signal how important the research is based on peer citations. The ability to spot important research is critically important for biotech and pharmaceutical and other life-sciences companies as they try to stay on the cutting edge of research and access leading research that will help them introduce the next blockbuster drug or highly profitable medical device. The ability to size nodes and meta-nodes in the NVS makes it easy to spot important research within a large and complex area of medical science.

Link/meta-link sizing—Some examples of attributes for link/meta-link sizing that are relevant in the medical domain include number of citations, number of unique articles cited, number of articles citing, average age of citation, age of most recent citation, as well as others.

Examples of the Medical Network Visualization System

Shown below are various exemplary screen shots illustrating various network diagrams generated using the Medical Network Visualization System (MNVS) for performing searching and analysis of particular medical documents. These maps, although based on a limited set of node and link combinations, reveal the capabilities available to a user of the network visualization system. For these simple examples, both nodes and meta-nodes maintain constant sizing, and links and meta-links maintain constant widths. However, as with the Patent Network Visualization System, these parameters can also be altered to provide even more insight to the user.

Figure 21:
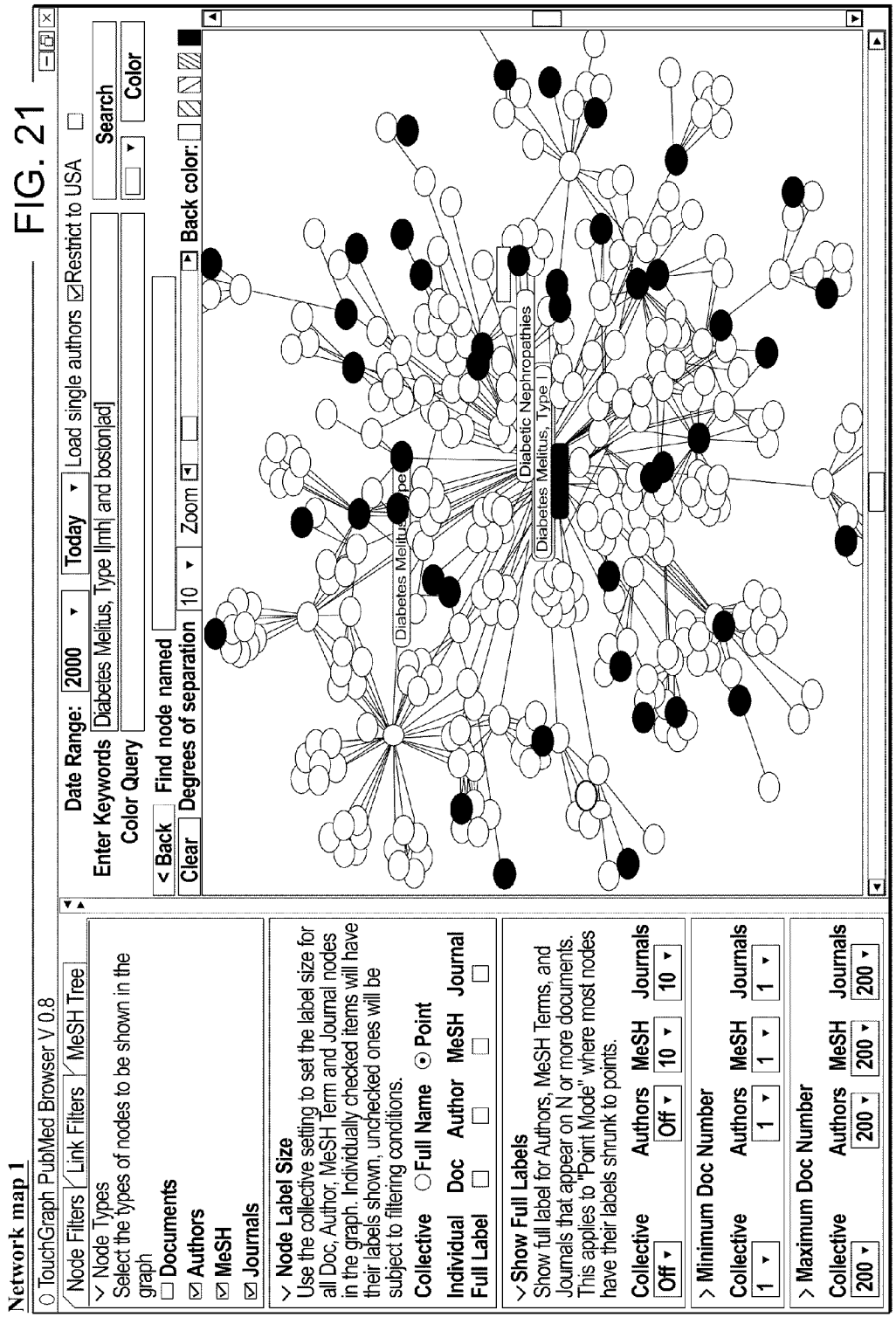
FIG. 21 shows a typical network based on PubMed data and visualized using the MNVS described herein

FIG. 21 shows a typical network based on PubMed data and visualized using the MNVS described herein. It is the result of a search for documents written from January 2000 to the present with the medical subject heading (MeSH) "Diabetes Mellitus Type I" and the location "Boston." The tool retrieved 124 documents in order to create the map of the network. One can interpret the links in the map as per the key above.

The network diagram displays three different kinds of meta-nodes (author meta-nodes, journal meta-nodes, and MeSH meta-nodes). In a preferred embodiment of the medical network visualization system, the node types are differentiated by different colors (authors—black on yellow, journals—white on green, and MeSH—blue on white). Although these are difficult to see in a black and white representation, they appear as follows (authors—dark on light, journals—white on dark, MeSH—dark on white).

Figure 22:
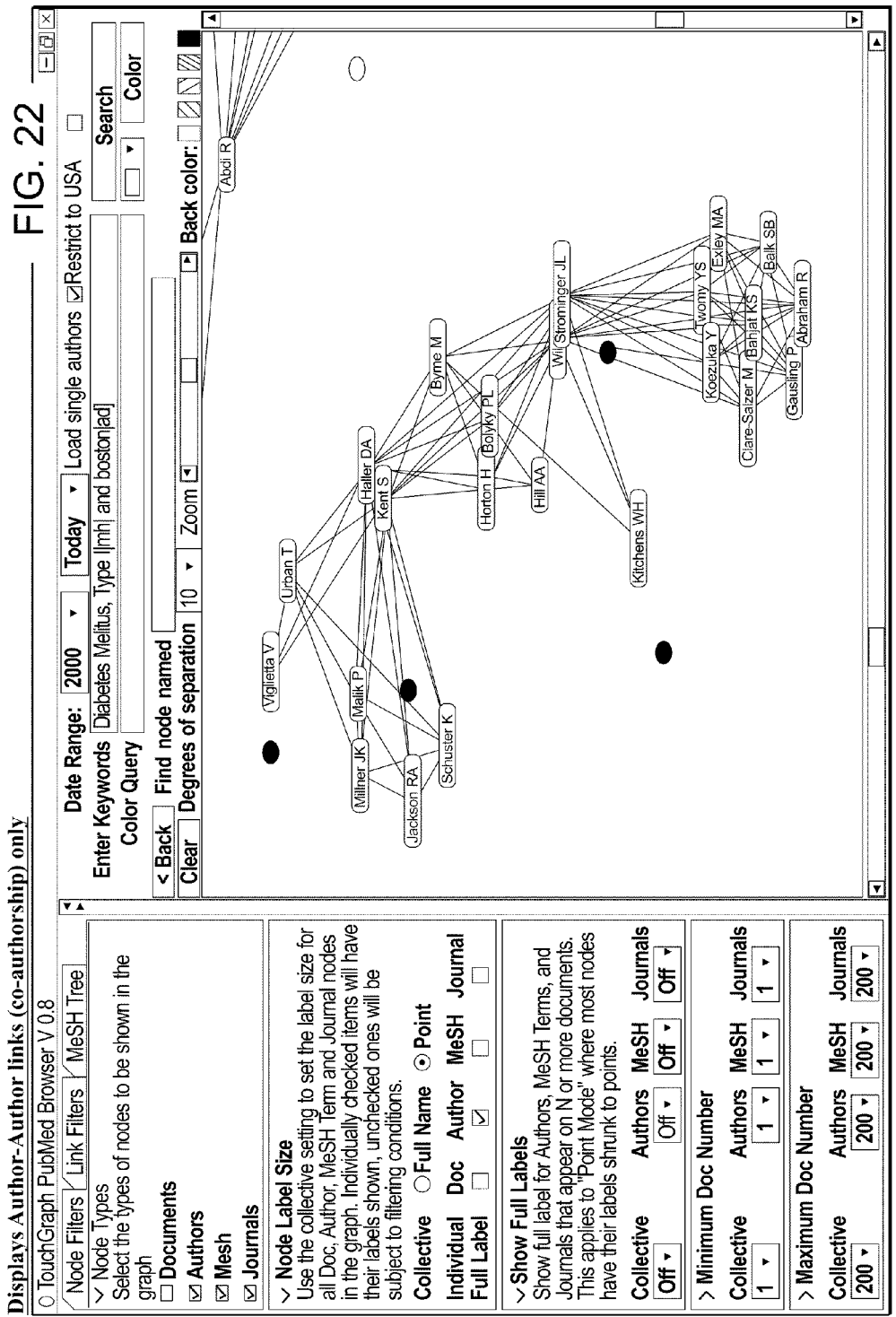
FIGS. 22-25 show an alternative view of the network shown in FIG. 21.

The MNVS provides the user the capability to choose node and link definitions as she works. FIG. 22 demonstrates this capability as it shows a detail of the same network as in FIG. 21, but displays only the Author-Author links, which reveal the social network of the scientific community. From these kinds of network diagrams, it is possible to learn who the leading researchers are within a particular field of study, with whom they collaborate and which scientists are most influential.

One unique element of medical journal databases is the significance of the order of author names on an article. Based on interviews and our experience with this kind of analysis, we have learned that the first author on a medical journal article is the Principle Investigator (PI) on the research. If a second PI is involved in the research (as is often the case), her name will appear second. The last name in the author list is the head of the laboratory in which the research was conducted. This "lab head" probably had little involvement in the actual research project, but is likely to be an important person in the field. The names falling between the second and last name in the author list are typically laboratory assistants and other minor contributors to the piece.

For this reason, the MNVS allows users to select which author names to include in the network. One useful setting we have discovered is to include first, second and last authors names in the network and exclude all others.

Figure 23:
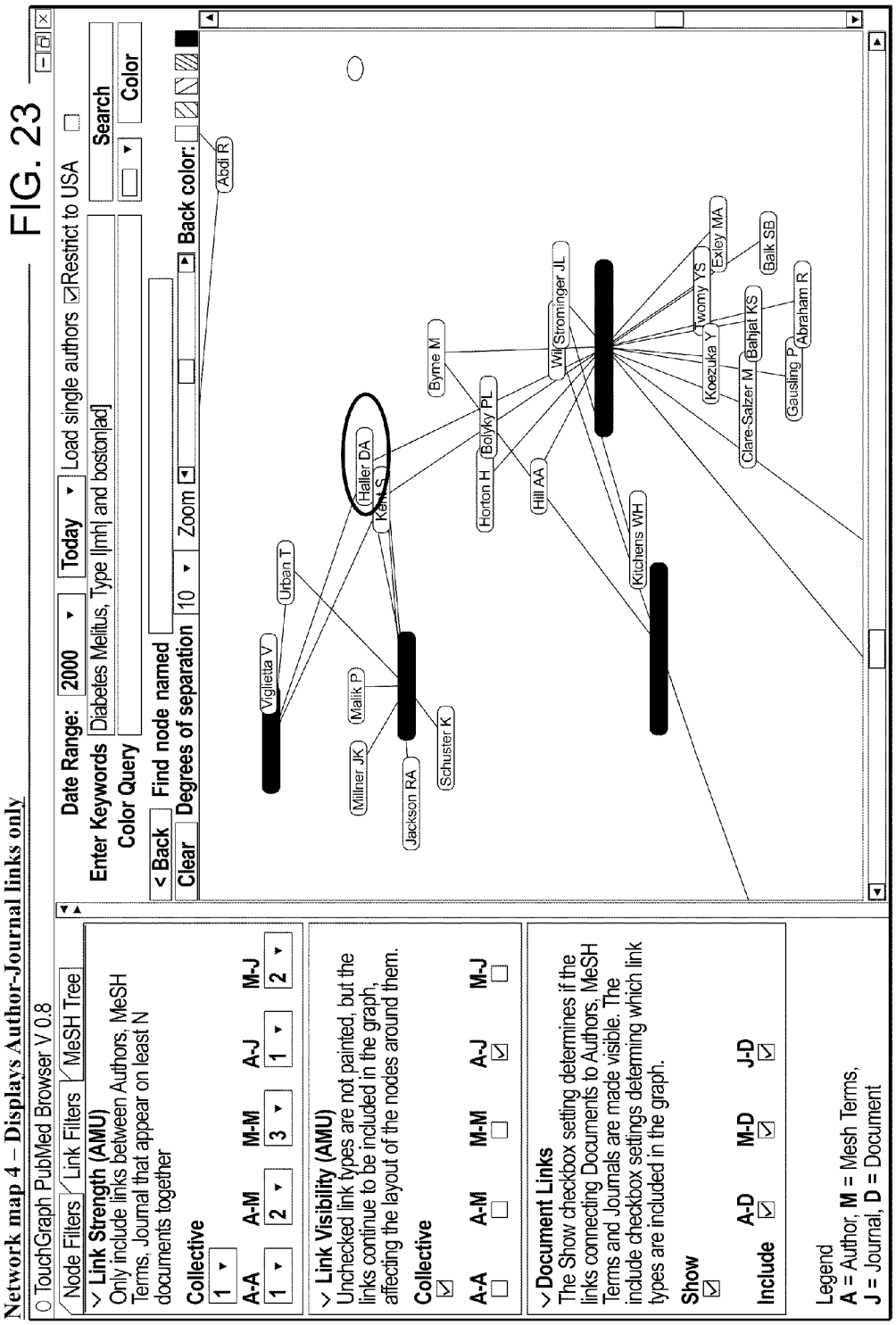
Figure 24:
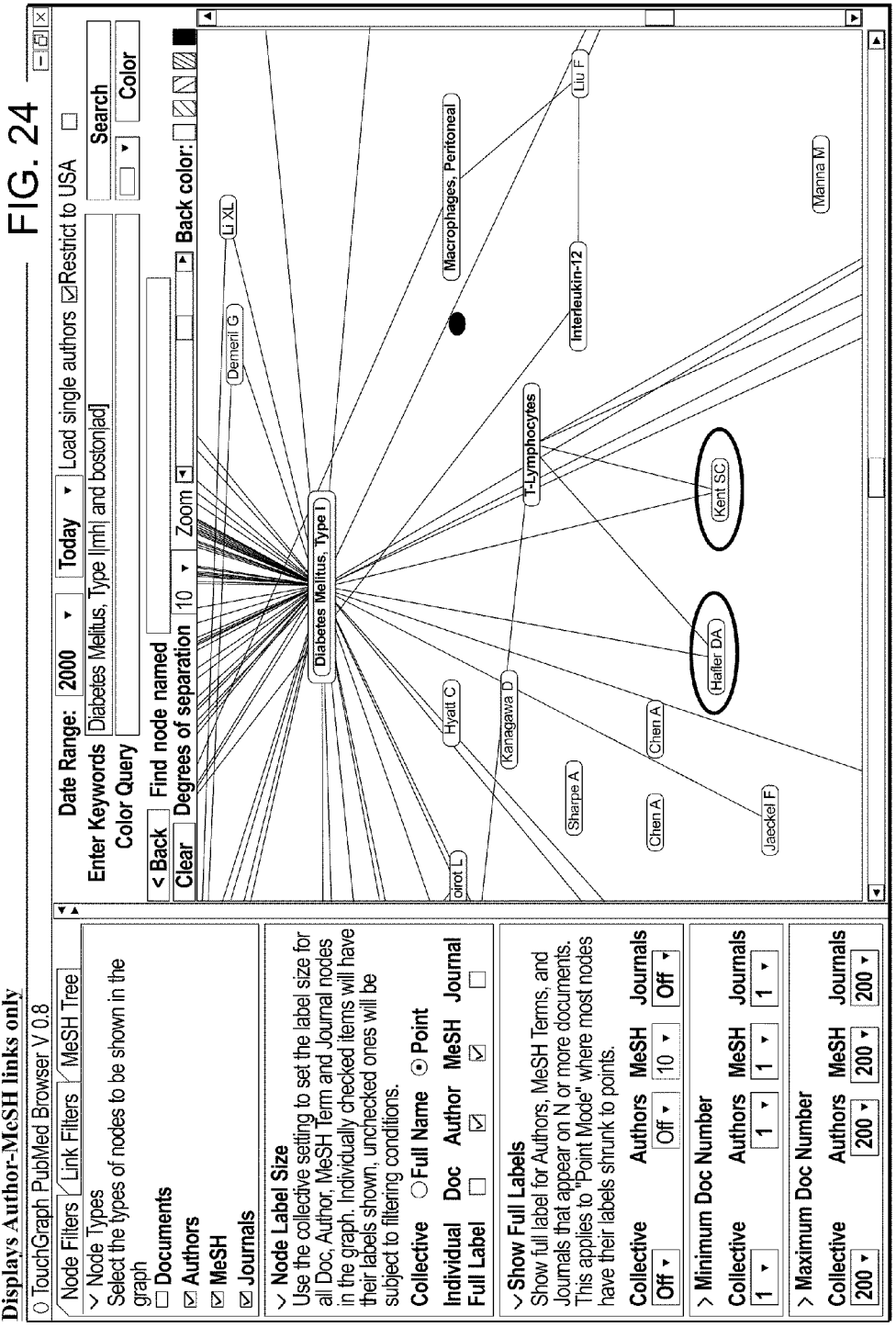

FIGS. 23 and 24 further demonstrate the capabilities of the MNVS. Here the same network is transformed into a network of authors and journals (FIG. 23) and authors and MeSH categories (FIG. 24). These networks enable a user to quickly understand the areas of research interest of researchers within the network.

Figure 25:
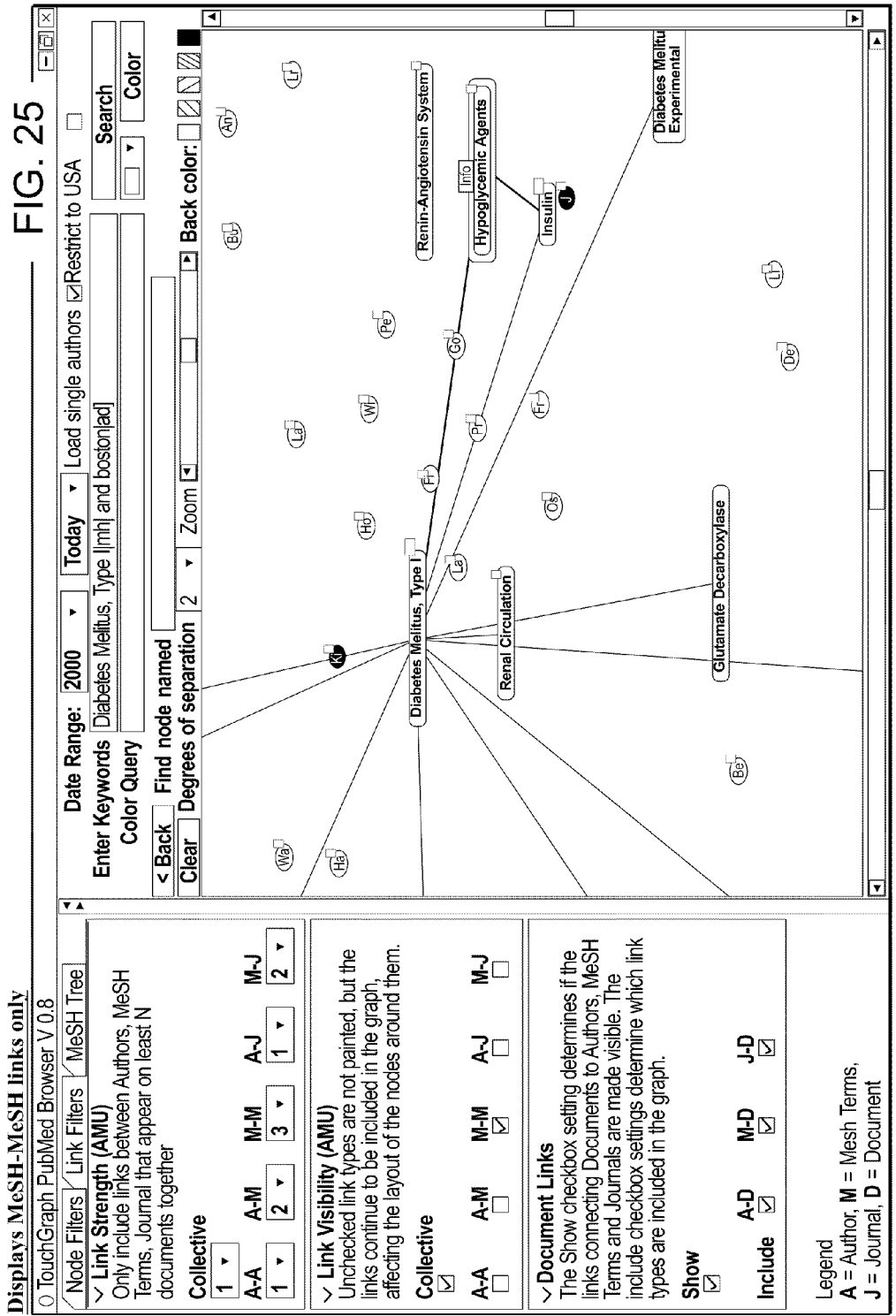

Finally, FIG. 25 shows the same network once again, however this time it displays the network of links between medical topic areas as designated by the MeSH categories. Using the MNVS in this way, medical professionals are often surprised to find an unexpected nexus between two medical fields that on the surface appear unrelated. Observations about unexpected connections between medical subjects can lead to new ways to think about medical problems and suggest new paths for research as they offer the potential to apply findings in one field of study to challenges in another area of research. The medical profession tends to be silo-ed by professional specialty because specialists in Field A rarely mix with specialists in Field B because they do not attend the same conferences, participate in the same residency programs, read the same journals or otherwise interact. There is tremendous value in putting together the right people from the different specialties, because entirely new paths of inquiry are often suggested. The medical network visualization system makes it possible to instantaneously observe unexpected areas of connection from which new medical insight may emerge.

Applications of Network Visualization of Medical/Academic Data

Figure 26:
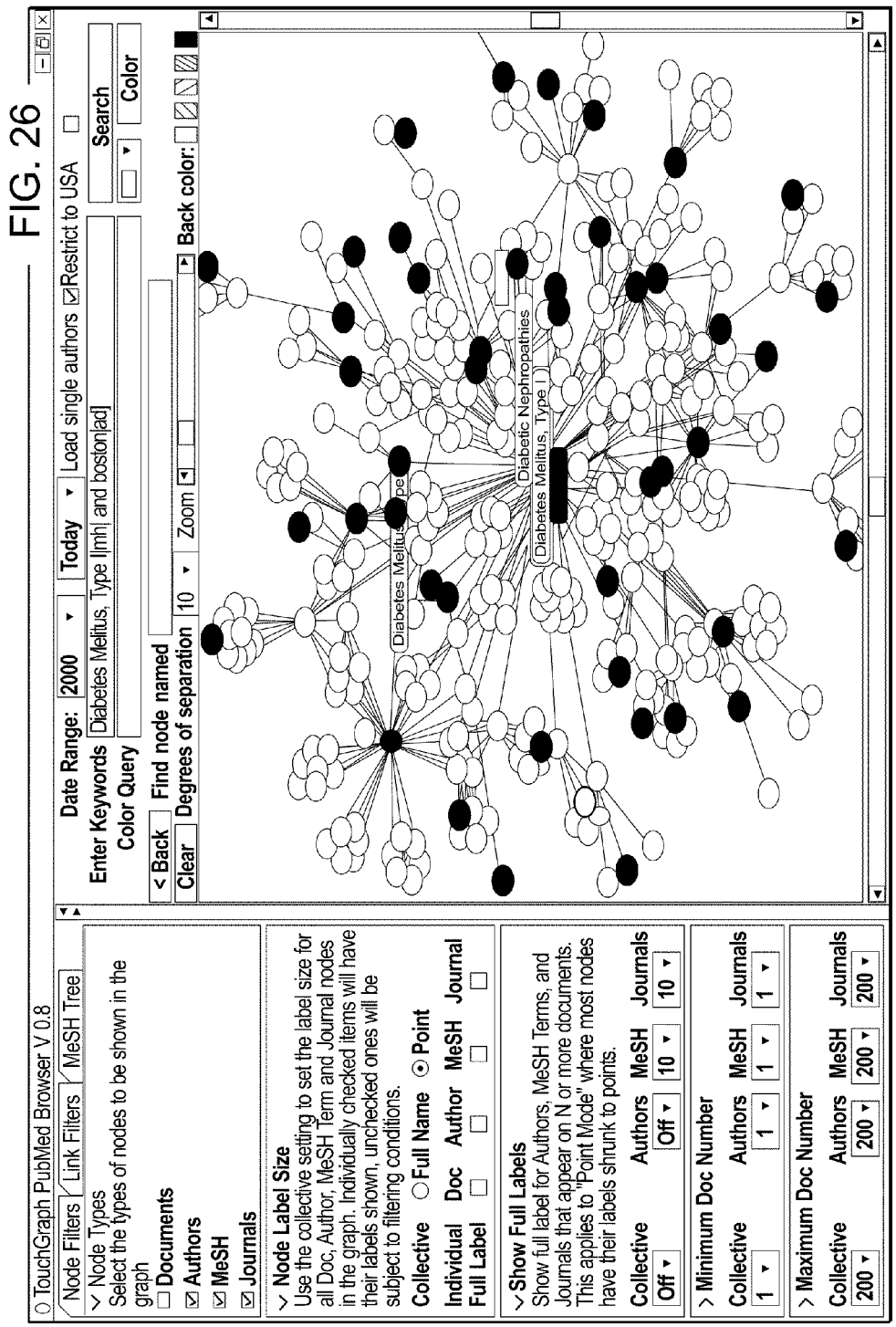
FIGS. 26-27 shows a network, produced by one described embodiment, of different clusters of collaboration.

The capabilities enabled by the medical network visualization system give researchers the ability to analyze and develop deep insights into large sets of medical database records. These insights come in various forms and therefore, the network visualization system can be used in various contexts to analyze topics such as:

Organization of collaboration (in general)
Organization of collaboration within a company
Who to target as Key Opinion Leaders (KOLs) or key researchers in a geography for clinical trials or market influence
Topic clustering in a particular field (which MeSH categories go together)
Research synergies or substitutions across organizations
Regional bases of research strength in a broader geography Organization of Collaboration in General At a basic level, the network in FIG. 26 shows different 'clusters' of collaboration. A user can easily identify groups of authors who have published together in various journals. Another feature of the system is the ability to color author meta-nodes based on the institutional affiliation of the author. This provides even deeper insight into the patterns of collaboration.

Organization of Collaboration within a Company

Figure 27:
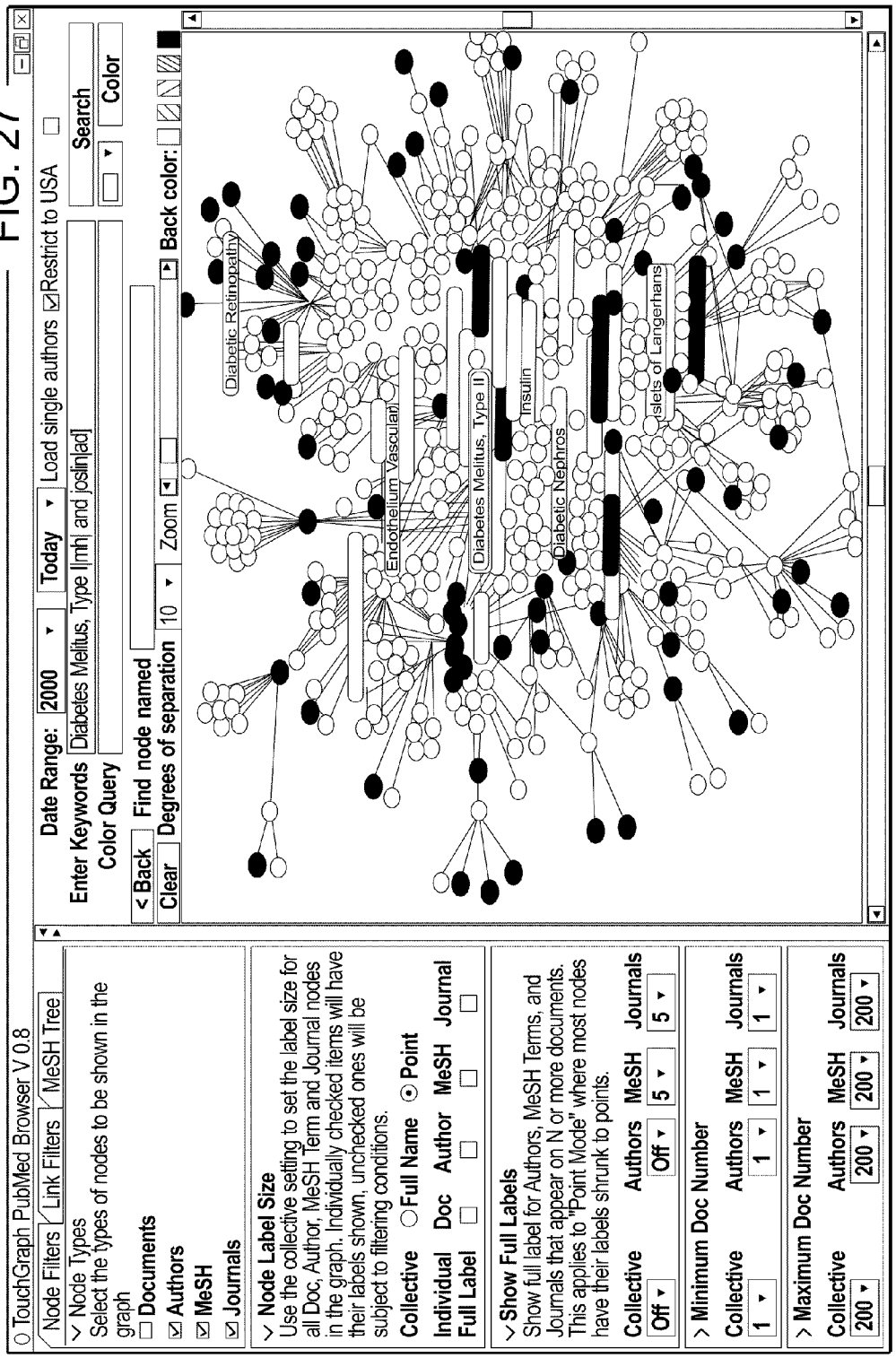

The network in FIG. 27 is the result of a search of the MeSH category Diabetes Mellitus and the institution Joslin (institution is found as part of the address field in PubMed). Joslin is short for Joslin Diabetes Center—the world's leading diabetes center. The diagram identifies pockets of collaboration—people within the organization who co-author documents on specific topics. The diagram displays in full text the names of journals and MeSH terms that appear on five or more documents in the search. This enables one to see popular research topics such as Diabetic retinopathy and Islets of Langerhans, as well as journals that this organization has published in since 2000 including Diabetes, Diabetologia, Transplantation, and Diabetes Care, among many others.

Figure 28:
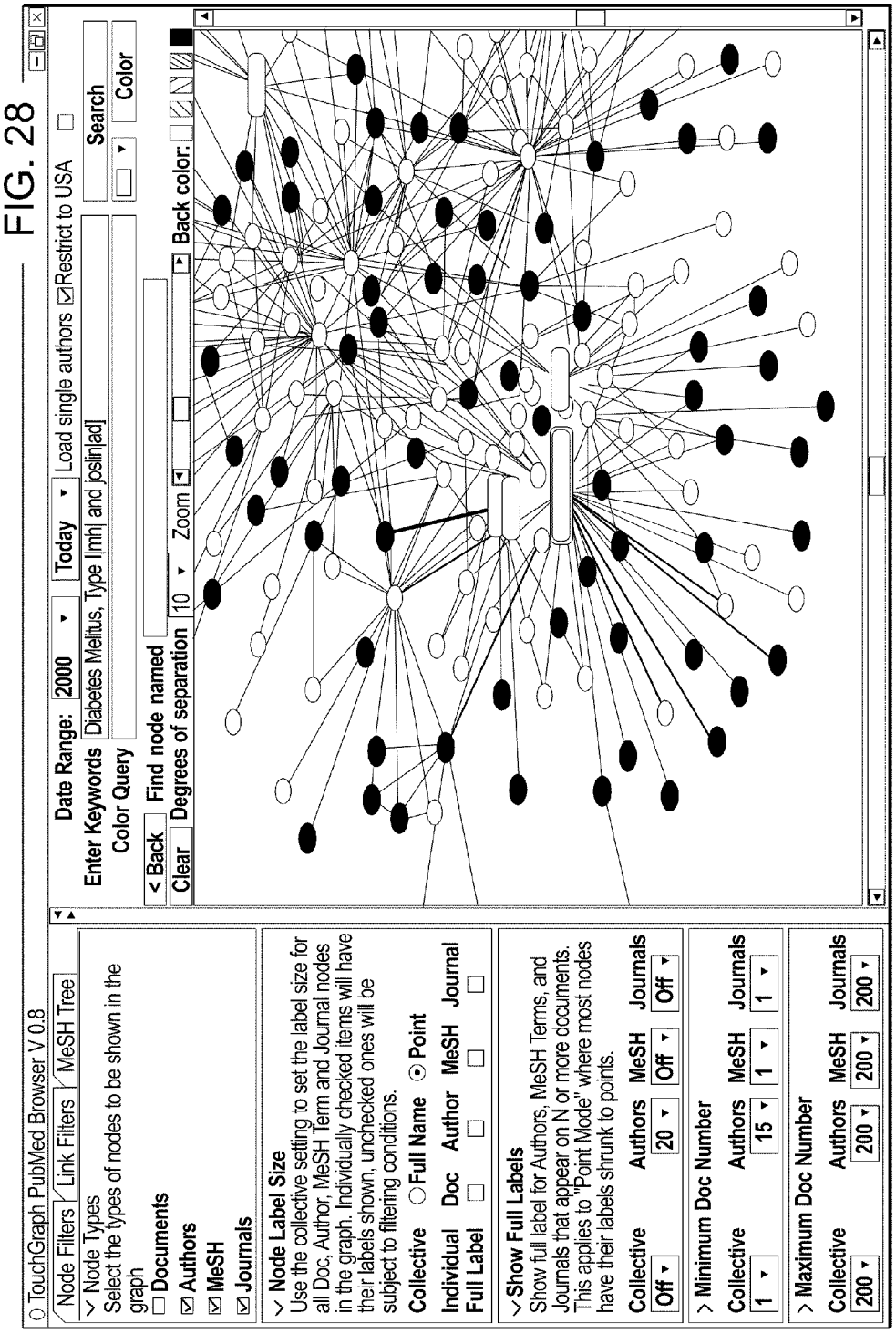
FIG. 28 shows a network, produced by one described embodiment, of a search limited by geography.

Targeting Key Opinion Leaders (KOLs) or Key Researchers in a Geography for Clinical Trials or Market Influence In FIG. 28, the diabetes mellitus search has been limited by geography (Australia) instead of institution. Here, the network map is restricted to show only those authors who have written 15 or more documents. Cooper M E is an author whose name appears on 49 documents—subject to further investigation, it is likely that Dr. Cooper is key opinion leader in Australia that a pharmaceutical or biotech company would want to target if it is marketing a diabetes drug.

Topic Clustering in a Particular Field (which MeSH Categories go Together)

Figure 29:
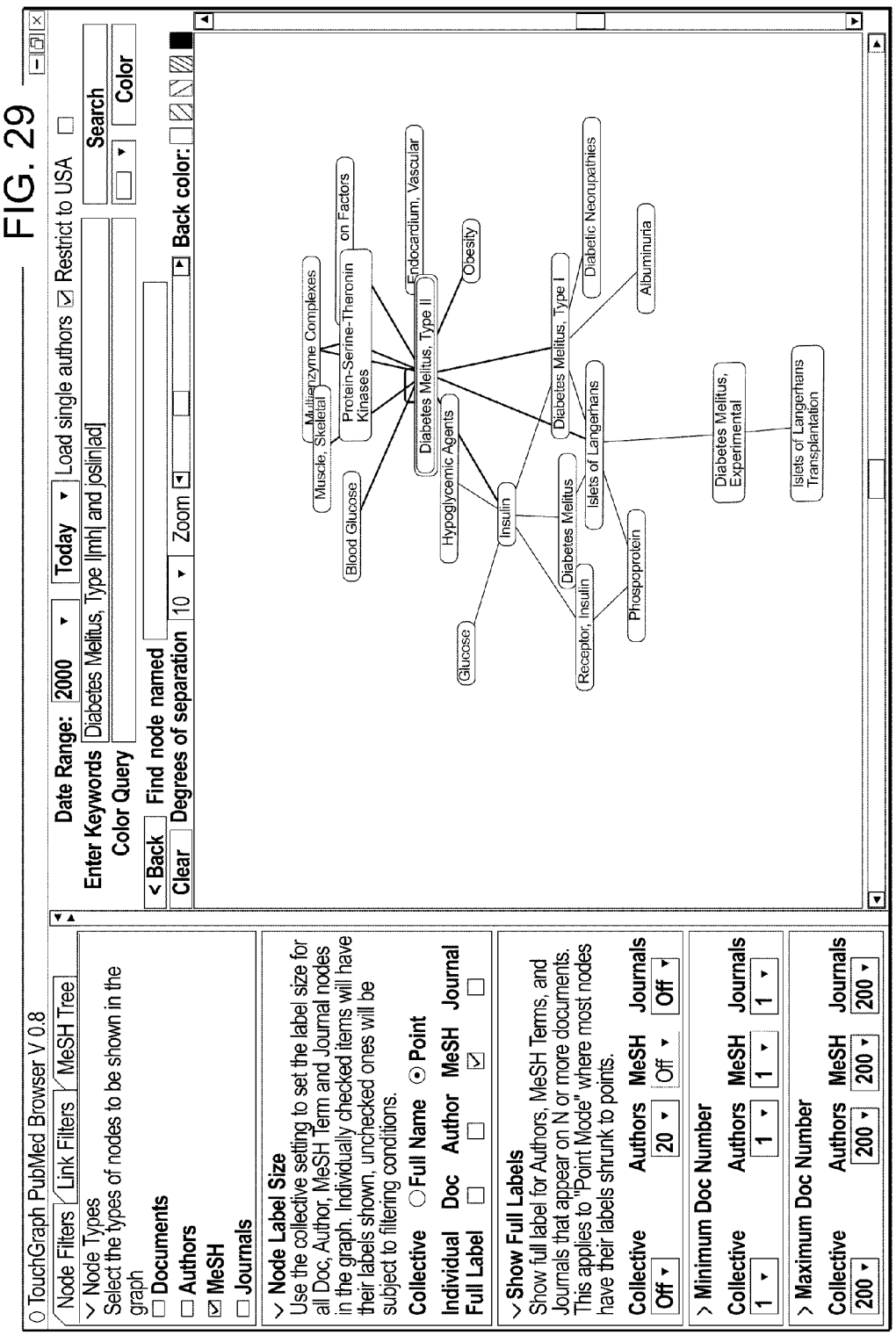
FIG. 29 shows a network, produced by one described embodiment, of a search limited by organization.

FIG. 29 shows a network resulting from a search that is limited by organization to highlight that a user can also see related MeSH categories. Here all other nodes and links have been removed and what is left reveals that documents share MeSH categories. For instance, in this example documents with the MeSH category Diabetes Metllitus, Type II are also coded as Obesity, Islets of Langerhans, Blood Glucose, and Insulin, among many others.

Research Synergies or Substitutions Across Organizations

Figure 30:
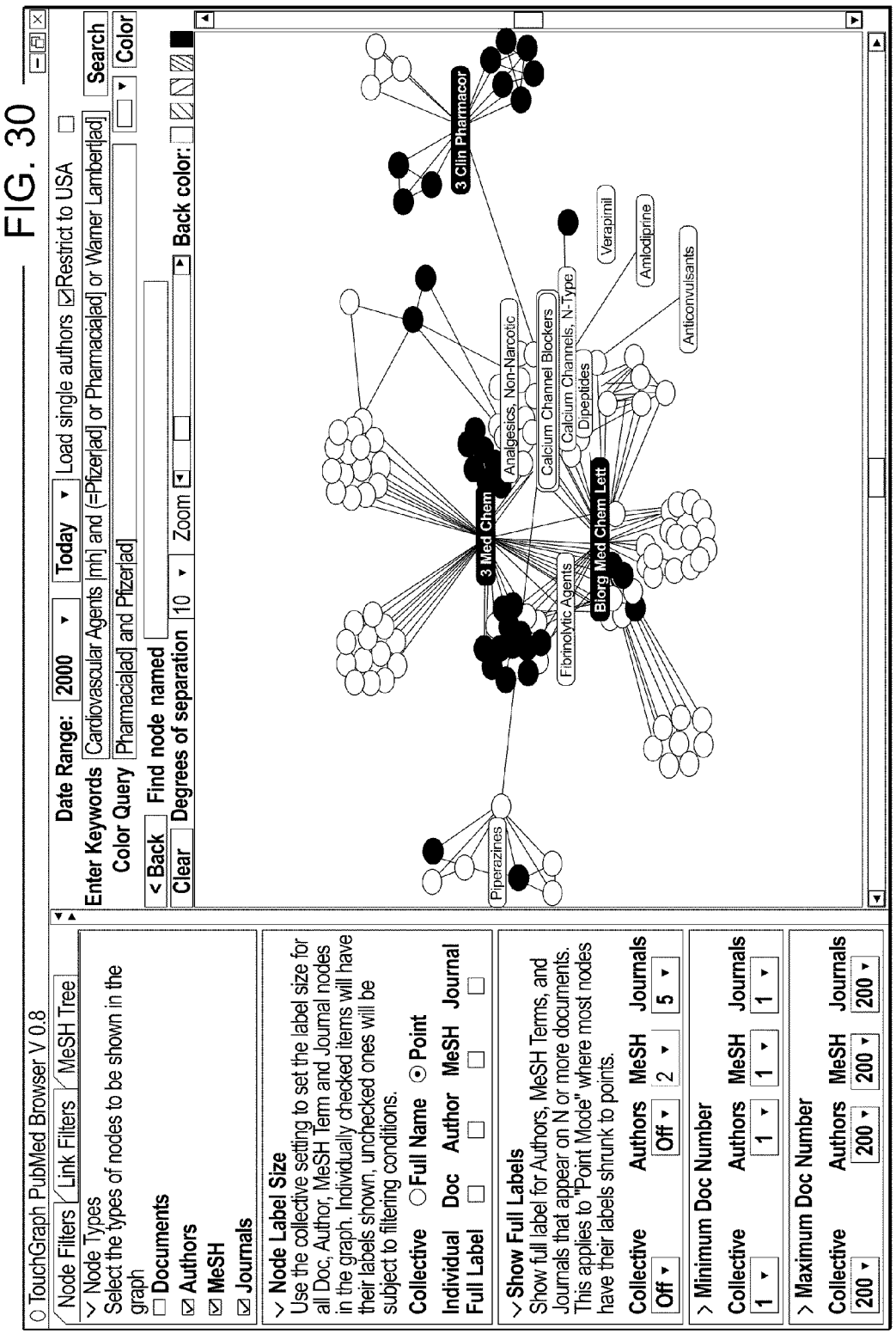
FIG. 30 shows a network, produced by one described embodiment, which illustrates research synergies or substitutions across organizations.

The network shown in FIG. 30 results from a search on the MeSH category Cardiovascular Agents and three specific organizations. The following organizations and or combinations of them have been highlighted using the Color Query feature: Pharmacia (yellow), Pfizer (green), Warner Lambert (blue), and the combination of Pfizer and Pharmacia (purple). This map enables a user to see which MeSH topics organizations' research falls under within a larger domain. This could help organizations think strategically about investment of resources in certain research projects, the competition in a particular research area, and/or emerging areas that they are not yet involved in.

Regional Bases of Research Strength in a Broader Geography

Figure 31:
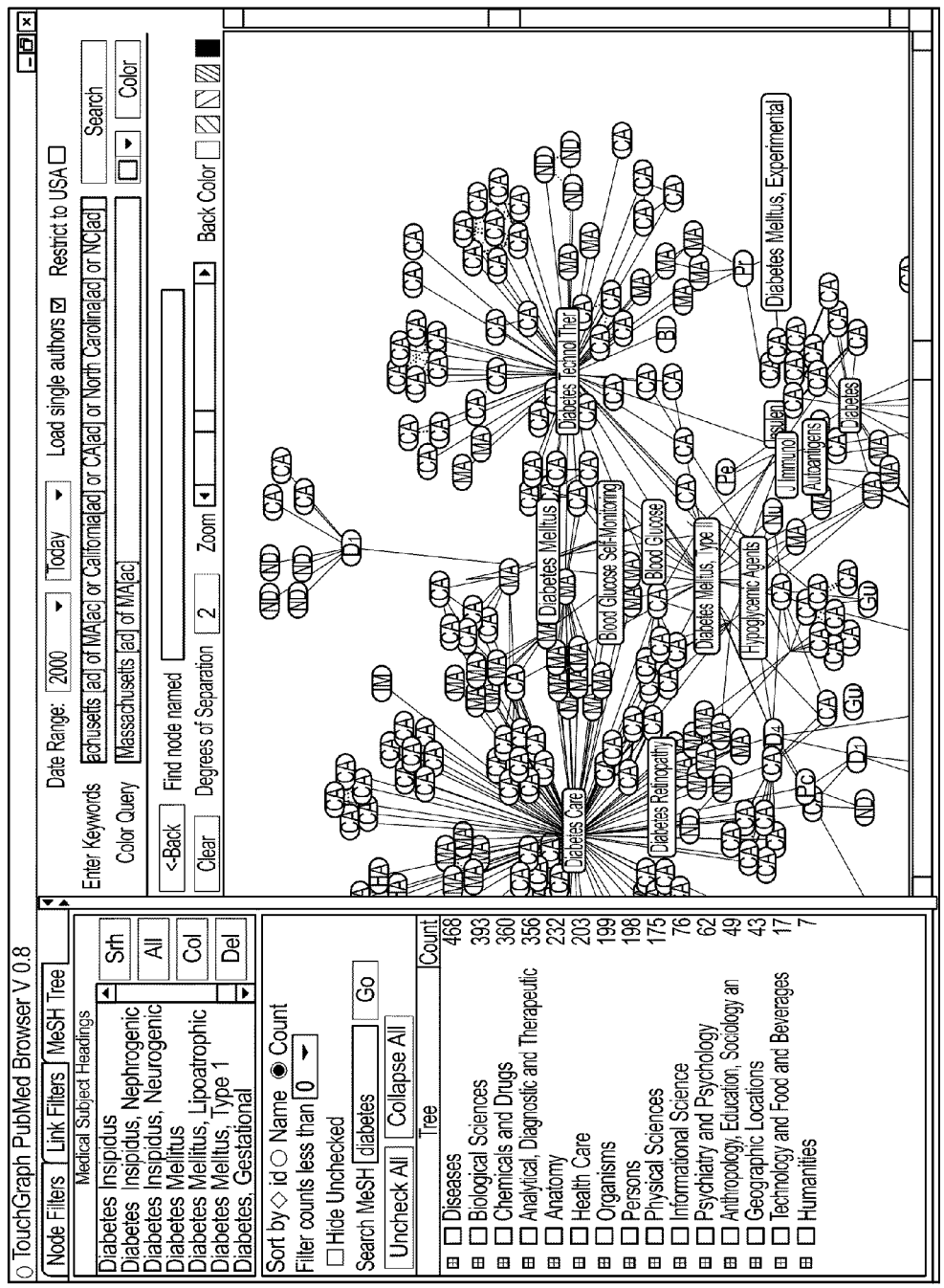
FIG. 31 shows a network, produced by one described embodiment, which illustrates regional bases of research strength.

The MNVS can also help reveal research "hubs" across geographies. In FIG. 31, a search has been designed to highlight research under the MeSH category Diabetes Mellitus Type I in Massachusetts (color coded green), California (color coded pink), and North Carolina (color coded blue). A user could run a similar search without geographic restraints and explore the data to see what areas seem to emerge as "hubs." Additionally, a user may be able to identify geographies that may be focused on a smaller niche within the broad domain (e.g. Autoantigens in this diabetes research example).

As demonstrated in these examples, all of the features of the NVS described above are relevant to the analysis of PubMed data including network transformation, use of multiple nodes and links, fractal networks, network animation, statistical information and linking to external data sources. Some elements of the preferred embodiment of the NVS that are specific to the analysis of PubMed data are further described below.

Statistical Information

Various types of statistical information is relevant for the analysis of PubMed data including:

Institutions—Number of articles in the selected network by institution sorted from highest to lowest.

Authors—Number of articles in the selected network by Author sorted from highest to lowest.

Classification—Number of articles in the selected network by MeSH category sorted from highest to lowest or sorted by classification category. Since the MeSH classification schemes is hierarchical, the data is displayed using a tree structure with the number of articles within each category and subcategory displayed alongside each branch of the tree.

Word usage—Number of articles containing key words, phrases or word groupings.

Citation—Various types of information about citations can be provided. These include but are not limited to the following:

Most frequently cited articles, institutions, authors, or other grouping.

Highest number of citations per year since publication for articles, institutions, authors or other grouping.

Statistical information is also provided in pop-up windows. Several examples of the kind of information provided in the pop-ups that is specifically related to PubMed data are described below:

Article node pop-ups—When a article node is selected, a pop-up window can be called up which displays information about the article that is represented by the selected node. The information provided includes all of the basic information provided on the summary page of a typical article including PubMed ID number, title, authors, institutions, publication dates, MeSH classes, citations, as well as other data from the article like number of pages, number of figures, number of words, etc. In addition, many of the fields in the pop-up window are hyperlinked allowing the user to pull up additional information. For example, the article number is hyperlinked to the full text of the article (or a .pdf), citation links are hyperlinks, as well as other hyperlinks. The pop-up also can include statistical information about the article like centrality.

Institution meta-nodes—When an institution meta-node is selected, a pop-up window can be called up which displays a menu of different kinds of data that can be displayed about the institution and the articles represented by the meta-node. Menu options include tables showing a list of the articles represented the meta-node, articles by MeSH category, articles by author, and a graph showing articles by year. Additional menu options include network statistical information that can be displayed about institution meta-nodes including total citations, average citations per year (since year of publication), the sum of eigenvector centrality for the institution's portfolio/the sum of eigenvector centrality for the entire network (a measure of portfolio value). Another menu option provides information about the institution. This menu option links to the institutions website or to basic company and financial information about the company.

Author meta-nodes—When an author meta-node is selected, a pop-up window can be called up which displays a menu of different kinds of data that can be displayed about the author and the articles represented by the meta-node. Menu options include tables showing a list of the articles represented the meta-node, articles by co-author, articles by MeSH class, and a graph showing articles by year.

MeSH meta-nodes—When a MeSH meta-node is selected, a pop-up window can be called up which displays a menu of different kinds of data that can be displayed about the MeSH category and the articles represented by the meta-node. Menu options include tables showing a list of the articles represented the meta-node, articles by institution, articles by author, and a graph showing articles by year. Another menu option provides information about the MeSH category. This menu option provides detailed information about the MeSH category including a full description of the class and its location in the MeSH hierarchy.

Meta-links—When a meta-link is selected, a pop-up window can be called up which displays information about the connections represented by the meta-link. A table can be displayed showing a list of article to article links represented, as well as a graph of the number of individual links represented by the meta-link over time. If for example, the meta-link is a co-authorship link, the meta-link pop-up will show a history of the collaboration between the two authors. If the meta-link is an institution-institution citation link, the pop-up will show a history of citations between the two institutions.

All of this pop-up information makes it possible for the user to explore the article network at any level of detail desired, from high level meta-data down to the deepest level of detail about institutions, authors, fields of sturdy and articles. This makes the MNVS tool a powerful tool for understanding a large set of PubMed documents.

Linking to External Data Sources

Some examples of useful exogenous data sources specifically related to medical data as well as their use within the MNVS are described below.

Doctor affiliation data—One valuable source of external data to link to related to the PubMed database is information about the affiliation of the researchers. Most authors in PubMed are doctors, and it is possible to link to information about those doctors in both public an proprietary databases. These databases contain information like medical specialty, hospital privileges, DEA#, medical school attended, residency programs completed, medical association membership, etc. Linking to this data makes it possible to create whole new categories of meta-nodes as well as new types of links that cannot be made through the PubMed data alone.

Script data—Another highly valuable source of exogenous data is Script data. Proprietary databases such as IMS maintain information about the prescribing patterns of doctors. They calculate the number of prescriptions that doctors write for each and every drug they prescribe. This data is incredibly valuable as a source of information to biotechnology and pharmaceutical companies to determine which doctors are the most important to reach from a marketing standpoint. When combined with the MNVS, the tool enables biotech and pharma companies to identify key opinion leaders (KOLs) that are most closely connected to the largest number of subscribers of the medications in the therapeutic area of interest. By targeting these KOLs, the companies can influence the prescription patterns of the doctors and capture market share.

Referral data—Proprietary databases like LRX also provide a source of valuable external data to link to. The LRX database captures doctor referral information which can be used to create a social network of medical relationships within and across specialties.

Survey data—Companies like Alpha Detail conduct surveys of many thousands of doctors to determine what information they read, and what other doctors they are influenced by. This data is valuable as another source of exogenous data particularly in addressing the marketing questions of life-sciences companies.

Grant data—Often the step before medical literature is published is the submission and approval of a grant. In the US, the vast majority of these grants come through the National Institutes of Health. The NIH maintains a database known as the Computer Retrieval of Information on Scientific Projects (CRISP). This database has information about all NIH funded research projects. Linking to this data makes it possible to track innovative research even earlier than the first medical article publication. Other countries also maintain similar databases.

FDA trial data—The FDA maintains information in public databases about the various drug candidates that are in various phases of the FDA approval process. By linking to this data, it is possible to analyze how medical research feeds into the drug pipeline and assess the position of the various drug an drug companies.

FDA product data—At the other end of the time scale is the FDA databases. The goal of most medical research is to develop a treatment for some disease which in most cases must be approved by the FDA (within the U.S.). The FDA maintains the DRUG database and many other databases that provide information about over-the-counter and prescription drugs as well as food supplements and many other health related products. By linking to this data, it is possible to track the output of the research contained in the PubMed database.

Institutional data—Institutional data is another source of exogenous data that can be incorporated into the MDVS. Links can be made to institution or company data by way of the institution field in the PubMed database or indirectly through a database of institutional affiliations held by the doctor/author. Various types of institutional/corporate data exist from a variety of sources. Linking to this data makes it possible to analyze more deeply the role that companies, universities, government entities and research institutions play within an area of research interest.

Patent data—Links to the patent data are also critically important. The patent data represents the portions of medical research that have been converted to protectable intellectual property rights.

Combining the Patent and Medical NVS

Although the patent and PubMed embodiments have been described separately, the NVS is also capable of combining these two data sources. Links between the two data sources come in a variety of forms including citations from patents to academic literature, article authors and inventors can be linked, company/institutions can also be linked. By linking the medical research data with patent data as well as grant, FDA and script data, it is possible to get a picture of the entire lifecycle of an idea from inception all the way through product approval and marketing.

The NVS enables a much deeper understanding of the nature of scientific and technological development than has ever been possible before. Many different kinds of questions can be answered that have been unanswerable by any means known in the prior art. Many of those questions have very high value both economically, and for the good of society.

Other Embodiments

It should be obvious to one skilled in the art that the NVS can be applied in a broad array of contexts. The embodiments described demonstrate the applicability of the NVS to two different data sources. Application to many other sources is possible in similar ways to those presented in the described embodiments.

Computer Implementation

Figure 32:
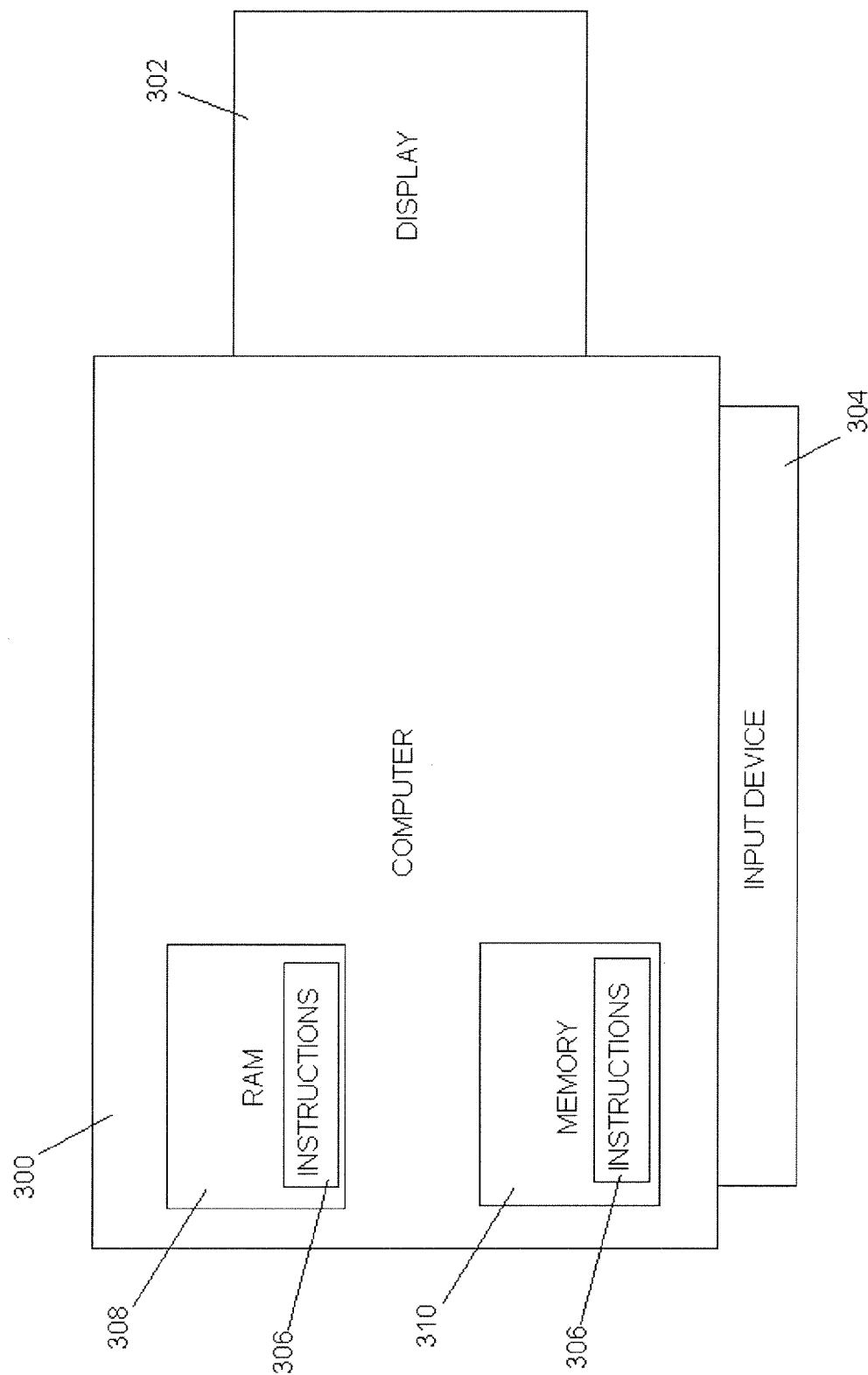
FIG. 32 shows a computer implementation of the described embodiments.

The method of analyzing database records in accordance with the various embodiments of the invention is preferably implemented in a general-purpose computer 300, as shown in FIG. 32. A representative computer 300 is a personal computer or workstation platform that is, e.g., Intel Pentium®, PowerPC® or RISC based, and includes an operating system such as Windows®, Linux®, OS/2®, Unix or the like. As is well known, such machines include a display interface 302 (a graphical user interface or "GUI") and associated input devices 304 (e.g., a keyboard or mouse).

The database records analysis method is preferably implemented in software, and accordingly one of embodiments is as a set of instructions 306 (e.g., program code) in a code module resident in a computer-readable medium such as random access memory 308 of the computer 300. Until required by the computer 300, the set of instructions 306 may be stored in another computer-readable medium 310, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general-purpose computer 300 selectively activated or reconfigured by software, one of ordinary skill in the art would also recognize that such methods may be carried out in hardware, in firmware, or in more specialized apparatus constructed to perform the specified method steps.

Other aspects, modifications, and embodiments are within the scope of the claims.

What is claimed is:

1. A computer-based method of providing a network graphical representation of two or more database records, comprising:
    selecting, by a selectively activated or reconfigured processor, the two or more database records according to one or more descriptive criteria, wherein each of the two or more database records are members of a common record class;
    identifying, by the selectively activated or reconfigured processor, one or more attributes of the common record class, and associating network nodes to instances of the one or more attributes from the database records;
    connecting, by the selectively activated or reconfigured processor, the network nodes with network links that designate network nodes having common instances of the one or more attributes such that the network nodes have a one-to-many relationship with the network links; and
    iteratively executing, by the selectively activated or reconfigured processor, the identifying and connecting steps while modifying the one or more descriptive criteria to change the selected two or more database records.

2. The method of claim 1, wherein the common record class includes patent records.

3. The method of claim 2, wherein the patent records are extracted from a database operated by a commercial provider of patent data.

4. The method of claim 2, wherein the patent records are extracted from a database operated by a foreign provider of patent data.

5. The method of claim 2, wherein the patent records are extracted from a database operated by a domestic governmental provider of patent data.

6. The method of claim 2, wherein the patent records are extracted from database operated by a foreign governmental provider of patent data.

7. The method of claim 2, wherein the one or more descriptive criteria are selected from the group consisting of (i) one or more key words within a body field of each of the patent records, (ii) one or more key words within a title field of each of the patent records, (iii) one or more inventors in an inventor field of each of the patent records, (iv) one or more assignees in an assignee field of each of the patent records, (v) one or more key words within an abstract field, and combinations thereof.

8. The method of claim 2, wherein the one or more attributes includes inventor.

9. The method of claim 2, wherein the one or more attributes includes assignee.

10. The method of claim 2, wherein the one or more attributes includes filing date.

11. The method of claim 2, wherein the one or more attributes includes issue date.

12. The method of claim 2, wherein the one or more attributes includes IPC code.

13. The method of claim 2, wherein the one or more attributes includes USPC code.

14. The method of claim 2, wherein the one or more attributes includes field of search.

15. The method of claim 2, further including selecting additional database records from a record class other than the common record class of patent records, and associating network nodes, network links, or both, to instances of one or more attributes from the additional database records.

16. The method of claim 15, wherein the record class other than the common record class of patent records describes licensing history associated with the patent records.

17. The method of claim 15, wherein the record class other than the common record class of patent records describes litigation history associated with the patent records.

18. The method of claim 15, wherein the record class other than the common record class of patent records describes maintenance fee history associated with the patent records.

19. The method of claim 1, wherein the common record class includes academic journal articles.

20. The method of claim 19, wherein the academic journal articles are extracted from a-database operated by a provider of medical data.

21. The method of claim 19, further including selecting additional database records from a record class other than the common record class of academic journal articles, and associating network nodes to instances of one or more attributes from the additional database records.

22. The method of claim 21, wherein the record class other than the common record class of academic journal articles describes doctor affiliation data associated with the academic journal articles.

23. The method of claim 21, wherein the record class other than the common record class of academic journal articles describes script data associated with the academic journal articles.

24. The method of claim 21, wherein the record class other than the common record class of academic journal articles describes referral data associated with the academic journal articles.

25. The method of claim 1, wherein the network links include a characteristic that describes an amount of common instances occurring between connected nodes.

26. The method of claim 25, wherein the characteristic includes link thickness.

27. The method of claim 25, wherein the characteristic includes link color.

28. The method of claim 25, wherein the characteristic includes link texture.

29. The method of claim 1, wherein at least one set of network nodes is a set of meta-nodes.

30. The method of claim 29, wherein the set of meta-nodes describes a characteristic of two or more database records.

31. The method of claim 30, wherein the one or more descriptive criteria includes a range of dates.

32. The method of claim 1, further including identifying one or more attributes of the record class according to requirements provided by a user.

33. A method of providing a network graphical representation of two or more database records, comprising:
    selecting, by a selectively activated or reconfigured processor, the two or more database records according to one or more descriptive criteria, wherein each of the two or more database records are members of a common record class;
    identifying, by a selectively activated or reconfigured processor, one or more attributes of the common record class according to requirements provided by a user, and associating network nodes to instances of the one or more attributes from the database records;
    connecting, by a selectively activated or reconfigured processor, the network nodes with network links that designate network nodes having common instances of the one or more attributes such that the network nodes have a one-to-many relationship with the network links; and
    iteratively executing, by the selectively activated or reconfigured processor, the identifying and connecting steps while modifying the one or more descriptive criteria to change the selected two or more database records.

34. A method of providing a network graphical representation of two or more database records, comprising:
    selecting, by a selectively activated or reconfigured processor, the two or more database records according to one or more descriptive criteria, wherein each of the two or more database records are members of a common record class;
    identifying, by a selectively activated or reconfigured processor, one or more attributes of the common record class, and associating network nodes to instances of the one or more attributes from the database records, wherein the network nodes are meta-nodes;
    connecting, by a selectively activated or reconfigured processor, the network nodes with network links that designate network nodes having common instances of the one or more attributes such that the network nodes have a one-to-many relationship with the network links; and
    iteratively executing, by the selectively activated or reconfigured processor, the identifying and connecting steps while modifying the one or more descriptive criteria to change the selected two or more database records.

35. A non-transitory computer readable medium including stored instructions adapted for providing a network graphical representation of two or more database records, comprising:
    instructions for selecting the two or more database records according to one or more descriptive criteria, wherein each of the two or more database records are members of a common record class;
    instructions for identifying one or more attributes of the common record class, and associating network nodes to instances of the one or more attributes from the database records;
    instructions for connecting the network nodes with network links that designate network nodes having common instances of the one or more attributes such that the network nodes have a one-to-many relationship with the network links; and
    iteratively executing, by the selectively activated or reconfigured processor, the identifying and connecting steps while modifying the one or more descriptive criteria to change the selected two or more database records.

36. A non-transitory computer readable medium including stored instructions adapted for providing a network graphical representation of two or more database records, comprising:
    instructions for selecting the two or more database records according to one or more descriptive criteria, wherein each of the two or more database records are members of a common record class;
    instructions for identifying one or more attributes of the common record class according to requirements provided by a user, and associating network nodes to instances of the one or more attributes from the database records;
    instructions for connecting the network nodes with network links that designate network nodes having common instances of the one or more attributes such that the network nodes have a one-to-many relationship with the network links; and
    iteratively executing, by the selectively activated or reconfigured processor, the identifying and connecting steps while modifying the one or more descriptive criteria to change the selected two or more database records.

37. A non-transitory computer readable medium including stored instructions adapted for providing a network graphical representation of two or more database records, comprising:
    instructions for selecting the two or more database records according to one or more descriptive criteria, wherein each of the two or more database records are members of a common record class;
    instructions for identifying one or more attributes of the common record class, and associating network nodes to instances of the one or more attributes from the database records, wherein the network nodes are meta-nodes;
    instructions for connecting the network nodes with network links that designate network nodes having common instances of the one or more attributes such that the network nodes have a one-to-many relationship with the network links; and
    iteratively executing, by the selectively activated or reconfigured processor, the identifying and connecting steps while modifying the one or more descriptive criteria to change the selected two or more database records.

38. A non-transitory computer readable medium including stored instructions adapted for providing a network graphical representation of two or more database records, comprising:
    instructions for selecting the two or more database records according to one or more descriptive criteria, wherein each of the two or more database records are members of a common record class;
    instructions for identifying one or more attributes of the common record class, and associating network nodes to instances of the one or more attributes from the database records;
    instructions for connecting the network nodes with network links that designate network nodes having common instances of the one or more attributes;
    instructions for iteratively executing the identifying and connecting steps while modifying the one or more descriptive criteria, to change the selected two or more database records such that the network nodes have a one-to-many relationship with the network links; and
    iteratively executing, by the selectively activated or reconfigured processor, the identifying and connecting steps while modifying the one or more descriptive criteria to change the selected two or more database records.

* * * * *